(12) United States Patent
Kou et al.

(10) Patent No.: US 12,024,595 B2
(45) Date of Patent: Jul. 2, 2024

(54) POLYMER COMPOSITION

(71) Applicant: BASF SE, Ludwigshafen am Rhein (DE)

(72) Inventors: Huiguang Kou, Ludwigshafen am Rhein (DE); Frank Pirrung, Ludwigshafen am Rhein (DE); Steffen Onclin, Ludwigshafen am Rhein (DE); Clemens Auschra, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 624 days.

(21) Appl. No.: 17/268,587

(22) PCT Filed: Jul. 30, 2019

(86) PCT No.: PCT/EP2019/070417
§ 371 (c)(1),
(2) Date: Feb. 15, 2021

(87) PCT Pub. No.: WO2020/035300
PCT Pub. Date: Feb. 20, 2020

(65) Prior Publication Data
US 2021/0347950 A1    Nov. 11, 2021

(30) Foreign Application Priority Data
Aug. 16, 2018 (EP) .................................... 18189220

(51) Int. Cl.
*C08G 73/02* (2006.01)
*C09D 11/102* (2014.01)
*C09D 179/02* (2006.01)

(52) U.S. Cl.
CPC .......... *C08G 73/028* (2013.01); *C09D 11/102* (2013.01); *C09D 179/02* (2013.01)

(58) Field of Classification Search
CPC ................................................. C08G 73/028
See application file for complete search history.

(56) References Cited

U.S. PATENT DOCUMENTS

| | | |
|---|---|---|
| 4,180,644 A | 12/1979 | Marquis et al. |
| 4,191,706 A | 3/1980 | Marquis et al. |
| 4,191,835 A | 3/1980 | Habermeier et al. |
| 4,247,677 A | 1/1981 | Schmidt et al. |
| 4,260,729 A | 4/1981 | Schmidt et al. |
| 5,231,149 A | 7/1993 | Longley et al. |
| 5,340,394 A | 8/1994 | Elsamanoudi |
| 8,658,741 B2 | 2/2014 | Knischka et al. |
| 2003/0212291 A1 | 11/2003 | Gajewski et al. |
| 2006/0207476 A1 | 9/2006 | Coward et al. |
| 2016/0145381 A1* | 5/2016 | Kou ........................ C08G 64/42 525/227 |

FOREIGN PATENT DOCUMENTS

| | | |
|---|---|---|
| EP | 0021569 A1 | 1/1981 |
| WO | 00/40630 A1 | 7/2000 |
| WO | 2003/046029 A1 | 6/2003 |
| WO | 2006/074969 A1 | 7/2006 |
| WO | 2007/110333 A1 | 10/2007 |
| WO | 2011/120947 A1 | 10/2011 |
| WO | 2011/151277 A1 | 12/2011 |
| WO | 2014/000842 A1 | 1/2014 |
| WO | 2015/011085 A1 | 1/2015 |

OTHER PUBLICATIONS

International Preliminary Report on Patentability received for PCT Patent Application No. PCT/EP2019/070417, dated Feb. 25, 2021, 6 pages.
International Search Report and Written Opinion received for PCT Patent Application No. PCT/EP2019/070417, dated Aug. 20, 2019, 7 pages.

* cited by examiner

*Primary Examiner* — Wenwen Cai
(74) *Attorney, Agent, or Firm* — Faegre Drinker Biddle & Reath LLP

(57) ABSTRACT

The present invention relates to novel polymer compositions which are obtained by neutralizing a polymer P having at least one functional moiety of the formula (I) bound to at least one of the termini and/or to the backbone of the polymer, with an oligomeric or polymeric amine PA having at least 2 amino groups per oligomer or polymer molecule.

18 Claims, No Drawings

POLYMER COMPOSITION

CROSS-REFERENCE TO RELATED APPLICATIONS

This application is a national stage application (under 35 U.S.C. § 371) of PCT/EP2019/070417, filed Jul. 30, 2019, which claims benefit of European Application No. 18189220.9, filed Aug. 16, 2018, both of which are incorporated herein by reference in their entirety.

The present invention relates to novel polymer compositions which are obtained by neutralizing a polymer P having at least one functional moiety of the formula (I) as defined below bound to at least one of the termini and/or to the backbone of the polymer, with an oligomeric or polymeric amine PA having at least 2 amino groups per oligomer or polymer molecule.

The invention also relates to a process for the manufacturing of a polymer composition as defined herein, a liquid composition comprising a polymer composition as defined herein, and the use of a polymer composition as defined herein as a dispersant.

BACKGROUND OF THE INVENTION

Pigments are organic or inorganic dry powders that incorporate a mixture of primary particles, aggregates and agglomerates. For both industrial and consumer coating compositions, whether solvent borne or water borne, the pigment should be dispersed homogeneously throughout the coating composition in order to ensure a uniform appearance of the final coating. To properly be dispersed, pigments are usually wetted, disaggregated and deagglomerated in a vehicle to obtain a dispersion of the pigment particles. Wetting involves incorporation of the pigment into the vehicle replacing pigment-air interfaces with pigment-vehicle interfaces. Wetting agents facilitate bringing pigments into a dispersed state as a result of surface activity at the pigment-solution interface. An ideal pigment dispersion consists of a homogenous suspension of particles, after reducing the size of any aggregates and agglomerates.

While some organic vehicles may be good pigment wetting agents, surfactants are typically added to the liquid vehicle to ensure thorough pigment dispersion throughout the vehicle. Surfactants can also be used to temporarily stabilize the pigment dispersion from re-aggregating and re-agglomerating. Problems that occur with current available pigment compositions include (i) a separation or settling of the compositions into their components over time, which can require periodic remixing or stirring, and (ii) an undesirable change in rheological profile.

Producers of coating compositions typically distribute premixed coating compositions in a small number of popular colors. To accommodate consumer desires and to enable matching of existing coated surfaces, manufacturers typically also distribute a set of tint-able base coating compositions and several concentrated colorants. These colorants are combined at point-of-sale outlets using colorant dispensing and shaker mixing equipment to make small batch lots of custom-tinted coating compositions in a much larger array of colors than the limited colors available in premixed products.

The colorants are liquid compositions containing stably dispersed pigments. These pigment compositions can be added, alone or in combination with other colorants containing different pigments, to a base coating composition and mixed in to achieve a desired color of a ready for use (RFU) coating composition. A base coating composition differs from an RFU coating composition in that the color has not been finally adjusted. By having a number of the colorants each formulated using pigments of different hues, a large number of colored coating compositions can be provided by simply mixing at least one of the colorant(s) with the appropriate base coating composition in accordance with a predetermined recipe. Even more colors can be produced by providing a plurality of base coating compositions, themselves varying in hue, including clear base coating compositions.

The utility of known systems comprising colorants and base coating composition is that paints of many colors may be produced very quickly by simply mixing the required colorant composition(s) with the selected base coating composition. This is especially important for small stores where a very large range of colored coating compositions may be supplied on demand without the need for keeping a stock of coating compositions covering the complete color range. Such in-store or point of sale (POS) tinting systems usually comprise up to twenty colorants (also known as tinters) and, for instance, three base coating compositions in each category. In this way light, medium and deep colors can be made. This is also important for producers of coating compositions who want to economically produce coating composition covering the complete color range from a small number of solvent borne and water borne base coating compositions (so called in-plant tinting).

The colorants are usually housed in a tinting machine from which the individual colorants are dispensed according to the manufacturer's recipe from containers connected to or fitted with exit nozzles. Dosage may be manual or controlled by a computer. The problem with this type of system is that after dispensing is completed there is inevitably a residue of the colorant left in or on the nozzle that dries over time and partially or completely blocks the same, making subsequent accurate dispensing impossible. This is an even more severe problem for open nozzle tinting machines, which have nozzles without a tap or valve system to isolate the colorant from the atmosphere once an addition has been made. In such machines, colorants remain exposed to the atmosphere and, unless properly formulated, will eventually dry and block the nozzle.

From an economical point of view, colorants used in POS tinting systems and for in-plant tinting should be suitable for tinting both water borne paints, also termed latex paints, such as wall paints or architectural paints, and solvent-borne paints, such as alkyd paints. Such colorants are also termed universal colorants or universal pigment compositions, as they can be used for both water-borne and solvent borne coating compositions. From an ecological point of view, colorants used in POS tinting systems should have a low content of volatile organics (VOC), so that they can be used in low VOC paints or coatings.

WO 2015/011085 A1 provides polymers and their salts for use as dispersants for fine particulate solid material. The polymer has an anthranilate or anthranilamide group carrying a group —(C=O)—X—COY at the anthranilamide nitrogen, which is bound to one of the termini and/or to the backbone of the polymer.

Although a large number of stabilizing additives for universal pigment compositions have been described in the art, there is still a need for additives which provide for a good rheological behavior of the pigment composition. The additives should allow for formulation of pigment compositions which can be easily incorporated both in solvent borne and water borne coating compositions, which provide a high color strength, both in solvent borne and water borne coating compositions, and good rub out characteristics. Moreover, the additives should be compatible with other ingredients of the pigment compositions, such as humectants, and should not result in blocking the nozzles of a tinting machine. Moreover, the additives should be suitable for formulating low pigment compositions for low VOC coating compositions.

SUMMARY OF THE INVENTION

It was surprisingly found that the above problems are solved by the polymer compositions as described hereinafter, which are obtained by neutralizing a polymer P having at least one functional moiety of the formula (I), which is bound to at least one of the termini and/or to the backbone of a polymer, with an oligomeric or polymeric amine PA having at least 2 amino groups per oligomeric or polymeric PA molecule. These polymer compositions are suitable as dispersants for fine particulate materials, such as pigments and fillers in organic vehicles, and therefore allow the preparation of liquid pigment preparations, which can be easily incorporated into coating compositions. They are particularly useful as universal pigment preparations for tinting both solvent borne coating compositions and water-borne coating compositions.

Therefore, a first aspect of the present invention relates to a polymer composition which is obtained by neutralizing a polymer P having at least one functional moiety of the formula (I)

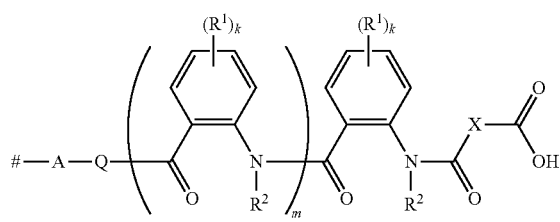

bound to at least one of the termini and/or to the backbone of a polymer, where
indicates the point of attachment to the terminus of the polymer and/or to the polymer backbone;
k is 0, 1, 2, 3 or 4;
m is 0, 1, 2, 3, 4, 5, 6, 7, 8 or 9;
A is a chemical bond or a divalent moiety selected from the group consisting of $C_1$-$C_6$ alkylene, —O—($C_2$-$C_6$ alkylene), —C(=O)—O—($C_2$-$C_6$ alkylene), —NR$^3$—($C_2$-$C_6$ alkylene) and C(=O)—NR$^3$—($C_2$-$C_6$ alkylene), where in the four last-mentioned moieties the $C_2$-$C_6$ alkylene part is attached to Q;
Q is a divalent moiety selected from the group consisting of —O—, —NH— and —S—;
each R$^1$ is independently selected from the group consisting of —OH, —COOCH$_3$, —NO$_2$, —S(=O)$_2$R$^4$, $C_1$-$C_{20}$ alkyl, $C_1$-$C_4$ alkoxy, halogen, aryloxy, aryl and heteroaryl, where aryl, hetaryl and aryloxy are unsubstituted or substituted by 1, 2, 3 or 4 radicals each independently selected from the group consisting of —OH, COOH, —COOCH$_3$, —NO$_2$, —S(=O)$_2$R$^4$, $C_1$-$C_4$ alkyl, $C_1$-$C_4$ alkoxy and halogen;
each R$^2$ is independently selected from the group consisting of hydrogen, —S(=O)$_2$R$^4$, $C_1$-$C_{20}$ alkyl, $C_3$-$C_{10}$ cycloalkyl, aryl, heteroaryl, aryl-$C_1$-$C_4$-alkyl and heteroaryl-$C_1$-$C_4$-alkyl, where aryl and hetaryl in the four last-mentioned radicals are unsubstituted or substituted by 1, 2, 3 or 4 radicals each independently selected from the group consisting of —OH, —COOH, —COOCH$_3$, —NO$_2$, —S(=O)$_2$R$^4$, $C_1$-$C_4$ alkyl, $C_1$-$C_4$ alkoxy and halogen;
X is a divalent moiety selected from the group consisting of linear $C_1$-$C_{10}$ alkylene, linear $C_2$-$C_6$ alkenylene, $C_4$-$C_7$ cycloalkylene, arylene and alkarylene, where the linear $C_1$-$C_{10}$ alkylene, linear $C_2$-$C_6$ alkenylene and $C_4$-$C_7$ cycloalkylene are unsubstituted or substituted by 1, 2, 3 or 4 radicals each independently selected from the group consisting of $C_1$-$C_{18}$ alkyl and $C_2$-$C_{18}$ alkenyl, and where arylene and alkarylene are unsubstituted or substituted by 1, 2, 3 or 4 radicals each independently selected from the group consisting of $C_1$-$C_4$ alkyl, $C_1$-$C_4$ haloalkyl, aryl, —COOH, —COOCH$_3$, —NO$_2$ and halogen;
each R$^3$ is independently selected from the group consisting of hydrogen, —S(=O)$_2$R$^4$, $C_1$-$C_{20}$ alkyl, $C_3$-$C_{10}$ cycloalkyl, aryl and heteroaryl, where aryl and hetaryl are unsubstituted or substituted by 1, 2, 3 or 4 radicals each independently selected from the group consisting of —OH, COOH, —COOCH$_3$, —NO$_2$, —S(=O)$_2$R$^4$, $C_1$-$C_4$ alkyl, $C_1$-$C_4$ alkoxy and halogen;
each R$^4$ is independently selected from the group consisting of OH, $C_1$-$C_4$ alkyl, $C_1$-$C_4$ alkoxy, aryl and heteroaryl, where aryl and hetaryl are unsubstituted or substituted by 1, 2, 3 or 4 radicals each independently selected from the group consisting of $C_1$-$C_4$ alkyl, $C_r$$C_4$ alkoxy and halogen;
with an oligomeric or polymeric amine PA having at least 2 amino groups per oligomer or polymer molecule.

DETAILED DESCRIPTION OF THE INVENTION

The polymer P has at least one functional moiety of the formula (I) bound to at least one of the termini and/or to the backbone of a polymer. This means that in case that P carries one functional moiety of the formula (I), this is bound either to one of the termini or to the backbone of the polymer P; in case that P carries two functional moieties of the formula (I), these are either bound each to one of the termini of the polymer, or both to the backbone of the polymer, or one to one terminus and the other to the backbone of the polymer P; and in case that P carries three or more functional moieties of the formula (I), these are either all bound to the termini (of course provided that P contains as many termini as there are functional moieties (I), which can for example be the case if the polymer is branched, hyperbranched or starlike), or are all bound the polymer's backbone, or are bound both to at least one of the termini and the backbone of the polymer P.

Here and in the following, the term "pigment material" includes both pigments and fillers, and thus relates to pigments, fillers or mixtures of pigments and fillers.

Here and in the following, the prefix $C_n$-$C_m$ indicates the number of carbon atoms a radical or compound may have. For example, the prefix $C_1$-$C_4$ indicates that the radical, moiety or compound may have from 1 to 4 carbon atoms.

Here and in the following, the term "halogen" has to be understood as a halogen radical, which is generally selected from fluorine, chlorine, bromine or iodine, in particular from fluorine or chlorine.

The term "hydrocarbon radical" as used herein denotes an organic radical consisting entirely of hydrogen and carbon and includes alkyl, alkenyl, alkynyl, cycloalkyl, cycloalkenyl, cycloalkynyl and aryl radicals as well as mixed forms, such as groups containing both cycloalkyl and alkyl groups or groups containing both aryl and alkyl groups. A hydrocarbon radical having 1 to 8 carbon atoms is an organic radical consisting entirely of hydrogen and carbon, as defined above, and containing 1 to 8 carbon atoms. Examples are $C_1$-$C_8$-alkyl, $C_2$-$C_8$-alkenyl, $C_2$-$C_8$-alkynyl, $C_3$-$C_8$-cycloalkyl, $C_3$-$C_8$-cycloalkenyl, phenyl, phenyl-$C_1$-$C_8$-alkyl, styryl, the methylphenyls, the ethyl phenyls, the dimethylphenyls and the like.

The term "alkyl" as used herein in each case denotes an aliphatic saturated hydrocarbon radical which may be linear or branched. Examples of $C_1$-$C_2$-alkyl are methyl and ethyl. Examples of $C_1$-$C_3$-alkyl are, in addition to those mentioned for $C_1$-$C_2$-alkyl, n-propyl and isopropyl. Examples of $C_1$-$C_4$-alkyl are, in addition to those mentioned for $C_1$-$C_3$-alkyl, n-butyl, 2-butyl (sec-butyl), isobutyl and tert-butyl. Examples for $C_1$-$C_6$-alkyl are, in addition to those mentioned for $C_1$-$C_4$-alkyl, n-pentyl, 1-methylbutyl, 2-methylbutyl, 3-methylbutyl, 2,2-dimethylpropyl, 1-ethylpropyl, n-hexyl, 1,1-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-tri methyl propyl, 1,2,2-trimethylpropyl, 1-ethyl-1-methylpropyl and 1-ethyl-2-methylpropyl. Examples for $C_1$-$C_8$-alkyl are, in addition to those mentioned for $C_1$-$C_6$-alkyl, n-heptyl, 1-methylhexyl, 2-methylhexyl, 3-methylhexyl, 4-methylhexyl, 5-methylhexyl, 1-ethylpentyl, 2-ethylpentyl, 3-ethyl pentyl, n-octyl, 1-methyloctyl, 2-methylheptyl, 1-ethyl hexyl, 2-ethylhexyl, 1,2-dimethylhexyl, 1-propyl pentyl and 2-propylpentyl. Examples for $C_1$-$C_{10}$-alkyl are, in addition to those mentioned for $C_1$-$C_8$-alkyl, nonyl, decyl, 2-propylheptyl and 3-propylheptyl. Examples for $C_1$-$C_{18}$-alkyl are, in addition to those mentioned for $C_1$-$C_{10}$-alkyl, linear undecyl and its branched isomers, lauryl and its branched isomers, linear tridecyl and its branched isomers, myristyl and its branched isomers, palmityl and its branched isomers, and stearyl and its branched isomers. Examples for $C_1$-$C_{20}$-alkyl are, in addition to those mentioned for $C_1$-$C_{18}$-alkyl, linear nonadecyl and its branched isomers and eicosenyl and its branched isomers. Examples for $C_1$-$C_{22}$-alkyl are, in addition to those mentioned for $C_1$-$C_{20}$-alkyl, linear henicosyl and its branched isomers and docosyl and its branched isomers.

The term "alkylene" ("alkanediyl") as used herein denominates in each case an alkyl radical as defined above, wherein one hydrogen atom at any position of the carbon backbone is replaced by one further binding site, thus forming a bivalent moiety. The same applies for alkylene in context of the groups —O-(alkylene), —C(=O)—O-(alkylene), —NR³-(alkylene) and —C(=O)—NR³-(alkylene).

The term $C_2$ alkylene indicates alkylene having from 2 carbon atoms. The term $C_2$-$C_3$ alkylene indicates alkylene having from 2 to 3 carbon atoms. The term $C_2$-$C_4$ alkylene indicates alkylene having from 2 to 4 carbon atoms. The term $C_1$-$C_4$ alkylene indicates alkylene having from 1 to 4 carbon atoms. The term $C_2$-$C_6$ alkylene indicates alkylene having from 2 to 6 carbon atoms. The term $C_1$-$C_6$ alkylene indicates alkylene having from 1 to 6 carbon atoms. The term $C_1$-$C_{22}$ alkylene indicates alkylene having from 1 to 22 carbon atoms. $C_2$ alkylene is 1,1-ethandiyl (—CH(CH$_3$)—) or 1,2-ethandiyl (—CH$_2$CH$_2$—). Examples for $C_2$-$C_3$ alkylene include methylene, 1,1-ethandiyl (—CH(CH$_3$)—), 1,2-ethandiyl (—CH$_2$CH$_2$—), 1,2-propandiyl (—CH(CH$_3$)CH$_2$—) and 1,3-propandiyl (—CH$_2$CH$_2$CH$_2$—). Examples for $C_2$-$C_4$ alkylene include 1,1-ethandiyl (—CH(CH$_3$)—), 1,2-ethandiyl (—CH$_2$CH$_2$—), 1,2-propandiyl (—CH(CH$_3$)CH$_2$—), 1,3-propandiyl (—CH$_2$CH$_2$CH$_2$—), 1-methyl-1,3-propandiyl (—CH(CH$_3$)CH$_2$CH$_2$—), 2-methyl-1,3-propandiyl (—CH$_2$CH(CH$_3$)CH$_2$—), 1-methyl-1,2-propandiyl (—C(CH$_3$)$_2$CH$_2$—), and 1,4-butandiyl (—CH$_2$CH$_2$CH$_2$CH$_2$—). Examples for $C_1$-$C_4$ alkylene include methylene, 1,1-ethandiyl (—CH(CH$_3$)—), 1,2-ethandiyl (—CH$_2$CH$_2$—), 1,2-propandiyl (—CH(CH$_3$)CH$_2$—), 1,3-propandiyl (—CH$_2$CH$_2$CH$_2$—), 1-methyl-1,3-propandiyl (—CH(CH$_3$)CH$_2$CH$_2$—), 2-methyl-1,3-propandiyl (—CH$_2$CH(CH$_3$)CH$_2$—), 1-methyl-1,2-propandiyl (—C(CH$_3$)$_2$CH$_2$—), and 1,4-butandiyl (—CH$_2$CH$_2$CH$_2$CH$_2$—). Examples of $C_2$-$C_6$ alkylene include, in addition to those mentioned for $C_2$-$C_4$ alkylene, 1,5-pentanediyl (—(CH$_2$)$_5$—), 2,2-dimethyl-1,3-propandiyl (—CH$_2$C(CH$_3$)$_2$CH$_2$—), 1,6-hexanediyl (—(CH$_2$)$_6$—), etc. Examples of $C_1$-$C_6$ alkylene include, in addition to those mentioned for $C_2$-$C_6$ alkylene, methylene. Examples of $C_1$-$C_{22}$ alkylene include, in addition to those mentioned for $C_1$-$C_6$ alkylene, —(CH$_2$)$_n$—, where n is an integer from 7 to 22, and structural isomers thereof.

Preferably, the two binding sites of the bivalent moiety $C_2$-$C_6$ alkylene or $C_2$-$C_4$ alkylene, respectively, are not at the same carbon atom.

The term "linear alkylene" ("linear alkanediyl") as used herein denominates in each case a linear alkyl radical, wherein one hydrogen at the end of the linear carbon backbone is replaced by a further binding site. Examples of linear alkylene include methanediyl (—CH$_2$—), 1,2-ethandiyl (—CH$_2$CH$_2$—), 1,3-propandiyl (—CH$_2$CH$_2$CH$_2$—), 1,4-butandiyl (—CH$_2$CH$_2$CH$_2$CH$_2$—), etc. Linear $C_2$-$C_6$ alkylene is 1,2-ethandiyl (—CH$_2$CH$_2$—), 1,3-propandiyl (—CH$_2$CH$_2$CH$_2$—), 1,4-butandiyl (—CH$_2$CH$_2$CH$_2$CH$_2$—), 5-pentanediyl (—(CH$_2$)$_5$—) or hexanediyl (—(CH$_2$)$_6$—). Linear $C_1$-$C_{10}$ alkylene is methanediyl (—CH$_2$—), 1,2-ethandiyl (—CH$_2$CH$_2$—), 1,3-propandiyl (—CH$_2$CH$_2$CH$_2$—), 1,4-butandiyl (—CH$_2$CH$_2$CH$_2$CH$_2$—), 1,5-pentanediyl (—(CH$_2$)$_5$—), 1,6-hexanediyl (—(CH$_2$)$_6$—), 1,7-heptanediyl (—(CH$_2$)$_7$—), 1,8-octanediyl (—(CH$_2$)$_8$—), 1,9-nonanediyl (—(CH$_2$)$_9$—) or 1,10-decanediyl (—(CH$_2$)$_{10}$—).

The term "alkenyl" as used herein refers to monounsaturated straight-chain or branched hydrocarbon radicals having 2 to 3 ("$C_2$-$C_3$-alkenyl"), 2 to 4 ("$C_2$-$C_4$-alkenyl"), 2 to 6 ("$C_2$-$C_6$-alkenyl"), 2 to 8 ("$C_2$-$C_8$-alkenyl"), 2 to 10 ("$C_2$-$C_{10}$-alkenyl"), 2 to 18 ("$C_2$-$C_{18}$-alkenyl") carbon atoms or 2 to 22 ("$C_2$-$C_{22}$-alkenyl") carbon atoms and a double bond in any position, for example $C_2$-$C_3$-alkenyl, such as ethenyl, 1-propenyl, 2-propenyl or 1-methylethenyl; $C_2$-$C_4$-alkenyl, such as ethenyl, 1-propenyl, 2-propenyl, 1-methylethenyl, 1-butenyl, 2-butenyl, 3-butenyl, 1-methyl-1-propenyl, 2-methyl-1-propenyl, 1-methyl-2-propenyl or 2-methyl-2-propenyl; $C_2$-$C_6$-alkenyl, such as ethenyl, 1-propenyl, 2-propenyl, 1-methylethenyl, 1-butenyl, 2-butenyl, 3-butenyl, 1-methyl-1-propenyl, 2-methyl-1-propenyl, 1-methyl-2-propenyl, 2-methyl-2-propenyl, 1-pentenyl, 2-pentenyl, 3-pentenyl, 4-pentenyl, 1-methyl-1-butenyl, 2-methyl-1-butenyl, 3-methyl-1-butenyl, 1-methyl-2-butenyl, 2-methyl-2-butenyl, 3-methyl-2-butenyl, 1-methyl-3-butenyl, 2-methyl-3-butenyl, 3-methyl-3-butenyl, 1,1-dimethyl-2-propenyl, 1,2-dimethyl-1-propenyl, 1,2-dimethyl-2-propenyl, 1-ethyl-1-propenyl, 1-ethyl-2-propenyl, 1-hexenyl, 2-hexenyl, 3-hexenyl, 4-hexenyl, 5-hexenyl, 1-methyl-1-pentenyl, 2-methyl-1-pentenyl, 3-methyl-1-pentenyl, 4-methyl-1-pentenyl, 1-methyl-2-pentenyl, 2-methyl-2-pentenyl, 3-methyl-2-pentenyl, 4-methyl-2-pentenyl, 1-methyl-3-pentenyl, 2-methyl-3-pentenyl, 3-methyl-3-pentenyl, 4-methyl-3-pentenyl, 1-methyl-4-pentenyl, 2-methyl-4-pentenyl, 3-methyl-4-pentenyl, 4-methyl-4-pentenyl, 1,1-dimethyl-2-butenyl, 1,1-dimethyl-3-butenyl, 1,2-dimethyl-1-butenyl, 1,2-dimethyl-2-butenyl, 1,2-dimethyl-3-butenyl, 1,3-dimethyl-1-butenyl, 1,3-dimethyl-2-butenyl, 1,3-dimethyl-3-butenyl, 2,2-dimethyl-3-butenyl, 2,3-dimethyl-1-butenyl, 2,3-dimethyl-2-butenyl, 2,3-dimethyl-3-butenyl, 3,3-dimethyl-1-butenyl, 3,3-dimethyl-2-butenyl, 1-ethyl-1-butenyl, 1-ethyl-2-butenyl, 1-ethyl-3-butenyl, 2-ethyl-1-butenyl, 2-ethyl-2-butenyl, 2-ethyl-3-butenyl, 1,1,2-trimethyl-2-propenyl, 1-ethyl-1-methyl-2-propenyl, 1-ethyl-2-methyl-1-propenyl, 1-ethyl-2-methyl-2-propenyl and the like, $C_2$-$C_{10}$-alkenyl, such as the radicals mentioned for $C_2$-$C_6$-alkenyl and additionally 1-heptenyl, 2-heptenyl, 3-heptenyl, 1-octenyl, 2-octenyl, 3-octenyl, 4-octenyl, 1-nonenyl, 2-nonenyl, 3-nonenyl, 4-nonenyl, 1-decenyl, 2-decenyl, 3-decenyl, 4-decenyl, 5-decenyl and the positional isomers thereof, $C_2$-$C_{18}$-alkenyl, such as the radicals mentioned for $C_2$-$C_{10}$-alkenyl and additionally the higher homologues with 11 to 18 carbon atoms and the positional isomers thereof, and $C_2$-$C_{22}$-alkenyl, such as the radicals mentioned for $C_2$-$C_{18}$-alkenyl and additionally the higher homologues with 19 to 22 carbon atoms and the positional isomers thereof.

The term "alkenylene" ("alkenediyl") as used herein denominates in each case an alkenyl radical as defined above, wherein one hydrogen atom at any position of the carbon backbone is replaced by one further binding site, thus forming a bivalent moiety. Linear $C_2$-alkenylene is 1,2-ethenediyl (—CH═CH—). Examples for linear $C_2$-$C_6$-alkenylene are 1,2-ethenediyl (—CH═CH—), prop-1-ene-1,3-diyl (—CH═CH—CH$_2$—), prop-2-ene-1,3-diyl (—CH$_2$—CH═CH—), but-1-ene-1,4-diyl (—CH═CH—CH$_2$—CH$_2$—), but-2-ene-1,4-diyl (—CH$_2$—CH═CH—CH$_2$—), but-3-ene-1,4-diyl (—CH$_2$—CH$_2$—CH═CH—), pent-1-ene-1,5-diyl (—CH═CH—CH$_2$—CH$_2$—CH$_2$—), pent-2-ene-1,5-diyl (—CH$_2$—CH═CH—CH$_2$—CH$_2$—), pent-3-ene-1,5-diyl (—CH$_2$—CH$_2$—CH═CH—CH$_2$—), pent-4-ene-1,5-diyl (—CH$_2$—CH$_2$—CH$_2$—CH═CH—), hex-1-ene-1,6-diyl (—CH═CH—CH$_2$—CH$_2$—CH$_2$—CH$_2$—), hex-2-ene-1,6-diyl (—CH$_2$—CH═CH—CH$_2$—CH$_2$—CH$_2$—), hex-3-ene-1,6-diyl (—CH$_2$—CH$_2$—CH═CH—CH$_2$—CH$_2$—), hex-4-ene-1,6-diyl (—CH$_2$—CH$_2$—CH$_2$—CH═CH—CH$_2$—), or hex-5-ene-1,6-diyl (—CH$_2$—CH$_2$—CH$_2$—CH$_2$—CH═CH—). Examples for $C_2$-$C_{22}$-alkenylene are, in addition to those given for linear $C_2$-$C_6$-alkenylene, the higher homologs with 7 to 22 carbon atoms and structural isomers thereof.

The term "$C_4$-$C_{22}$-alkapolyenyl" refers to straight-chain or branched aliphatic hydrocarbon radicals having 4 to 22 carbon atoms and two or more conjugated or isolated, but non-cumulated C═C double bonds. Examples are buta-1,3-dien-1-yl, buta-1,3-dien-2-yl, penta-1,3-dien-1-yl, penta-1,3-dien-2-yl, penta-1,3-dien-3-yl, penta-1,3-dien-4-yl, penta-1,3-dien-5-yl, penta-1,4-dien-1-yl, penta-1,4-dien-2-yl, penta-1,4-dien-3-yl, and the like.

The term "cycloalkyl" as used herein denotes in each case a mono- or bicyclic cycloaliphatic radical having usually from 3 to 10 carbon atoms ("$C_3$-$C_{10}$-cycloalkyl"), preferably 3 to 8 carbon atoms ("$C_3$-$C_8$ cycloalkyl") or 5 to 10 carbon atoms ("$C_5$-$C_{10}$ cycloalkyl") or in particular 3 to 6 carbon atoms ("$C_3$-$C_6$ cycloalkyl"). Examples of monocyclic $C_3$-$C_6$ cycloalkyl are cyclopropyl, cyclobutyl, cyclopentyl, and cyclohexyl. Examples of monocyclic $C_3$-$C_8$ cycloalkyl are cyclopropyl, cyclobutyl, cyclopentyl, cyclohexyl, cycloheptyl, and cyclooctyl. Examples of monocyclic $C_5$-$C_{10}$ cycloalkyl are cyclopentyl, cyclohexyl, cycloheptyl, cyclooctyl, cyclononyl and cyclodecyl. Examples of monocyclic $C_3$-$C_{10}$ cycloalkyl are cyclopropyl, cyclobutyl, cyclopentyl, cyclohexyl, cycloheptyl, cyclooctyl, cyclononyl and cyclodecyl. Examples of bicyclic $C_6$-$C_{10}$ cycloalkyl radicals are bicyclo[2.1.1]hexyl, bicyclo[2.2.1]heptyl, bicyclo[3.1.1]heptyl, bicyclo[2.2.1]heptyl, bicyclo[2.2.2]octyl, bicyclo[3.2.1]octyl, bicyclo[3.1.0]hexyl, bicyclo[3.2.0]heptyl, bicyclo[3.3.0]octyl (1,2,3,3a,4,5,6,6a-octahydropentalenyl), bicyclo[4.2.0]octyl, bicyclo[4.3.0]nonyl (2,3,3a,4,5,6,7,7a-octahydro-1H-indene) and bicyclo[4.4.0]decyl (decalinyl).

The term "cycloalkylene" ("cycloalkanediyl") as used herein denominates in each case a cycloalkyl radical as defined above, wherein one hydrogen atom at any position of the carbon backbone is replaced by a further binding site, thus forming a bivalent moiety. Preferred cycloalkylene has 4 to 7 carbon atoms, in particular 5 to 6 carbon atoms. Examples of $C_4$-$C_7$-cycloalkylene are 1,1-cyclobutanediyl, 1,2-cyclobutanediyl, 1,3-cyclobutanediyl, 1,1-cyclopentanediyl, 1,2-cyclopentanediyl, 1,3-cyclopentanediyl, 1,1-cyclohexanediyl, 1,2-cyclohexanediyl, 1,3-cyclohexanediyl, 1,4-cyclohexanediyl, 1,1-cycloheptanediyl, 1,2-cycloheptanediyl, 1,3-cycloheptanediyl and 1,4-cycloheptanediyl. Examples of $C_5$-$C_6$-cycloalkylene are 1,1-cyclopentanediyl, 1,2-cyclopentanediyl, 1,3-cyclopentanediyl, 1,1-cyclohexanediyl, 1,2-cyclohexanediyl, 1,3-cyclohexanediyl and 1,4-cyclohexanediyl.

Preferably, the two binding sites of the bivalent moiety $C_4$-$C_7$ cycloalkylene or $C_5$-$C_6$ cycloalkylene, respectively, are not at the same carbon atom.

The term "alkoxy" as used herein denominates in each case a straight-chain or branched alkyl group which is bound to the remainder of the molecule via an oxygen atom. Preferred alkoxy usually has from 1 to 4 carbon atoms ("$C_1$-$C_4$ alkoxy"). $C_1$-$C_2$ Alkoxy is methoxy or ethoxy. $C_1$-$C_4$ Alkoxy is methoxy, ethoxy, n-propoxy, 1-methylethoxy (isopropoxy), butoxy, 1-methylpropoxy (sec-butoxy), 2-methylpropoxy (isobutoxy) or 1,1-dimethylethoxy (tert-butoxy). Examples for $C_1$-$C_{20}$-alkoxy are, in addition to those mentioned for $C_1$-$C_6$-alkoxy, pentoxy, 1-methylbutoxy, 2-methylbutoxy, 3-methylbutoxy, 1,1-dimethylpropoxy, 1,2-dimethylpropoxy, 2,2-dimethylpropoxy, 1-ethylpropoxy, hexoxy, 1-methylpentoxy, 2-methylpentoxy, 3-methylpentoxy, 4-methylpentoxy, 1,1-dimethylbutoxy, 1,2-dimethylbutoxy, 1,3-dimethylbutoxy, 2,2-dimethylbutoxy, 2,3-dimethylbutoxy, 3,3-dimethylbutoxy, 1-ethylbutoxy, 2-ethylbutoxy, 1,1,2-trimethylpropoxy, 1,2,2-trimethylpropoxy, 1-ethyl-1-methylpropoxy, 1-ethyl-2-methylpropoxy, heptyloxy, octyloxy, 2-ethylhexyloxy, nonyloxy, decyloxy, undecyloxy, dodecyloxy, tridecyloxy, tetradecyloxy, pentadecyl, hexadecyloxy, heptadecyloxy, octadecyloxy, nonadecyloxy, eicosyloxy and positional isomers thereof.

2-($C_1$-$C_{20}$-Alkoxy)-ethyl is an ethyl group which carries a $C_1$-$C_{20}$-alkoxy substituent in 2-position.

The term "haloalkyl" as used herein denotes in each case an alkyl radical as defined above, wherein at least one of the hydrogen atoms of the alkyl group has been replaced by same or different halogen atoms, preferably by chloro or flouro, in particular by flouro. Preferred haloalkyl has 1 to 4 carbon atoms ("$C_1$-$C_4$-haloalkyl"), in particular 1 to 2 carbon atoms. Examples of $C_1$-$C_2$ haloalkyl are chloromethyl, bromomethyl, dichloromethyl, trichloromethyl, fluoromethyl, difluoromethyl, trifluoromethyl, chlorofluoromethyl, dichlorofluoromethyl, chlorodifluoromethyl, 1-chloroethyl, 1-bromoethyl, 1-fluoroethyl, 2-fluoroethyl, 2,2-difluoroethyl, 2,2,2-trifluoroethyl, 2-chloro-2-fluoroethyl, 2-chloro-2,2-difluoroethyl, 2,2-dichloro-2-fluoroethyl, 2,2,2-trichloroethyl and pentafluoroethyl. Examples for $C_1$-$C_4$-haloalkyl are, in addition to those mentioned for $C_1$-$C_2$-haloalkyl, 1-fluoropropyl, 2-fluoropropyl, 3-fluoropropyl, 1,1-difluoropropyl, 2,2-difluoropropyl, 1,2-difluoropropyl, 3,3-difluoropropyl, 3,3,3-trifluoropropyl, heptafluoropropyl, 1,1,1-trifluoroprop-2-yl, 3-chloropropyl and 4-chlorobutyl.

$C_2$-$C_4$-Alkyleneoxides are oxiranes (epoxides) containing 2 to 4 carbon atoms. Examples are ethylene oxide, propylene oxide, 1,2-butylene oxide and 2,3-butylene oxide. However, unless specified otherwise or becoming evident from the specific context, the term "poly($C_2$-$C_4$-alkyleneoxides)" is not limited to polymers or polymer radicals obtained from the polymerization of the above oxiranes, but includes polycondensation products of $C_2$-$C_4$-alkyleneglycols or of tetrahydrofuran. The repeating units in such poly($C_2$-$C_4$-alkyleneoxides) are thus not only $+CH_2-CH_2-O+$, $+CH_2-CH(CH_3)-O+$, $+CH_2-CH(C_2H_5)-O+$ and/or $+CH(CH_3)-CH(CH_3)-O+$, but can also be $+(CH_2)_3-O+$ (derived from 1,3-propylene glycol and/or $+(CH_2)_4-O+$ (derived from 1,4-butylene glycol or THF).

The term "aryl" as used herein in each case denominates a mono-, bi- or tricyclic hydrocarbon radical comprising at least one phenyl ring, to which one or two further saturated or unsaturated 5- or 6-membered hydrocarbon rings may be fused (thus aryl is $C_6$-$C_{14}$-aryl). Examples of aryl include phenyl, naphthyl, indanyl, indenyl, 1,2,3,4-tetrahydro-5-naphtyl, 1,2,3,4-tetrahydro-6-naphtyl, anthracenyl, 9,10-dihydroanthracen-1-yl, 9,10-dihydroanthracen-2-yl and phenanthrenyl.

The same applies for aryl in the context of other groups comprising an aryl group, such as aryl-$C_1$-$C_4$-alkyl and aryloxy.

The term "arylene" ("arenediyl") as used herein denominates in each case an aryl radical as defined above, wherein one hydrogen atom at any position of the carbon backbone is replaced by a further binding site, thus forming a bivalent moiety. Examples of arylene include 1,2-phenylene, 1,3-phenylene, 1,4-phenylene, 1,2-naphtylene, 1,3-naphthylene, 1,4-naphtylene, 1,5-naphthylene, 1,6-naphthylene, 1,7-naphtylene, 1,8-naphtylene, etc.

Preferred are 1,2-arylene radicals, where the two binding sites of arylene are located at neighboring carbon atoms.

The term "heteroaryl" as used herein in each case denotes a mono-, bi- or tricyclic heterocyclic radical comprising at least one aromatic 5- or 6-membered heterocyclic radical having 1, 2, 3 or heteroatoms selected from N, O and S as ring members, to which one or two further saturated or unsaturated 5- or 6-membered hydrocarbon rings or heterocyclic rings having 1, 2, 3 or heteroatoms selected from N, O and S as ring members may be fused.

Examples of 5- or 6-membered heterocyclic radicals (monocyclic heteroaryl), include furyl, thienyl, pyrrolyl, imidazolyl, pyrazolyl, triazolyl, oxazolyl, thiazolyl, isoxazolyl, isothiazolyl, pyridyl, pyrimidinyl, pyrazinyl, pyridazinyl and triazinyl. Examples of 5- or 6-membered heterocyclic radicals to which one or two further saturated or unsaturated 5- or 6-membered hydrocarbon rings or heterocyclic rings having 1, 2, 3 or heteroatoms selected from N, O and S as ring members are fused (bi and tricyclic heteroaryl), include quinolinyl, quinazolinyl, quinoxalinyl, benzofuryl, benzothienyl, indolyl, indazolyl, benzimidazoly, benzoxazolyl, benzoisoxazolyl, benzoisothiazolyl etc.

The same applies for heteroaryl in the group heteroaryl-($C_1$-$C_4$-alkyl).

The term "aryl-$C_1$-$C_4$-alkyl" denominates an aryl radical as defined herein, which is bound to the remainder of the molecule via a $C_1$-$C_4$ alkylene moiety as defined herein. Examples are benzyl and phenethyl.

The term "alkarylene" as used herein denominates in each case an alkyl-substituted aryl radical, wherein one hydrogen atom at any position of the alkyl carbon backbone is replaced by a further binding site. Of the two binding sites to the remainder of the molecule, one is thus positioned on the aryl ring, while the other is on the alkyl moiety. Examples of alkarylene include methylphenylenes ($-CH_2-C_6H_4-$), ethylphenylenes ($-CH_2-CH_2-C_6H_4-$; $-(CH_3)CH-C_6H_4-$), etc.

Preferred alkarylene has 7 to 12 carbon atoms, in particular 7 to 8 carbon atoms.

The term "aryloxy" denominates an aryl radical as defined herein, which is bound to the remainder of the molecule via an oxygen atom. Examples are phenoxy and naphthoxy.

The term "heteroaryl-$C_1$-$C_4$alkyl" denominates a heteroaryl radical as defined herein, which is bound to the remainder of the molecule via a $C_1$-$C_4$ alkylene moiety as defined herein.

The term "amine" refers to a primary, secondary, or tertiary amine, including cyclic amines.

Furthermore, "amine" in terms of the present invention refers also to heterocyclic compounds having at least one N-atom as ring-member, where the heterocyclic compounds can be saturated or unsaturated, the latter including aromatic. Typically, these heterocyclic compounds are a 3-, 4-, 5-, 6-, 7-, or 8-membered monocyclic ring, or are fused ring systems. Examples are pyrrolidine, pyrazolidine, imidazolidine, pyrroline, pyrazoline, imidazoline, pyrazole, imidazole, triazole, piperidine, piperazine, morpholine, pyridine, pyrimidine, pyrazine, pyridazine, quinoline and isoquinoline.

"Amino group" in terms of the present invention relates to a functional group containing at least one basic nitrogen atom. Apart from the amino group in the proper sense, i.e. $-NH_2$, the term includes substituted amino groups $-NRR'$, wherein R and R', independently of each other, are hydrogen, an optionally substituted aliphatic, cycloaliphatic, aromatic or araliphatic radical, or an optionally substituted alkoxy group, with the proviso that at least one of R and R' is not hydrogen; or R and R', together with the nitrogen atom they are bound to, form an optionally substituted 3-, 4-, 5-, 6-, 7- or 8-membered saturated, partially unsaturated or maximally unsaturated N-bound heteromonocyclic ring or form an optionally substituted 7-, 8-, 9-, 10-, 11- or 12-membered saturated, partially unsaturated or maximally unsaturated N-bound heterobicyclic ring, where the hetero mono- or bicyclic ring may contain, apart from the mandatorily present nitrogen ring atom, 1, 2 or 3 further heteroatoms or heteroatom groups selected from the group consisting of N, O, S, NO, SO and $SO_2$ as ring members. To be basic, at least of the nitrogen ring atoms must not contain a vicinal carbonyl, sulfinyl or sulfonyl group, and the free electron pair of at least one nitrogen ring atom must not be part or the aromatic ring system. Examples for such hetero mono- or bicyclic rings are aziridin-1-yl, azetidin-1-yl, pyrrolidin-1-yl, pyrazolidin-1-yl, imidazolidin-1-yl, oxazolidin-3-yl, isoxazoldin-2-yl, thiazolidin-3-yl, isothiazolidin-2-yl, pyrrolin-1-yl, pyrazolin-1-yl, imidazolin-1-yl, pyrazol-1-yl, imidazole-1-yl, triazol-1-yl, piperidine-1-yl, piperazine-1-yl, morpholin-4-yl, thiomorpholin-4-yl, 1-oxothiomorpholin-4-yl, 1,1-dioxothiomorpholin-4-yl, indolin-1-yl, isoindolin-2-yl, 1,2,3,4-tetrahydroquinolin-1-yl, 1,2,3,4-tetrahydroisoquinolin-2-yl, decahydroquinolin-1-yl or decahydroisoquinolin-2-yl. Furthermore, the amino groups in terms of the present invention encompass C-bound heterocyclic rings containing at least one basic nitrogen atom, to be more precise optionally substituted 3-, 4-, 5-, 6-, 7- or 8-membered saturated, partially unsaturated or maximally unsaturated C-bound heteromonocyclic rings and an optionally substituted 7-, 8-, 9-, 10-, 11- or 12-membered saturated, partially unsaturated or maximally unsaturated C-bound heterobicyclic rings, where the hetero mono- and bicyclic ring contains one nitrogen ring atom and optionally also 1, 2 or 3 further heteroatoms or heteroatom groups selected from the group consisting of N, O, S, NO, SO and $SO_2$ as ring members. Here again, to be basic, at least of the nitrogen ring atoms must not contain a vicinal carbonyl, sulfinyl or sulfonyl group, and the free electron pair of at least one nitrogen ring atom must not be part or the aromatic ring system. Examples for such hetero mono- or bicyclic rings heterocyclic rings are aziridin-2-yl, azetidin-3-yl, pyrrolidin-2-yl, pyrrolidin-3-yl, pyrazolidin-3-yl, pyrazolidin-4-yl, imidazolidin-2-yl, imidazolidin-4-yl, oxazolidin-2-yl, oxazolidin-4-yl, oxazolidin-5-yl, isoxazoldin-3-yl, isoxazoldin-4-yl, isoxazoldin-5-yl, thiazolidin-2-yl, thiazolidin-4-yl, thiazolidin-5-yl, isothiazolidin-3-yl, isothiazolidin-4-yl, isothiazolidin-5-yl, pyrrolin-2-yl, pyrrolin-3-yl, pyrazolin-3-yl, pyrazolin-4-yl, imidazolin-2-yl, imidazolin-4-yl, pyrazol-3-yl, pyrazol-4-yl, imidazole-2-yl, imidazole-4-yl, [1,2,3]triazol-4-yl, [1,2,43]triazol-3-yl, piperidin-2-yl, piperidin-3-yl, piperidin-4-yl, piperazin-2-yl, morpholin-2-yl, morpholin-3-yl, thiomorpholin-2-yl, thiomorpholin-3-yl, 1-oxothiomorpholin-2-yl, 1-oxothiomorpholin-3-yl, 1,1-dioxothiomorpholin-2-yl, 1,1-dioxothiomorpholin-3-yl, pyridin-2-yl, pyridin-3-yl, pyridin-4-yl, pyridazin-3-yl, pyridazin-4-yl, pyrimidin-2-yl, pyrimidin-4-yl, pyrimidin-5-yl, pyrazine-2-yl, indolin-2-yl, indolin-3-yl, indolin-4-yl, indolin-5-yl, indolin-6-yl, indolin-7-yl, isoindolin-1-yl, isoindolin-3-yl, isoindolin-4-yl, isoindolin-5-yl, isoindolin-6-yl, isoindolin-7-yl, quinolin-2-yl, quinolin-3-yl, quinolin-4-yl, quinolin-5-yl, quinolin-6-yl, quinolin-7-yl, quinolin-8-yl, 1,2,3,4-tetrahydroquinolin-2-yl, 1,2,3,4-tetrahydroquinolin-3-yl, 1,2,3,4-tetrahydroquinolin-4-yl, 1,2,3,4-tetrahydroquinolin-5-yl, 1,2,3,4-tetrahydroquinolin-6-yl, 1,2,3,4-tetrahydroquinolin-7-yl, 1,2,3,4-tetrahydroquinolin-8-yl, isoquinolin-1-yl, isoquinolin-3-yl, isoquinolin-4-yl, isoquinolin-5-yl, isoquinolin-6-yl, isoquinolin-7-yl, isoquinolin-8-yl, 1,2,3,4-tetrahydroisoquinolin-1-yl, 1,2,3,4-tetrahydroisoquinolin-3-yl, 1,2,3,4-tetrahydroisoquinolin-4-yl, 1,2,3,4-tetrahydroisoquinolin-5-yl, 1,2,3,4-tetrahydroisoquinolin-6-yl, 1,2,3,4-tetrahydroisoquinolin-7-yl, 1,2,3,4-tetrahydroisoquinolin-8-yl, decahydroquinolin-2-yl, decahydroquinolin-3-yl, decahydroquinolin-4-yl, decahydroquinolin-5-yl, decahydroquinolin-6-yl, decahydroquinolin-7-yl, decahydroquinolin-8-yl, decahydroisoquinolin-1-yl, decahydroisoquinolin-3-yl, decahydroisoquinolin-4-yl, decahydroisoquinolin-5-yl, decahydroisoquinolin-6-yl, decahydroisoquinolin-7-yl, or decahydroisoquinolin-8-yl.

The terms "oligomeric amine" and "polymeric amine" denominate an oligomeric or polymeric compound having at least 2 amino groups as defined above per oligomer or polymer molecule. Preferably, the oligomeric and polymeric amines comprise repeating units comprising at least one amino group as defined herein.

The term "(meth)acrylate" refers to both the esters of acrylic acid and to the esters of methacrylic acid as well as to mixtures thereof. Accordingly, the term "$C_1$-$C_{10}$-alkyl (meth)acrylates" refers to both the $C_1$-$C_{10}$-alkylesters of acrylic acid and to the $C_1$-$C_{10}$-alkylesters of methacrylic acid as well as to mixtures thereof. Analogously, "$C_1$-$C_{10}$-alkyl-(poly-$C_2$-$C_4$-alkyleneglycol) (meth)acrylates" refers to both the esters of mono-$C_1$-$C_{10}$-alkyl-terminated poly-$C_2$-$C_4$-alkyleneglycols with acrylic acid and the corresponding esters with methacrylic acid as well as to mixtures thereof.

The remarks made below as to preferred embodiments of the variables (substituents) of the moieties of formula (I) are valid on their own as well as preferably in combination with each other. It is clear to a skilled person that for k being 2, 3 or 4, the substituent $R^1$ may be identical or different. It is also clear to a skilled person that for m>0 the meanings k, $R^1$ and $R^2$ in each repeating unit may be identical or different; generally, however, they will be identical.

As said, in one aspect the present invention relates to a polymer composition which is obtained by neutralizing a polymer P having at least one functional moiety of the formula (I)

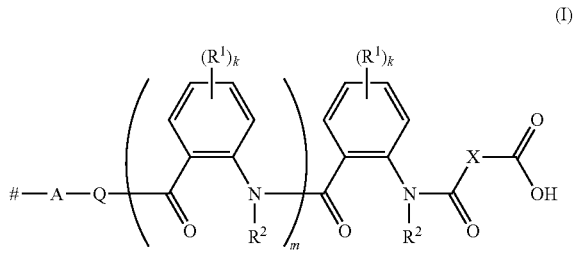

(I)

bound to at least one of the termini and/or to the backbone of a polymer, where #, k, m, A, Q, $R^1$, $R^2$, X, $R^3$, and $R^4$ have one of the above general or, in particular, one of the below preferred meanings, with an oligomeric or polymeric amine PA having at least 2 amino groups per molecule.

Preferably, the variables k, m, A, Q, $R^1$, $R^2$, X, $R^3$ and $R^4$, alone or in combination, have the following meanings
k is 0, 1 or 2, in particular 0 or 1;
m is 0, 1 or 2, in particular 0 or 1;
A is a chemical bond or a divalent moiety selected from the group consisting of —O—($C_2$-$C_6$ alkylene), —C(=O)—O—($C_2$-$C_4$ alkylene) and C(=O)—NH—($C_2$-$C_4$ alkylene), where the alkylene part is attached to Q;
Q is a divalent moiety selected from the group consisting of —O— and —NH—;
each $R^1$ is independently selected from the group consisting of —OH, —$NO_2$, —S(=O)$_2R^4$, $C_1$-$C_4$ alkyl, $C_1$-$C_4$ alkoxy, halogen, phenyl and pyridyl;
each $R^2$ is independently selected from the group consisting of hydrogen, $C_1$-$C_4$ alkyl and phenyl;
X is selected from the group consisting of linear $C_2$-$C_6$ alkylene, linear $C_2$-alkenylene and 1,2-phenylene, where $C_2$-$C_6$ alkylene and $C_2$-alkenylene are unsubstituted or carry a $C_1$-$C_{18}$ alkyl or $C_2$-$C_{18}$ alkenyl radical and 1,2-phenylene is unsubstituted or substituted by 1 or 2 radicals selected from the group consisting of $C_1$-$C_3$ alkyl, —COOH and halogen; and
$R^4$ is selected from the group consisting of $C_1$-$C_4$ alkyl.

In an even more preferred embodiment, the variable k is 0, m is 0, $R^2$ is hydrogen and X is linear $C_2$-$C_4$ alkylene.

The polymers P of the present invention have at least one radical of the formula (I). If not stated otherwise, they have preferably at most 200 radicals of the formula (I), i.e. from 1 to 200, for example from 2 to 200 or from 3 to 200. In particular, they have at most 100 radicals of the formula (I), i.e. from 1 to 100, for example from 2 to 100 or from 3 to 100, radicals of the formula (I). These radicals of the formula (I) may be bound either to one or more of the termini of the polymer backbone and/or at any other position of the polymer backbone. In a specific embodiment, the polymers P have 1, 2 or 3 radicals of the formula (I).

Preferably, the polymer P is selected from the group consisting of polyethers, polyesters, polyether esters, polycarbonates, and polymers having a C—C-backbone [these polymers of course carrying at least one group (I)].

The term "polyether ester" is understood as a block polyether-co-polyester having both at least one, e.g. 1, 2, 3 or 4 polyether block(s) and at least one, e.g. 1, 2, 3 or 4 polyester block(s). The weight ratio of the polyester blocks and the polyether blocks is usually in the range from 1:100 to 100:1, in particular in the range from 1:10 to 10:1.

"Polymers having a C—C-backbone" are polymers which essentially do not have any heteroatom in the backbone. Heteroatoms may however be present in side chains, e.g. as substituents on C-atoms forming the backbone. Heteroatoms may also be present at the termini of the polymer molecule deriving, for example, from starting compounds (used for starting the polymerization reaction) and/or from terminating compounds (used for quenching the growing polymer chain). Heteroatoms may moreover be present in the backbone if O- or S-containing chain transfer agents are used in the polymerization reaction. In any case, "essentially" in this context means that the backbone contains at most 10 mol-%, in particular at most 5 mol-% of heteroatoms in the backbone.

The aforementioned polyethers, polyesters, polyether esters, polycarbonates and polymers having a C—C-backbone are modified in that they carry at least one functional moiety of the formula (I), preferably from 1 to 200, for example from 2 to 200 or from 3 to 200, in particular from 1 to 100, for example from 2 to 100 or from 3 to 100, functional moieties of the formula (I), where the functional moieties of the formula (I) may be bound either to one or more of the termini of the polymer backbone or at any other position of the polymer backbone.

With regard to their capability of acting as a dispersant, in particular as a dispersant for pigments and fillers, preference is given to polymers P which have a number average molecular weight $M_n$ in the range from 500 to 100.000 g/mol, in particular from 1000 to 80.000 g/mol, especially from 1500 to 50.000 g/mol. The weight average molecular weight $M_w$ of the polymers P is generally in the range from 600 to 500.000 g/mol, in particular from 1000 to 300.000 g/mol, especially from 1500 to 150.000 g/mol. The polydispersity $M_w/M_n$ is generally in the range from 1.05 to 5, preferably from 1.1 to 4 and especially from 1.2 to 3.

With regard to their capability of acting as a dispersant, in particular as a dispersant for pigments and fillers, preference is given to polymers P which are characterized by an acid number in the range from 3 to 500 mg KOH per gram of polymer P, in particular from 10 to 300 mg KOH per gram of polymer P.

The polyethers are preferably aliphatic polyethers. The term "aliphatic polyether" is understood as a polyether, where the majority of the carbon atoms in the repeating units, in particular at least 90% of the carbon atoms of the repeating units in the polymer backbone are present as alkylene units, in particular $C_2$-$C_4$ alkylene units, which are linked by oxygen atoms, where the alkylene units may carry a hydroxyl group. In particular the polymer backbone of aliphatic polyethers does not contain aromatic rings such as phenyl.

The polyesters are preferably aliphatic polyesters. The term "aliphatic polyesters" is understood as a polyester, where the majority of the carbon atoms in the repeating units, in particular at least 90% of the carbon atoms of the repeating units in the polymer backbone are present as alkylene units and carbonyl groups, in particular $C_2$-$C_6$ alkylene units and carbonyl groups, where the alkylene units may carry a hydroxyl group. In particular the polymer backbone of aliphatic polyesters does not contain aromatic rings such as phenyl.

The polyether esters are preferably aliphatic polyether esters. The term "aliphatic polyether esters" is understood as a block polyether-co-polyester having both at least one, e.g. 1, 2, 3 or 4 aliphatic polyether block(s) and at least one, e.g. 1, 2, 3 or 4 aliphatic polyester block(s). The weight ratio of the polyester blocks and the polyether blocks is usually in the range from 1:100 to 100:1, in particular in the range from 1:10 to 10:1. The majority of the carbon atoms in the polyester blocks, in particular at least 90% of the carbon atoms of the repeating units in the polyester blocks, are present as alkylene units and carbonyl groups, in particular $C_2$-$C_6$ alkylene units and carbonyl groups, while the majority of the carbon atoms in the polyether blocks, in particular at least 90% of the carbon atoms of the repeating units in the polyether blocks, are present as alkylene units, in particular $C_2$-$C_6$ alkylene units or $C_2$-$C_3$ alkylene units. The alkylene units in both the aliphatic polyester blocks and the polyester blocs of the aliphatic polyether esters may carry a hydroxyl group. The polymer backbone of aliphatic polyether esters does not contain aromatic rings such as phenyl. In a particular embodiment of aliphatic polyether esters, these have exactly one polyether block and exactly one polyester block.

The polycarbonates are preferably aliphatic polycarbonates. The term "aliphatic polycarbonates" is understood as a polycarbonate, where the majority of the carbon atoms in the repeating units, in particular at least 90% of the carbon atoms of the repeating units in the polymer backbone are present as alkylene units and carbonyl groups, in particular $C_2$-$C_6$ alkylene units and carbonyl groups, where the alkylene units may carry a hydroxyl group. In particular the polymer backbone of aliphatic polyesters does not contain aromatic rings such as phenyl.

In a particular embodiment of the invention, the polymer P is an aliphatic polyether [of course carrying at least one group (I)], in particular a poly-($C_2$-$C_4$-alkylene oxide), especially a polyethylene oxide), a polypropylene oxide) or a polyethylene oxide-co-propylene oxide), where in the latter the ethylene oxide and propylene oxide repeating units may be arranged randomly or blockwise. The poly-($C_2$-$C_4$-alkylene oxide) carries at least one moiety of the formula (I), e.g. from 1 to 200 or from 1 to 100 moieties of the formula (I), and in particular it carries 1, 2, 3, or 4 moieties of the formula (I). In the moieties of the formula (I), which are attached to the termini or the polymer backbone of the poly-($C_2$-$C_4$-alkylene oxide), the variable A is preferably a single bond. Q is preferably O or NH. The aliphatic polyethers may be linear or branched or hyperbranched.

In another particular embodiment of the invention, the polymer P is an aliphatic polyester [of course carrying at least one group (I)], in particular a linear or branched or hyperbranched aliphatic polyester, selected from
a) aliphatic polyesters, where the majority, in particular at least 70% of the repeating units of the polyester backbone are derived from aliphatic $C_2$-$C_{10}$ dicarboxylic acids and $C_2$-$C_{10}$ aliphatic diols, and optionally $C_3$-$C_{10}$ aliphatic or $C_5$-$C_{10}$-cycloaliphatic polyols having 3, 4, 5 or 6 hydroxyl groups; and b) aliphatic polyesters, where the majority, in particular at least 70% of the repeating units of the polyester backbone are derived from one or more, e.g. 1, 2 or 3 aliphatic $C_4$-$C_{10}$ lactones, or a combination of one or more, e.g. 1, 2 or 3 aliphatic $C_4$-$C_{10}$ lactones with at least one further component, selected from the group consisting of $C_2$-$C_{10}$ dicarboxylic acids, $C_2$-$C_{10}$ aliphatic diols, $C_3$-$C_{10}$ aliphatic polyols and $C_5$-$C_{10}$-cycloaliphatic polyols, where the polyols have 3, 4, 5 or 6 hydroxyl groups.

In a further particular embodiment of the invention, the polymer P is an aliphatic polyether ester [of course carrying at least one group (I)], in particular a linear or branched or hyperbranched aliphatic polyether ester, selected from a) aliphatic polyether esters, where the majority, in particular at least 70% of the repeating units of the polyester blocks are derived from aliphatic $C_2$-$C_{10}$ dicarboxylic acids and $C_2$-$C_{10}$ aliphatic diols, and optionally $C_3$-$C_{10}$ aliphatic or $C_5$-$C_{10}$-cycloaliphatic polyols having 3, 4, 5 or 6 hydroxyl groups, and where the polyether blocks are poly-($C_2$-$C_4$-alkylene oxides), especially polyethylene oxides), polypropylene oxides) or poly(ethylene oxide-co-propylene oxides), where in the latter the ethylene oxide and propylene oxide repeating units may be arranged randomly or blockwise; and b) aliphatic polyether esters, where the majority, in particular at least 70% of the repeating units of the polyester blocks are derived from one or more, e.g. 1, 2, or 3 aliphatic $C_4$-$C_{10}$ lactones, or a combination thereof with one or more, e.g. 1, 2 or 3 further components, selected from $C_2$-$C_{10}$ dicarboxylic acids, $C_2$-$C_{10}$ aliphatic diols, $C_3$-$C_{10}$ aliphatic polyols and $C_5$-$C_{10}$-cycloaliphatic polyols, where the polyols have 3, 4, 5 or 6 hydroxyl groups, and where the polyether blocks are poly-($C_2$-$C_4$-alkylene oxides), especially polyethylene oxides), polypropylene oxides) or poly(ethylene oxide-co-propylene oxides), where in the latter the ethylene oxide and propylene oxide repeating units may be arranged randomly or blockwise.

The weight ratio of the polyester blocks and the polyether blocks is usually in the range from 1:100 to 100:1, in particular in the range from 1:10 to 10:1.

With regard to polyesters and polyether esters, examples of aliphatic $C_2$-$C_{10}$ dicarboxylic acids include malonic acid, succinic acid, glutaric acid, 2-methylglutaric acid, 3-methylglutaric acid, adipic acid, pimelic acid, azelaic acid, sebacic acid, 2,2-dimethylglutaric acid, suberic acid and diglycolic acid.

Examples of $C_2$-$C_{10}$ aliphatic diols include ethylene glycol, 1,2-propanediol, 1,3-propanediol, 1,2-butanediol, 1,4-butanediol, 1,5-pentanediol, 2,4-dimethyl-2-ethylhexane-1,3-diol, 2,2-dimethyl-1,3-propanediol, 2-ethyl-2-butyl-1,3-propanediol, 2-ethyl-2-isobutyl-1,3-propanediol, 2,2,4-trimethyl-1,6-hexanediol, diethylene glycol and triethylene glycol.

Examples of $C_3$-$C_{10}$ aliphatic or $C_5$-$C_{10}$-cycloaliphatic polyols having 3, 4, 5 or 6 hydroxyl groups include glycerol, trimethylolpropane, trimethylolethane, pentaerythritol, sorbitol, inositol, pentahydroxy cyclopentane, hexahydroxy cyclohexane, etc.

Examples of $C_4$-$C_{10}$ lactones include, γ-butyrolactone, γ-valerolactone, δ-valerolactone, ε-caprolactone.

In a particular preferred embodiment of the invention, in polymers P, the polymer backbone is an aliphatic polyester, where the majority, in particular at least 70% of the repeating units of the polyester backbone are derived from aliphatic $C_4$-$C_{10}$ lactones, in particular from γ-valerolactone, δ-valerolactone, ε-caprolactone or a mixture thereof.

The aliphatic polyesters carry at least one moiety of the formula (I), e.g. from 1 to 200, preferably from 1 to 100, and in particular from 1 to 50 moieties of the formula (I). In the moieties of the formula (I), which are attached to the polymer backbone of the aliphatic polyester, the variable A is preferably a single bond. Q is preferably O or NH.

In another particular preferred embodiment of the invention, polymer P is an aliphatic polyether ester, where in the at least one polyester block the majority, in particular at least 70% of repeating units of the polyester block are derived from aliphatic $C_4$-$C_{10}$ lactones, in particular from γ-valerolactone, δ-valerolactone, ε-caprolactone or a mixture thereof, and where the at least one aliphatic polyether block is as defined above, and where the polyether blocks are preferably poly-($C_2$-$C_4$-alkylene oxides), especially polyethylene oxides), polypropylene oxides) or polyethylene oxide-co-propylene oxides), where in the latter the ethylene oxide and propylene oxide repeating units may be arranged randomly or blockwise. The weight ratio of the polyester blocks and the polyether blocks of the polyether esters of this particular embodiment is usually in the range from 1:100 to 100:1, in particular in the range from 1:10 to 10:1.

The polyether esters carry at least one moiety of the formula (I), e.g. from 1 to 200, preferably from 1 to 100, more preferably from 1 to 50, and in particular 1, 2, 3, or 4 moieties of the formula (I). In the moieties of the formula (I), which are attached to the terminus or to the backbone of the polyether ester, the variable A is preferably a single bond. Q is preferably O or NH. The aliphatic polyether esters may be linear or branched or hyperbranched.

In yet a further particular embodiment of the invention, the polymer P is an aliphatic polycarbonate [of course carrying at least one group (I)], in particular a linear or branched or hyperbranched aliphatic polycarbonate having a polymer backbone which is a poly-($C_2$-$C_4$-alkylene carbonate), especially a polyethylene carbonate), a polypropylene carbonate) or a poly(ethylene carbonate-co-propylene carbonate), where in the latter the ethylene carbonate and propylene carbonate repeating units may be arranged randomly or blockwise. The poly-($C_2$-$C_4$-alkylene carbonate) carries at least one moiety of the formula (I), e.g. from 1 to 200, preferably from 1 to 100, and in particular 1, 2, 3, or 4 moieties of the formula (I). In the moieties of the formula (I), which are attached to the polymer backbone of the poly-($C_2$-$C_4$-alkylene carbonate), the variable A is preferably a single bond. Q is preferably O or NH. The aliphatic polycarbonate may be linear or branched or hyperbranched.

In yet a further particular embodiment of the invention, the polymer P is a polymer wherein the polymer backbone essentially consists of carbon atoms, i.e. a polymer having a C—C-backbone, and wherein at least one carbon atom of the polymer backbone and/or at least one of the terminal atoms carry one or more of the functional moieties of the formula (I) as defined herein. The at least one functional moiety of the formula (I) is frequently attached to a carbon atom of the C—C-backbone within the polymer chain. However, one or more functional moieties of the formula (I) may also be attached to a terminal carbon atom of the C—C-backbone.

According to the invention, the polymer P having a C—C-backbone carries at least one moiety of the formula (I), e.g. from 1 to 200, preferably from 1 to 100, and in particular from 2 to 200 or 3 to 100 or 5 to 50 moieties of the formula (I).

The polymer P having a C—C-backbone is usually formed of repeating units derived from polymerized ethylenically unsaturated monomers M (hereinafter C—C repeating units). At least one of the C—C-repeating units carries a functional moiety of the formula (I) which is attached via the moiety A to a carbon atom of the C—C repeating unit which forms part of the polymer backbone and/or one or more polymer termini carry a functional moiety of the formula (I).

Principally, the monomers M forming the polymer backbone may be selected from any polymerizable ethylenically unsaturated monomers having a polymerizable C=C-double bond. Preferably, at least 95% by weight, in particular at least 99% by weight, based on the total weight of the monomers M used for preparing polymer P having a C—C-backbone, are polymerizable ethylenically unsaturated monomers having exactly one polymerizable C=C-double bond.

In a preferred embodiment, at least one of the monomers forming the polymer backbone carries a group of the formula (I) attached to the polymerizable C=C-double bond or carries at least one functional moiety F attached to the polymerizable C=C-double bond which has to be converted in a subsequent step into the moiety of formula (I) by a polymeric analogous reaction.

Hence, preferably, the polymers P having a C—C-backbone comprise at least one repeating unit of the formula (Ia), where $R^{a1}$, $R^{a2}$ and $R^{a3}$ represent inert radicals such as hydrogen or $C_1$-$C_4$-alkyl, stemming from the monomer carrying the group of the formula (I) attached to the polymerizable C=C-double bond or at least one functional moiety F attached to the polymerizable C=C-double bond (which has then to be converted into the group of formula (I); the functional moiety F is not shown in formula (Ia), but, if present, would be bound instead of the group (I) to the C atom carrying $R^{a3}$).

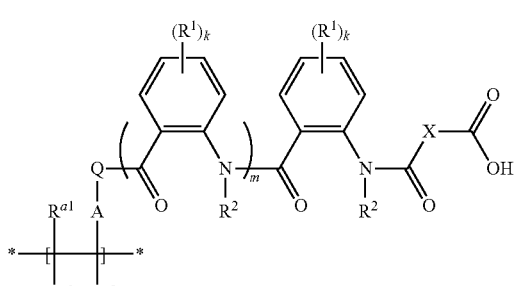

(Ia)

In formula (Ia), the variables k, m, A, Q, $R^1$, $R^2$, $R^3$ and Y are as defined above. The symbols * indicate the points of attachment to the carbon atoms of the adjacent C—C-repeating units and $R^{a1}$, $R^{a2}$ and $R^{a3}$ represent inert radicals such as hydrogen or $C_1$-$C_4$-alkyl, with particular preference being given to $R^{a1}$ and $R^{a2}$ being hydrogen and $R^{a3}$ being hydrogen or $C_1$-$C_4$-alkyl, in particular hydrogen or methyl.

A particular embodiment relates to polymers P having a C—C-backbone, where the moiety A in formulae (I) and (Ia) is preferably a chemical bond or a divalent moiety selected from the group consisting of $C_1$-$C_6$ alkylene, —O—($C_2$-$C_6$ alkylene), —C(=O)—O—($C_2$-$C_6$ alkylene), and —NR$^3$—($C_2$-$C_6$ alkylene), where the $C_2$-$C_6$ alkylene part in the three last-mentioned radicals is attached to Q; and is in particular a chemical bond or a divalent moiety —C(=O)—O—($C_2$-$C_6$ alkylene), where the $C_2$-$C_6$ alkylene part is attached to Q.

A particular embodiment of the invention relates to polymers P having a C—C-backbone, which in addition to the functional moieties of the formula (I) have one or more poly-($C_2$-$C_4$-alkyleneoxide) radicals which are grafted onto the polymer backbone. In these poly-($C_2$-$C_4$-alkyleneoxide) radicals, the $C_2$-$C_4$-alkyleneoxide repeating units preferably comprise at least 50% by weight ethylene oxide repeating units. In particular, the poly-($C_2$-$C_4$-alkyleneoxide) radicals are polyethylene oxide radicals. The number average weight of the poly-($C_2$-$C_4$-alkyleneoxide) radicals will generally be in the range from 150 to 5000 g/mol. The poly-($C_2$-$C_4$-alkyleneoxide) radicals may carry a terminal OH group or may be "end capped", i.e. the hydrogen atom of the terminal OH group is replaced by a hydrocarbon radical such as $C_4$-$C_{10}$-alkyl, benzyl or $C_5$-$C_{10}$-cycloalkyl.

A more preferred embodiment of the invention relates to polymers P having a C—C-backbone which in addition to the repeating units of formula (Ia) comprise repeating units selected from polymerized monoethylenically unsaturated monomers having no functional moiety of the formula (I).

Suitable monomers having no functional moiety of the formula (I) are monoethylenically unsaturated monomers including neutral non-functional monoethylenically unsaturated monomers M1 selected from the group consisting of $C_1$-$C_{10}$-alkyl esters of monoethylenically unsaturated $C_3$-$C_6$-monocarboxylic acids, di-($C_1$-$C_{10}$-alkyl) esters of monoethylenically unsaturated $C_4$-$C_6$-dicarboxylic acids, $C_5$-$C_{10}$-cycloalkyl esters of monoethylenically unsaturated $C_3$-$C_6$-monocarboxylic acids, di-($C_5$-$C_{10}$-cycloalkyl) esters of monoethylenically unsaturated $C_4$-$C_6$-dicarboxylic acids, esters of mono-$C_1$-$C_{10}$-alkyl-terminated poly-$C_2$-$C_4$-alkyleneglycols, in particular of mono-$C_1$-$C_{10}$-alkyl-terminated polyethylene glycols, with monoethylenically unsaturated $C_3$-$C_6$-monocarboxylic acids, and vinylaromatic hydrocarbon compounds (vinylaromatic hydrocarbons);

neutral and basic functional monoethylenically unsaturated monomers M2, which in addition to the polymerizable C=C-double bond include at least one neutral or basic functional group selected from a hydroxyl group, primary or secondary amino groups, a carboxamide group and a nitrile group;

acidic functional monoethylenically unsaturated monomers M3, which in addition to the polymerizable C=C-double bond include at least one acidic functional group selected from carboxyl and hydroxysulfonyl group.

The esters of mono-$C_1$-$C_{10}$-alkyl-terminated poly-$C_2$-$C_4$-alkyleneglycols, in particular the esters of mono-$C_1$-$C_{10}$-alkyl-terminated polyethylene glycols, with a monoethylenically unsaturated $C_3$-$C_6$-monocarboxylic acid, in particular with acrylic acid or methacrylic acid, usually have a molecular weight (number average) in the range from 200 to 5000 g/mol, depending on the number of $C_2$-$C_4$-alkyleneglycol repeating units.

Examples of monoethylenically unsaturated $C_3$-$C_6$-monocarboxylic acids are acrylic acid and methacrylic acid. Examples of monoethylenically unsaturated $C_4$-$C_6$-dicarboxylic acids are maleic acid, fumaric acid, itaconic acid or citraconic acid. Hence, monomers M1 are in particular the aforementioned esters of acrylic acid, methacrylic acid, maleic acid, fumaric acid, itaconic acid or citraconic acid.

Examples of suitable esters M1 of acrylic acid and methacrylic acid are methyl acrylate, ethyl acrylate, n-propylacrylate, n-butyl acrylate, iso-butyl acrylate, tert-butyl acrylate, methyl methacrylate, ethyl methacrylate, propyl methacrylate, iso-butyl methacrylate, n-butyl methacrylate, tert-butyl methacrylate, isobornyl acrylate, isobornyl methacrylate, cyclohexyl acrylate, cyclohexyl methacrylate, methylpolyethylenglycol acrylate and methylpolyethyleneglycol methacrylate.

Examples of vinylaromatic hydrocarbons M1 include styrene, vinyl toluene and α-methyl styrene, with particular preference given to styrene.

Preferred monomers M1 are selected from $C_1$-$C_{10}$-alkyl esters of acrylic acid, $C_1$-$C_{10}$-alkyl esters of methacrylic acid, esters of mono-$C_1$-$C_{10}$-alkyl-terminated poly-$C_2$-$C_4$-alkyleneglycols, in particular mono-$C_1$-$C_{10}$-alkyl-terminated polyethylene glycols, with acrylic acid, esters of mono-$C_1$-$C_{10}$-alkyl-terminated poly-$C_2$-$C_4$-alkyleneglycols, in particular mono-$C_1$-$C_{10}$-alkyl-terminated polyethylene glycols, with methacrylic acid, and vinylaromatic hydrocarbons, in particular styrene.

Examples of suitable monomers M2 include
hydroxy-$C_2$-$C_4$-alkyl esters of monoethylenically unsaturated $C_3$-$C_6$-monocarboxylic acids, in particular hydroxy-$C_2$-$C_4$-alkyl esters of acrylic acid or methacrylic acid such as 2-hydroxyethyl acrylate, 2-hydroxyethyl methacrylate, 2- or 3-hydroxypropyl acrylate, 2- or 3-hydroxypropyl methacrylate, 4-hydroxybutyl acrylate and 4-hydroxybutyl methacrylate;
N-(hydroxy-$C_2$-$C_4$-alkyl) amides of monoethylenically unsaturated $C_3$-$C_6$-monocarboxylic acids, in particular N-(hydroxy-$C_2$-$C_4$-alkyl) amides of acrylic acid or methacrylic acid such as N-(2-hydroxyethyl) acrylamide, N-(2-hydroxyethyl) methacrylamide, N-(2- or 3-hydroxypropyl) acrylamide, N-(2- or 3-hydroxypropyl) methacrylamide, N-(4-hydroxybutyl) acrylamide and N-(4-hydroxybutyl) methacrylamide;
amino-$C_2$-$C_4$-alkyl esters of monoethylenically unsaturated $C_3$-$C_6$-monocarboxylic acids, in particular amino-$C_2$-$C_4$-alkyl esters of acrylic acid or methacrylic acid such as 2-aminoethyl acrylate, 2-aminoethyl methacrylate, 2- or 3-aminopropyl acrylate, 2- or 3-aminopropyl methacrylate, 4-aminobutyl acrylate and 4-aminobutyl methacrylate; N-(amino-$C_2$-$C_4$-alkyl) amides of monoethylenically unsaturated $C_3$-$C_6$-monocarboxylic acids, in particular N-(amino-$C_2$-$C_4$-alkyl) amides of acrylic acid or methacrylic acid such as N-(2-aminoethyl) acrylamide, N-(2-aminoethyl) methacrylamide, N-(2- or 3-aminopropyl) acrylamide, N-(2- or 3-aminopropyl) methacrylamide, N-(4-aminobutyl) acrylamide and N-(4-aminobutyl) methacrylamide;
primary amides of monoethylenically unsaturated $C_3$-$C_6$-monocarboxylic acids such as acrylamide and methacrylamide;
monoethylenically unsaturated $C_3$-$C_6$-mononitriles such as acrylonitrile, methacrylonitrile.
Examples of suitable monomers M3 include
monoethylenically unsaturated $C_3$-$C_6$-monocarboxylic acids such as acrylic acid and methacrylic acid;
monoethylenically unsaturated $C_4$-$C_6$-dicarboxylic acids such as maleic acid, fumaric acid, itaconic acid or citraconic acid;
monoethylenically unsaturated sulfonic acids such as vinyl sulfonic acid, allylsulfonic acid, methallylsulfonic acid, styrenesulfonic acid.

A particular group of embodiments of the invention relates to polymers P having a C—C-backbone, which comprises repeating units derived from monomers M1, in particular repeating units derived from monomers M1, which are selected from $C_1$-$C_{10}$-alkyl (meth)acrylates, $C_1$-$C_{10}$-alkyl-(poly-$C_2$-$C_4$-alkyleneglycol) (meth)acrylates, and polymerized vinylaromatic hydrocarbons such as styrene.

Another particular group of embodiments of the invention relates to polymers P having a C—C-backbone, which comprises repeating units derived from monomers M1, in particular repeating units derived from monomers M1, which are selected from $C_1$-$C_{10}$-alkyl (meth)acrylates, $C_1$-$C_{10}$-alkyl-(poly-$C_2$-$C_4$-alkyleneglycol) (meth)acrylates, and polymerized vinylaromatic hydrocarbons such as styrene, and repeating units derived from monomers M2, in particular from monomers M2 selected from the group consisting of hydroxy-$C_2$-$C_4$-alkyl esters of $C_3$-$C_6$-monocarboxylic acids, N-(hydroxy-$C_2$-$C_4$-alkyl) amides of $C_3$-$C_6$-monocarboxylic acids, amino-$C_2$-$C_4$-alkyl esters of $C_3$-$C_6$-monocarboxylic acids and N-(amino-$C_2$-$C_4$-alkyl) amides of $C_3$-$C_6$-monocarboxylic acids.

Amongst polymers P having a C—C-backbone, particular preference is given to those where the repeating units derived from monomers M1 make up from 10 to 90% by weight, in particular from 30 to 80% by weight of the polymer P having a C—C-backbone.

Particularly preferred polymers P having a C—C-backbone comprise
10 to 90% by weight, in particular from 30 to 80% by weight of the polymer P having a C—C-backbone of repeating units derived from monomers M1;
10 to 80% by weight, in particular from 20 to 60% by weight of the polymer P having a C—C-backbone of repeating units of the formula Ia;
0 to 80% by weight, in particular from 0 to 50% by weight of the polymer P having a C—C-backbone of repeating units derived from monomers M2;
0 to 20% by weight, in particular from 0 to 10% by weight of the polymer P having a C—C-backbone of repeating units derived from monomers M3.

With regard to their capability of acting as a dispersant, preference is given to polymers P having a C—C-backbone, which have a number average molecular weight $M_N$ in the range from 500 to 100.000 g/mol, in particular from 800 to 80.000 g/mol, especially from 1000 to 50.000 g/mol. The weight average molecular weight $M_w$ of the polymers P'' is generally the range from 600 to 500.000 g/mol, in particular from 1000 to 300.000 g/mol, especially from 1200 to 150.000 g/mol. The polydispersity $M_W/M_N$ is generally in the range from 1.05 to 5, preferably from 1.1 to 4 and especially from 1.2 to 3.

With regard to their capability of acting as a dispersant, preference is given to polymers P having a C—C-backbone, which are characterized by an amine number in the range from 3 to 500 mg KOH per gram of polymer P having a C—C-backbone, in particular from 10 to 300 mg KOH per gram of polymer P having a C—C-backbone.

Among the above polymers P, preference is given to polyethers. More preferably, P is an aliphatic polyether, in particular a poly-($C_2$-$C_4$-alkylene oxide), especially a polyethylene oxide), a polypropylene oxide) or a polyethylene oxide-co-propylene oxide), where in the latter the ethylene oxide and propylene oxide repeating units may be arranged randomly or blockwise; and is very specifically a poly (ethylene oxide). The poly-($C_2$-$C_4$-alkylene oxide) carries at least one moiety of the formula (I), e.g. from 1 to 200 or from 1 to 100 moieties of the formula (I). In particular it carries 1, 2, 3, or 4 moieties of the formula (I), specifically 1 or 2 moieties of the formula (I), very specifically 1 moiety of the formula (I). If the polymer carries 1 or 2 moieties of the formula (I), these are preferably attached to the termini of the poly-($C_2$-$C_4$-alkylene oxide). In such polymers P, the variable A is preferably a single bond; and Q is preferably O or NH. The polyethers may be linear or branched or hyperbranched.

According to the invention, the oligomeric or polymeric amine PA which is used to neutralize the polymer P having at least one functional moiety of the formula (I) as defined herein has least 2 amino groups per molecule.

Preferably, the oligomeric or polymeric amine PA is selected from poly-$C_2$-$C_3$-alkyleneimines,
ethoxylated poly-$C_2$-$C_3$-alkyleneimines,
amidated poly-$C_2$-$C_3$-alkyleneimines,
polyetheramines,
polyetheramine polyols,
polyetheramine polyols, wherein at least a portion of the hydroxyl groups are modified by ester or urethane groups, and
homo and copolymers of ethylenically unsaturated monomers M comprising monomers MA having an ethylenically unsaturated double bond and an amino group, Poly-$C_2$-$C_3$-alkyleneimines are linear or branched polymers obtainable by polymerization of $C_2$-$C_3$-alkyleneimines, i.e. of ethyleneimine (aziridine), 1,2-propyleneimine (2-methylaziridine, methylethyleneimine), 1,3-propyleneimine (azetidine) or mixtures thereof. Of course, the poly-$C_2$-$C_3$-alkyleneimines may also be obtained by polycondensation of $C_2$-$C_3$-alkylenediamines, such as ethylene-1,2-diamine, propylene-1,2-diamine or propylene-1,3-diamine, from mixtures thereof and/or from mixtures with $C_2$-$C_3$-alkyleneimines. Linear poly-$C_2$-$C_3$-alkyleneimines have following formula:

$H_2N$—[$B^1$—$NH$]$_a$—$NH_2$, where each $B^1$ is independently $C_2$-$C_3$-alkylene, i.e. 1,2-ethylene, 1,2-propylene or 1,3-propylene, and a is the number of repeating units, e.g. from 1 to 5000 or from 2 to 2000 or from 5 to 1200. In branched poly-$C_2$-$C_3$-alkyleneimines, at least a part of the above-shown primary ($NH_2$) and/or secondary (NH) amino groups is a branching point, i.e. is a tertiary amino group being substituted by groups derived from the monomers used for preparing the polymer (the amino groups of which may of course also be branching points). Preferably, the poly-$C_2$-$C_3$-alkyleneimines have a number average molecular weight in the range from 250 to 50,000 g/mol, more preferably in the range of from 250 to 10,000 g/mol, in particular from 300 to 5000 g/mol. Among the above poly-$C_2$-$C_3$-alkyleneimines, preference is given to linear or branched polyethyleneimines (PEI), more preference being given to linear or branched polyethyleneimines (PEI) with a number average molecular weight in the range from 250 to 50,000 g/mol, preferably in the range of from 250 to 10,000 g/mol, in particular from 300 to 5000 g/mol.

Ethoxylated poly-$C_2$-$C_3$-alkyleneimines are poly-$C_2$-$C_3$-alkyleneimines as described above, wherein at least a portion of the hydrogen atoms of the primary and/or secondary amino groups of the poly-$C_2$-$C_3$-alkyleneimines, e.g. from 30 to 100 mol-%, especially from 80 to 100 mol-%, of the hydrogen atoms of the primary and secondary amino groups of the poly-$C_2$-$C_3$-alkyleneimines, are replaced by a 2-hydroxyethyl group (i.e. by a group —$CH_2CH_2$—OR, where R is H), by a 2-($C_1$-$C_{20}$-alkoxy)-ethyl group (i.e. by a group —$CH_2CH_2$—OR, where R is $C_1$-$C_{20}$-alkyl), by a polyethylene ether radical terminated with an OH group (i.e. by a group —[$CH_2CH_2$—O]$_n$—$CH_2CH_2$—OH, where n is the number of repeating units and is in each case independently at least 1, preferably from 1 to 100, more preferably from 3 to 80 and in particular from 5 to 50), or by a polyethylene ether radical terminated with a $C_1$-$C_{20}$-alkoxy group (i.e. by a group —[$CH_2CH_2$—O]$_n$—$CH_2CH_2$—OR, where R is $C_1$-$C_{20}$-alkyl and n is the number of repeating units and is in each case independently at least 1, preferably from 1 to 100, more preferably from 3 to 80 and in particular from 5 to 50). Among the above groups, preference is given to 2-hydroxyethyl groups and polyethylene ether radicals terminated by an OH group. More preference is given to polyethylene ether radicals terminated by an OH group, in particular a group —[$CH_2CH_2$—O]$_n$—$CH_2CH_2$—OH, where n is in each case independently preferably from 1 to 100, more preferably from 3 to 80 and in particular from to 50.

In the ethoxylated poly-$C_2$-$C_3$-alkyleneimines, the polyethylene ether groups are generally present in an amount of at least 10% by weight, e.g. from 10 to 99% by weight, preferably from 10 to 90% by weight, in particular from 10 to 80% by weight; preferably of at least 20% by weight, e.g. from 20 to 99% by weight, preferably from 20 to 90% by weight, in particular from 20 to 80% by weight; more preferably of at least 30% by weight, e.g. from 30 to 99% by weight, preferably from 30 to 90% by weight, in particular from 30 to 80% by weight; and in particular of at least 50% by weight, e.g. from 50 to 99% by weight, preferably from 50 to 90% by weight, in particular from 50 to 80% by weight; based on the total weight of the ethoxylated poly-$C_2$-$C_3$-alkyleneimines.

Ethoxylated poly-$C_2$-$C_3$-alkyleneimines are generally obtained by reacting poly-$C_2$-$C_3$-alkyleneimines with ethylene oxide, but may also be obtained by reaction with a polyethylene glycol or with a polyethylene glycol mono-$C_1$-$C_{20}$-alkylether. If reacted with ethylene oxide or with a polyethylene glycol, and if so desired, the OH termini can be converted into $C_1$-$C_{20}$-alkoxy termini by reacting the former with an alkylation agent, such as an alkyl halogenide, a dialkylsulfate or the like.

Amidated poly-$C_2$-$C_3$-alkyleneimines are poly-$C_2$-$C_3$-alkyleneimines as described herein, wherein at least a portion of the hydrogen atoms of the primary and/or secondary amino groups of the poly-$C_2$-$C_3$-alkyleneimines, e.g. from 30 to 100 mol-%, especially from 80 to 100 mol-%, of the hydrogen atoms of the primary and/or secondary amino groups of the poly-$C_2$-$C_3$-alkyleneimine, are replaced by an acyl radical, the nitrogen atom and the acyl group thus forming together an amide group. Suitable acyl groups are for example derived from aliphatic carboxylic acids, aliphatic dicarboxylic acids, aliphatic hydroxycarboxylic acids, lactones, polyesters or polyethers terminated with a carboxylic acid group.

Examples for suitable aliphatic carboxylic acids from which the acyl group is derived are alkanecarboxylic acids having from 1 to 22 carbon atoms, such as formic acid, acetic acid, propanoic acid, butanoic acid, valeric acid (pentanoic acid), caproic acid (hexanoic acid), heptanoic acid, caprylic acid (octanoic acid), pelargonic acid (nonanoic acid), 3,3,5-isononanoic acid, capric acid (decanoic acid), undecanoic acid, lauric acid (dodecanoic acid), tridecanoic acid, myristic acid (tetradecanoic acid), pentadecanoic acid, palmitic acid (hexadecanoic acid), heptadecanoic acid, stearic acid (octadecanoic acid), nonadecanoic acid, arachidic acid (eicosanoic acid), heneicosanoic acid and behenic acid (docosanoic acid); and unsaturated fatty acids, such as myristoleic acid, palmitoleic acid [(9Z)- hexadec-9-enoic acid], oleic acid [(9Z)-octadecenoic acid], linolenic acid [(9Z,12Z)-9,12-octadecadienoic acid], α-linolenic acid [(9Z,12Z,15Z)-9,12,15-octadecatrienoic acid], or arachidonic acid [(5Z,8Z,11Z,14Z)-5,8,11,14-eicosatetraenoic acid]. Also suitable are mixtures of the above acids, in particular mixtures in form of acid mixtures obtainable from natural products and/or from industrial processes, such as tall oil fatty acid.

Examples for suitable aliphatic dicarboxylic acids from which the acyl group is derived are saturated diacids, such as oxalic acid, malonic acid, succinic acid, polyisobutene-substituted succinic acid, glutaric acid, adipic acid, pimelic acid, suberic acid, azelaic acid, sebacic acid, undecanedioic acid, dodecanedioic acid, tridecanedioic acid, tetradecanedioic acid or hexadecanedioic acid, and unsaturated diacids, such as maleic acid or fumaric acid.

Aliphatic hydroxycarboxylic acids are aliphatic compounds having at least one carboxylic acid group and additionally at least one hydroxy group. Examples for suitable aliphatic hydroxycarboxylic acids from which the acyl group is derived are glycolic acid (hydroxy acetic acid), lactic acid (2-hydroxypropanoic acid), 3-hydroxybutyric acid, 4-hydroxybutyric acid, 6-hydroxycaproic acid, 12-hydroxystearic acid ($CH_3$—$(CH_2)_5$—CHOH—$(CH_2)_{10}$—COOH) or ricinoleic acid ([(R)-12-hydroxy-(2)-9-octadecenoic acid].

Examples for suitable lactones from which the acyl group is derived are γ-butyrolactone, δ-valerolactone and ε-caprolactone.

Examples for acid-terminated polyethers from which the acyl group is derived are succinic acid-modified polyalkylene glycols, e.g. succinic acid-modified polyethylene glycols. Generally, just one terminus of the polyalkylene glycol is esterified with succinic acid, while the other is either unsubstituted (i.e. an OH group) or etherified, e.g. with a methyl group (i.e. a methoxy group). Such succinic acid-modified polyalkylene glycols have typically a number average molecular weight of from 200 to 5000 g/mol, preferably from 200 to 2,000 g/mol.

The acyl radical is preferably selected from the group consisting of following structures:
- —C(O)—R', where R' is selected from the group consisting of $C_1$-$C_{22}$-alkyl, $C_2$-$C_{22}$-alkenyl and $C_4$-$C_{22}$-alkapolyenyl;
- —C(O)—$B^2$—C(O)OH, where $B^2$ is selected from the group consisting of $C_1$-$C_{22}$-alkylene and $C_2$-$C_{22}$-alkenylene;
- —C(O)—$B^2$—OH, where $B^2$ is selected from the group consisting of $C_1$-$C_{22}$-alkylene and $C_2$-$C_{22}$-alkenylene;
- [C(O)—$B^3$—O]$_b$—H, where $B^3$ is $C_2$-$C_6$-alkylene and b is from 2 to 100;
- [C(O)—$B^4$—C(O)—O—$B^5$—O]$_c$—[C(O)—$B^4$—C(O)—O]$_d$—H, where $B^4$ and $B^5$, independently of each other and independently of each occurrence, are $C_2$-$C_6$-alkylene, c is from 1 to 100 and d is 0 or 1; and
- —C(O)—[$B^6$—O]$_e$—R", where $B^6$ is $C_2$-$C_4$-alkylene, R" is H or $C_1$-$C_{22}$-alkyl and e is from 1 to 100.

The amidated poly-$C_2$-$C_3$-alkyleneimines are generally prepared by reacting a poly-$C_2$-$C_3$-alkyleneimine with an aliphatic carboxylic acid, an aliphatic dicarboxylic acid, an aliphatic hydroxycarboxylic acid, a lactone, a polyester (of course terminated with a carboxylic acid group), a polyether terminated with a carboxylic acid group, an amide-forming derivative of such acids, e.g. an anhydride or a halide thereof, or mixtures thereof, under amide bond forming conditions, such as heating, removal of water, the use of a base in case that an acid halide is used and the like. Suitable reaction conditions are described, for example, in WO 2007/110333 and the literature cited therein. In case of lactones, these can either be first polymerized to polyesters and then reacted with the poly-$C_2$-$C_3$-alkyleneimine or the poly-$C_2$-$C_3$-alkyleneimine acts as a polymerization initiator for the lactone, so that the preformation of a polyester from the lactone is skipped.

Polyetheramines are aliphatic polyethers as defined above, wherein all end groups are amine end groups. Preferably the polyetheramines are compounds of formula $H_2N$—[$B^7$—O]$_f$—$NH_2$, where $B^7$ is $C_2$-$C_4$-alkylene and f is from 3 to 100, preferably from 3 to 50. $B^7$ is preferably 1,2-ethylene (—$CH_2CH_2$—), 1,2-propylene (—CH($CH_3$)$CH_2$—) or (—$CH_2$CH($CH_3$)—) or 1,4-buylene (—$CH_2CH_2CH_2CH_2$—) and more preferably 1,2-ethylene or 1,2-propylene. In particular, $B^7$ is 1,2-ethylene.

Polyetheramines can be obtained by polymerization of cyclic ethers such as ethylene oxide, propylene oxide or tetrahydrofuran and subsequent conversion of the terminal hydroxy groups to amino groups.

Polyetheramines can also be obtained by polycondensation of polyalcohols and subsequent conversion of the terminal hydroxy groups to amino groups. Similarly, functionalized polyetheramines can be obtained by polycondensation of functionalized polyalcohols, of which at least a portion of the hydroxyl groups are modified by ester, amide or urethane groups. Suitable polyalcohols are in particular diols, triols, and tetraols.

Polyetheramine polyols are oligomers or polymers obtainable by polycondensation of di- or tri-$C_2$-$C_4$-alkanolamines. Examples for suitable trialkanolamines are triethanolamine, tripropanolamine or triisopropanolamine. Examples for suitable dialkanolamines are diethanolamine, dipropanolamine or diisopropanolamine. Preferably, the polyetheramine polyols have a number average weight in the range from 500 to 50,000 g/mol and/or an amine number in the range of 200 to 800 mg KOH/g.

Polyetheramine polyols, wherein at least a portion of the hydroxyl groups are modified by ester or urethane groups, are polyetheramine polyols as defined above, wherein at least a portion of the terminal hydroxyl groups are modified into an ester or a urethane group; i.e. wherein at least a portion of the hydrogen atoms of the OH groups of the polyetheramine polyols, e.g. from 30 to 100 mol-%, especially from 80 to 100 mol-%, of the hydrogen atoms of the OH groups of the polyetheramine polyols, are replaced by an acyl radical, the oxygen atom of the OH group and the acyl group thus forming together an ester group; or by an INI-substituted carbamoyl group, the oxygen atom of the OH group and the carbamoyl group thus forming together a urethane group. This modification is for example obtained by reacting a polyetheramine polyol with a carboxylic acid or an ester-forming derivative thereof, e.g. an anhydride, a sufficiently reactive ester or a halide thereof, with a lactone, or by reacting a polyetheramine polyol with a $C_1$-$C_{20}$-alkyl isocyanate.

Suitable acyl groups are for example derived from aliphatic or aromatic carboxylic acids, aliphatic or aromatic dicarboxylic acids, aliphatic or aromatic hydroxycarboxylic acids, lactones, polyesters or polyethers terminated with a carboxylic acid group.

Examples for suitable aliphatic carboxylic acids from which the acyl group is derived are alkanecarboxylic acids having from 1 to 22 carbon atoms, such as acetic acid, propanoic acid, butanoic acid, valeric acid (pentanoic acid), caproic acid (hexanoic acid), heptanoic acid, caprylic acid (octanoic acid), pelargonic acid (nonanoic acid), 3,3,5- isononanoic acid, capric acid (decanoic acid), undecanoic acid, lauric acid (dodecanoic acid), tridecanoic acid, myristic acid (tetradecanoic acid), pentadecanoic acid, palmitic acid (hexadecanoic acid), heptadecanoic acid, stearic acid (octadecanoic acid), nonadecanoic acid, arachidic acid (eicosanoic acid), heneicosanoic acid and behenic acid (docosanoic acid); and unsaturated fatty acids, such as myristoleic acid, palmitoleic acid [(9Z)-hexadec-9-enoic acid], oleic acid [(9Z)-octadecenoic acid], linolenic acid [(9Z,12Z)-9,12-octadecadienoic acid], α-linolenic acid [(9Z,12Z,15Z)-9,12,15-octadecatrienoic acid], or arachidonic acid [(5Z,8Z,11Z,14Z)-5,8,11,14-eicosatetraenoic acid]. Also suitable are mixtures of the above acids, in particular mixtures in form of acid mixtures obtainable from natural products and/or from industrial processes, such as tall oil fatty acid.

Examples for suitable aromatic carboxylic acids from which the acyl group is derived are benzoic acid, naphthenic acid and anthranilic acid.

Examples for suitable aliphatic dicarboxylic acids from which the acyl group is derived are saturated diacids, such as oxalic acid, malonic acid, succinic acid, polyisobutene-substituted succinic acid, glutaric acid, adipic acid, pimelic acid, suberic acid, azelaic acid, sebacic acid, undecanedioic acid, dodecanedioic acid, tridecanedioic acid, tetradecanedioic acid or hexadecanedioic acid, and unsaturated diacids, such as maleic acid or fumaric acid.

Examples for suitable aromatic dicarboxylic acids from which the acyl group is derived are phthalic acid and terephthalic acid.

Hydroxycarboxylic acids are compounds having at least one carboxylic acid group and at least one hydroxy group. They may also include other substituents which do not interfere with the amidation reaction. Examples of suitable substituents on the hydroxycarboxylic acid include e.g. linear, branched or cyclic, saturated or unsaturated alkyl, linear, branched or cyclic, saturated or unsaturated alkoxy, halo, and the like. Examples for suitable aliphatic hydroxycarboxylic acids from which the acyl group is derived are glycolic acid (hydroxy acetic acid), lactic acid (2-hydroxypropanoic acid), 3-hydroxybutyric acid, 4-hydroxybutyric acid, 6-hydroxycaproic acid, 12-hydroxystearic acid ($CH_3$—$(CH_2)_5$—CHOH—$(CH_2)_{10}$—COOH) or ricinoleic acid= ([(R)-12-hydroxy-(2)-9-octadecenoic acid]. An example for a suitable aromatic hydroxycarboxylic acids from which the acyl group is derived is salicylic acid.

Examples for suitable lactones from which the acyl group is derived are γ-butyrolactone, δ-valerolactone and ε-caprolactone.

Examples for acid-terminated polyethers from which the acyl group is derived are succinic acid-modified polyalkylene glycols, e.g. succinic acid-modified polyethylene glycols. Generally, just one terminus of the polyalkylene glycol is esterified with succinic acid, while the other is either unsubstituted (i.e. an OH group) or etherified, e.g. with a methyl group (i.e. a methoxy group). Such succinic acid-modified polyalkylene glycols have typically a number average molecular weight of from 200 to 5000 g/mol, preferably from 200 to 2,000 g/mol.

The acyl radical is preferably selected from the group consisting of following structures:
—C(O)—R', where R' is selected from the group consisting of $C_1$-$C_{22}$-alkyl, $C_2$-$C_{22}$-alkenyl, $C_4$-$C_{22}$-alkapolyenyl, phenyl and aminophenyl (specifically 2-aminophenyl);
—C(O)—$B^2$—C(O)OH, where $B^2$ is selected from the group consisting of $C_1$-$C_{22}$-alkylene, $C_2$-$C_{22}$-alkenylene and polyisobutene-substituted $C_2$-alkylene;
—C(O)—$B^2$—OH, where $B^2$ is selected from the group consisting of $C_1$-$C_{22}$-alkylene and $C_2$-$C_{22}$-alkenylene;
[C(O)—$B^3$—O]$_b$—H, where $B^3$ is $C_2$-$C_6$-alkylene and b is from 2 to 100;
[C(O)—$B^4$—C(O)—O—$B^5$—O]$_c$—[C(O)—$B^4$—C(O)—O]$_d$—H, where $B^4$ and $B^5$, independently of each other and independently of each occurrence, are $C_2$-$C_6$-alkylene, c is from 1 to 100 and d is 0 or 1; and
—C(O)—[$B^6$—O]$_e$—R", where $B^6$ is $C_2$-$C_4$-alkylene, R" is H or $C_1$-$C_{22}$-alkyl and e is from 1 to 100.

N-substituted carbamoyl groups are generally derived from isocyanate, in particular from $C_1$-$C_{20}$-alkyl isocyanates, such as methylisocyanate, ethylisocyanate, propylisocyanate etc.

Polyetheramine polyols wherein at least a portion of the hydroxyl groups are modified by ester groups are generally prepared by reacting a polyetheramine polyol with an aliphatic carboxylic acid, an aliphatic dicarboxylic acid, an aliphatic hydroxycarboxylic acid, a lactone, a polyester, a polyether terminated with a carboxylic acid group, an ester-forming derivative of such acids, e.g. an anhydride or a halide thereof, or mixtures thereof. The reaction is generally carried out under esterification conditions, such as heating, removal of water, the use of a base in case that an acid halide is used and the like. In case of lactones, these can either be first polymerized to polyesters and then reacted with the polyetheramine polyol or the polyetheramine polyol acts as a polymerization initiator for the lactone, so that the preformation of a polyester from the lactone is skipped. Polyetheramine polyols, wherein at least a portion of the hydroxyl groups are modified by urethane groups are generally prepared by reacting a polyetheramine polyol with an isocyanate, in particular with a $C_1$-$C_{20}$-alkyl isocyanate, such as methylisocyanate, ethylisocyanate, propylisocyanate etc.

Suitable monomers MA having an ethylenically unsaturated double bond and an amino group are for example selected from
amides of unsaturated $C_3$-$C_6$ monocarboxylic acids bearing at least one primary, secondary or tertiary amino group,
vinylaromatic compounds which bear an amino group or wherein the aromatic group is an aromatic heterocyclic moiety comprising at least one basic nitrogen ring atom,
vinyl compounds bearing a primary, secondary or tertiary amino group.

Amides of unsaturated $C_3$-$C_6$-monocarboxylic acids bearing at least one primary, secondary or tertiary amino group are generally amides formally derived from unsaturated $C_3$-$C_6$-monocarboxylic acids and diamines or higher amines of which only one amino group is part of the amide bond, the other amino group(s) remaining unaltered. Examples for suitable diamines are 1,2-ethylene diamine, N,N-dimethyl-ethane-1,2-diamine, 1,3-propylenediamine, N,N-dimethyl-propane-1,3-diamine, 1,4-butylenediamine and the like. Suitable $C_3$-$C_6$-monocarboxylic acids are for example acrylic acid and methacrylic acid. Preferred amides of unsaturated $C_3$-$C_6$-monocarboxylic acids are selected from amino-$C_2$-$C_4$-alkyl amides of $C_3$-$C_6$-monocarboxylic acids, in particular amino-$C_2$-$C_4$-alkyl amide of acrylic acid or methacrylic acid such as 2-aminoethyl acrylamide, 2-(dimethylamino)-ethyl acrylamide, 2-aminoethyl methacrylamide, 2-(dimethylamino)-ethyl methacrylamide, 2- or 3-aminopropyl acrylamide, 3-(dimethylamino)-propyl acrylamide, 2- or 3-aminopropyl methacrylamide, 3-(dimethylamino)-propyl methacrylamide, 4-aminobutyl acrylamide, 4-(dimethylamino)-butyl acrylamide, 4-aminobutyl methacrylamide and 4-(dimethylamino)-butyl methacrylamide. More preferably, the amides of unsaturated $C_3$-$C_6$ monocarboxylic acids bearing at least one primary, secondary or tertiary amino group are selected from 2-aminoethyl acrylamide, 2-(dimethylamino)-ethyl acrylamide, 2-aminoethyl methacrylamide, 2-(dimethylamino)-ethyl methacrylamide, 2-aminopropyl acrylamide, 3-aminopropyl acrylamide, 3-(dimethylamino)-propyl acrylamide, 2-aminopropyl methacrylamide, 3-aminopropyl methacrylamide and 3-(dimethylamino)-propyl methacrylamide, and in particular from 2-(dimethylamino)-ethyl methacrylamide and 3-(dimethylamino)-propyl methacrylamide.

Preferred vinylaromatic compounds which bear an amino group are e.g. amino-styrene and a mi no-vinyl naphthalene.

Preferred vinylaromatic compounds wherein the aromatic group is an aromatic heterocyclic moiety comprising at least one basic nitrogen ring atom are those wherein the aromatic group is selected from pyrazole, imidazole, the triazoles, pyridine, pyrazine, pyrimidine, pyridazine, triazine, benzimidazole, indazole, quinoline, isoquinoline, quinoxaline, quinazoline, purine and acridine. Among these, preference is given to pyridine. Thus, the vinylaromatic compound wherein the aromatic group is an aromatic heterocyclic moiety is in particular vinylpyridine (2-, 3- or 4-vinylpyridine), more particularly 4-vinylpyridine. Preferred vinyl compounds bearing a primary, secondary and tertiary amino group are amino-$C_3$-$C_{10}$-alk-1-enes such as aminoethene, 3-amino-prop-1-ene, 4-amino-but-1-ene, in particular aminoethene (vinylamine) and 3-amino-prop-1-ene (allylamine). As vinylamine is not stable, this monomer is generally not used as such for polymerization, but in the form of its amide with formic acid, i.e. as N-vinylformamide. The resulting polymer containing N-vinylformamide repeating units is then partially or completely hydrolyzed to a polymer containing vinylamine repeating units.

The homo and copolymers of ethylenically unsaturated monomers M comprising monomers MA having an ethylenically unsaturated double bond and an amino group are preferably selected from the group consisting of polyvinylamine and copolymers of acrylates or methacrylates with vinylaromatic compounds wherein the aromatic group is an aromatic heterocyclic moiety comprising at least one basic nitrogen ring atom, or with unsaturated $C_3$-$C_6$ monocarboxylic acid amides of diamines. More preferably, the homo and copolymers of ethylenically unsaturated monomers M comprising monomers MA having an ethylenically unsaturated double bond and an amino group are selected from the group consisting of polyvinylamine and copolymers of acrylates or methacrylates with vinylpyridine, specifically with 4-vinylpyridine, or with amides of acrylic or methacrylic acid with diamines, specifically amides of methacrylic acid with diamines. Suitable and preferred amides of acrylic or methacrylic acid with diamines are listed above.

Copolymers of ethylenically unsaturated monomers M comprising monomers MA having an ethylenically unsaturated double bond and an amino group can be prepared as described, for example, in U.S. Pat. No. 8,658,741.

More preferably, the oligomeric or polymeric amine PA is selected from
polyethyleneimines,
ethoxylated polyethyleneimines,
amidated polyethyleneimines derived from aliphatic carboxylic acids, aliphatic hydroxycarboxylic acids, lactones or mixtures thereof, —polycondensation products of trialkanolamines;
polycondensation products of trialkanolamines, wherein at least a portion of the hydroxyl groups are modified by ester or urethane groups, and
polyvinylamines,
copolymers of acrylates or methacrylates and monomers MA having an ethylenically unsaturated double bond and an amino group.

In a particular embodiment, the oligomeric or polymeric amine PA is selected from linear or branched polyethyleneimines, preferably from linear or branched polyethyleneimines with a number average molecular weight in the range of from 250 to 50,000 g/mol, more preferably from 250 to 10,000 g/mol, in particular from 300 to 5000 g/mol and specifically from 500 to 3000 g/mol.

In another particular embodiment, the oligomeric or polymeric amine PA is selected from ethoxylated polyethyleneimines, in preferably from ethoxylated polyethyleneimines obtainable by ethoxylating polyethyleneimines with a number average molecular weight in the range from 250 to 10,000 g/mol, more preferably from 250 to 5,000 g/mol, in particular from 300 to 3000 g/mol and specifically from 300 to 1000 g/mol, with 1 to 100, preferably 10 to 50, in particular 10 to 30 mol ethylene oxide per mol of polyethyleneimine.

In another particular embodiment, the oligomeric or polymeric amine PA is selected from amidated polyethyleneimines, preferably from amidated polyethyleneimines obtainable by amidation reaction of polyethyleneimines with a number average molecular weight in the range of from 250 to 50,000 g/mol, more preferably in the range of from 250 to 10,000 g/mol, in particular from 300 to 5000 g/mol and specifically from 500 to 3000 g/mol, with at least one aliphatic carboxylic acid, aliphatic hydroxycarboxylic acid, lactone or mixture thereof. In these amidated polyethyleneimines, the aliphatic carboxylic acid from which the acyl part of the amide group is derived is preferably selected from the group consisting of butanoic acid, valeric acid (pentanoic acid), caproic acid (hexanoic acid), heptanoic acid, caprylic acid (octanoic acid), pelargonic acid (nonanoic acid), 3,3,5-isononanoic acid, capric acid (decanoic acid), undecanoic acid, lauric acid (dodecanoic acid), tridecanoic acid, myristic acid (tetradecanoic acid), pentadecanoic acid, palmitic acid (hexadecanoic acid), heptadecanoic acid, stearic acid (octadecanoic acid), nonadecanoic acid, arachidic acid (eicosanoic acid), heneicosanoic acid, behenic acid (docosanoic acid), myristoleic acid, palmitoleic acid [(9Z)-hexadec-9-enoic acid], oleic acid [(9Z)-octadecenoic acid], linolenic acid [(9Z,12Z)-9,12-octadecadienoic acid], α-linolenic acid [(9Z,12Z,15Z)-9,12,15-octadecatrienoic acid], arachidonic acid [(5Z,8Z,11Z,14Z)-5,8,11,14-eicosatetraenoic acid] and mixtures of the above acids, in particular mixtures in form of acid mixtures obtainable from natural products and/or from industrial processes, such as tall oil fatty acid.

In the amidated polyethyleneimines, the aliphatic hydroxycarboxylic acid from which the acyl part of the amide group is derived is preferably selected from the group consisting of 12-hydroxystearic acid ($CH_3$—$(CH_2)_5$—CHOH—$(CH_2)_{10}$—COOH) and ricinoleic acid ([(R)-12-hydroxy-(Z)-9-octadecenoic acid].

In the amidated polyethyleneimines, the lactone from which the acyl part of the amide group is derived is preferably selected from the group consisting of δ-valerolactone and ε-caprolactone.

In another particular embodiment, the oligomeric or polymeric amine PA is selected from polycondensation products of trialkanolamines, preferably from polycondensation products of triethanolamines. Preferably, the polycondensation products of trialkanolamines have a number average weight in the range from 500 to 50,000 g/mol and/or an amine number in the range of 200 to 800 mg KOH/g.

In another particular embodiment, the oligomeric or polymeric amine PA is selected from polycondensation products of trialkanolamines, wherein at least a portion of the hydroxyl groups are modified by ester or urethane groups, in particular by ester groups, preferably from polycondensation products of triethanolamines, wherein at least a portion of the hydroxyl groups are modified by ester or urethane groups, in particular by ester groups. More preferably, the polycondensation products of trialkanolamines, wherein at least a portion of the hydroxyl groups are modified by ester groups are obtainable by esterification reaction of polycondensation products of trialkanolamines having a number average weight in the range from 500 to 50,000 g/mol and/or an amine number in the range of 200 to 800 mg KOH/g with an aliphatic or aromatic carboxylic acid, an aliphatic or aromatic dicarboxylic acid, an aliphatic hydroxycarboxylic acid, a lactone, suitable ester-forming derivatives thereof, such as anhydrides, or with a mixture thereof.

In the polycondensation products of trialkanolamines, wherein at least a portion of the hydroxyl groups are modified by ester groups, the aliphatic carboxylic acid from which the acyl part of the ester group is derived is preferably selected from the group consisting of butanoic acid, valeric acid (pentanoic acid), caproic acid (hexanoic acid), heptanoic acid, caprylic acid (octanoic acid), pelargonic acid (nonanoic acid), 3,3,5-isononanoic acid, capric acid (decanoic acid), undecanoic acid, lauric acid (dodecanoic acid), tridecanoic acid, myristic acid (tetradecanoic acid), pentadecanoic acid, palmitic acid (hexadecanoic acid), heptadecanoic acid, stearic acid (octadecanoic acid), nonadecanoic acid, arachidic acid (eicosanoic acid), heneicosanoic acid, behenic acid (docosanoic acid), myristoleic acid, palmitoleic acid [(9Z)-hexadec-9-enoic acid], oleic acid [(9Z)-octadecenoic acid], linolenic acid [(9Z,12Z)-9,12-octadecadienoic acid], α-linolenic acid [(9Z,12Z,15Z)-9,12,15-octadecatrienoic acid], arachidonic acid [(5Z,8Z,11Z,14Z)-5,8,11,14-eicosatetraenoic acid] and mixtures of the above acids, in particular mixtures in form of acid mixtures obtainable from natural products and/or from industrial processes, such as tall oil fatty acid.

In the polycondensation products of trialkanolamines, wherein at least a portion of the hydroxyl groups are modified by ester groups, the aromatic carboxylic acid from which the acyl part of the ester group is derived is preferably selected from the group consisting of benzoic acid, naphthenic acid and anthranilic acid.

In the polycondensation products of trialkanolamines, wherein at least a portion of the hydroxyl groups are modified by ester groups, the dicarboxylic acid from which the acyl part of the ester group is derived is preferably selected from the group consisting of succinic acid and polyisobutene-substituted succinic acid.

In the polycondensation products of trialkanolamines, wherein at least a portion of the hydroxyl groups are modified by ester groups, the hydroxycarboxylic acid from which the acyl part of the ester group is derived is preferably selected from the group consisting of 12-hydroxystearic acid ($CH_3-(CH_2)_5-CHOH-(CH_2)_{10}-COOH$) or ricinoleic acid=[(R)-12-hydroxy-(Z)-9-octadecenoic acid].

In the polycondensation products of trialkanolamines, wherein at least a portion of the hydroxyl groups are modified by ester groups, the lactone from which the acyl part of the ester group is derived is preferably selected from the group consisting of δ-valerolactone and ε-caprolactone.

In another particular embodiment, the oligomeric or polymeric amine PA is selected from polyvinylamines, preferably from polyvinylamines with a weight average molecular weight ($M_w$) in the range from 100 to 50000 g/mol, more preferably from 1000 to 30000 g/mol and in particular from 5000 to 15000 g/mol.

In another particular embodiment, the oligomeric or polymeric amine PA is selected from copolymers of acrylates or methacrylates and monomers MA having an ethylenically unsaturated double bond and an amino group, preferably from copolymers of acrylates or methacrylates with vinylaromatic compounds wherein the aromatic group is an aromatic heterocyclic moiety comprising at least one basic nitrogen ring atom, or with unsaturated $C_3$-$C_6$-monocarboxylic acid amides of diamines. More preferably, the acrylates or methacrylates and monomers MA having an ethylenically unsaturated double bond and an amino group are selected from copolymers of acrylates or methacrylates with vinylpyridine, specifically with 4-vinylpyridine, or with amides of acrylic or methacrylic acid with diamines, in particular amides of methacrylic acid with diamines, such as 2-aminoethyl methacrylamide, 2-(dimethylamino)-ethyl methacrylamide, 2- or 3-aminopropyl methacrylamide, 3-(dimethylamino)-propyl methacrylamide, 4-aminobutyl methacrylamide or 4-(dimethylamino)-butyl methacrylamide, specifically 2-(dimethylamino)-ethyl methacrylamide or 3-(dimethylamino)-propyl methacrylamide.

The copolymers of acrylates or methacrylates and monomers MA having an ethylenically unsaturated double bond have preferably a number average weight in the range from 1000 to 50000, more preferably from 5000 to 30000, in particular from 7000 to 20000.

Preferably, the oligomeric or polymeric amine has an amine number in the range from 10 to 2000 mg KOH/g, more preferably 20 to 1000 mg KOH/g, and in particular 50 to 500.

Preferably, the oligomeric or polymeric amine has a number average weight in the range from 100 to 50,000 g/mol, more preferably 200 to 35,000 g/mol, in particular 500 to 20,000 g/mol, specifically 1000 to 20000 g/mol.

Preferably, the oligomeric or polymeric amine PA is present in such an amount that the molar ratio of amino groups in PA to the COOH groups in the moieties of formula (I) are in the range from 1:3 to 3:1, more preferably in the range from 1:2 to 2:1, more preferably in the range of 1:1.5 to 2:1.

In one embodiment, the polymer composition may optionally contain conventional additives conventionally used, such as plasticizers, lubricants, emulsifiers, surfactants, rheology additives, catalysts, flow auxiliaries, optical brighteners, flame retardants, preservatives, antistatic agents or blowing agents.

In a preferred embodiment, the polymer composition contains a plasticizer.

Suitable plasticizers are described in: Cadogan, D. F. and Howick, C. J. 2000. Plasticizers. Ullmann's Encyclopedia of Industrial Chemistry. Particularly suitable plasticizers are compounds containing carboxylate groups (carboxylic ester groups), such as aromatic carboxylates, in particular $C_4$-$C_{12}$-alkyl phthalates, e.g. bis(2-ethylhexyl)phthalate; aliphatic carboxylates, in particular $C_4$-$C_{12}$-alkyl adipates, e.g. dioctyl adipate, bis(2-ethyl hexyl)-adipate or bis(2-ethyloctyl) adipate, or $C_4$-$C_{12}$-alkylcitrates, e.g. trisethylcitrate; or cycloaliphatic carboxylates, in particular $C_4$-$C_{20}$-alkyl esters of cyclohexane dicarboxylic acids, in particular 1,2-cyclohexane dicarboxylic acid di-$C_4$-$C_{20}$-alkyl esters, more particularly 1,2-cyclohexane dicarboxylic acid di-$C_4$-$C_{12}$-alkyl esters, specifically 1,2-cyclohexane dicarboxylic acid diisononyl ester (DINCH). Among the above carboxylates, preference is given to the aliphatic and cycloaliphatic carboxylates, specifically to the adipates and the 1,2-cyclohexane dicarboxylic acid di-$C_4$-$C_{12}$-alkyl esters.

In another preferred embodiment, the polymer composition contains an emulsifier and/or a surfactant.

Another aspect of the invention is a process for the manufacturing of the polymer composition as described herein, which comprises a) providing a polymer P.1 carrying at least one radical of the formula (I.1)

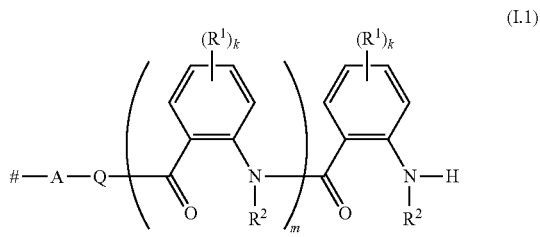

bound to at least one of the termini and/or to the backbone of the polymer, where # indicates the point of attachment to the terminus and/or to the polymer backbone and where A, Q, k, m, $R^1$ and $R^2$ have one of the above general or, in particular, one of the above preferred meanings;

b) reacting the polymer P.1 of step a) with an acid anhydride of formula (IV)

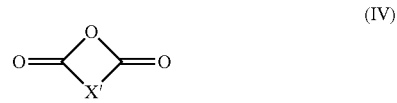

where X' has one of the general or, in particular, one of the preferred meanings given above for X, where in case that X' carries 2, 3 or 4 COOH groups, two COOH groups may form an anhydride group; and c) neutralizing the reaction product of step b) with an oligomeric or polymeric amine PA.

Preferred acid anhydrides (IV) include aliphatic acid anhydrides, such as malonic anhydride, succinic anhydride, glutaric anhydride, 2-methylglutaric anhydride, 3-methylglutaric anhydride, adipic anhydride, pimelic anhydride, azelaic anhydride, octadecenylsuccinic anhydride, maleic anhydride, itaconic anhydride or citraconic anhydride, cycloaliphatic acid anhydrides, such as cis- or trans-1,2-cyclohexanedicarboxylic anhydride, aromatic acid anhydrides, such as phthalic anhydride, 1,2,4-benzenetricarboxylic anhydride or pyromellitic dianhydride. Especially preferred acid anhydrides are succinic anhydride, octadecenylsuccinic anhydride, maleic anhydride, phthalic anhydride and 1,2,4-benzenetricarboxylic anhydride. Specifically, succinic anhydride is used.

The amount of the acid anhydride (IV) is generally chosen such that the molar ratio of the acid anhydride (IV) to the amount of functional groups (I).1 on the polymer P.1 is from 10:1 to 1:10, preferably from 5:1 to 1:5, more preferably from 3:1 to 1:3, in particular from 2:1 to 1:2, specifically approximately 1:1. "Approximately" in this context means to include deviations from this molar ratio due, for example, to weighing errors or impurities in the starting materials. The deviations do generally not exceed 10%, and preferably do not exceed 5%.

The reaction of the polymer P.1 with the acid anhydride (IV) is generally performed in the presence of a suitable catalyst which promotes the reaction of the primary or secondary amines of the radical (I.1) with the acid anhydrides. Suitable catalysts include bases, e.g. alkali metal hydroxides such as sodium or potassium hydroxide, alkali metal carbonates such as sodium or potassium carbonate, tertiary amines, e.g. tri-$C_1$-$C_6$-alkylamines such as triethylamine, tripropylamine, tributylamine, dimethylpropylamine, dimethylbutylamine, dimethyl-isopropylamine, di-$C_1$-$C_6$-alkyl-$C_5$-$C_6$-cycloalkylamines such as dimethylcyclohexylamine, or basic nitrogen-containing heterocycles, such as piperidine, morpholine, pyridine, di-$C_1$-$C_6$-alkylpyridines, such as the lutidines, or di-$C_1$-$C_6$-alkylaminopyridines, such as 4-dimethylaminopyridine, and tin compound catalysts, such as dibutyltindioctoate and dibutyltindilaurate.

The amount of catalyst is generally from 0.01 to 2% by weight, in particular from 0.1 to 1% by weight, based on the total amount of polymer P.1 and the acid anhydride (IV).

The reaction of the polymer P.1 with the acid anhydride (IV) is generally performed at temperatures ranging from 40 to 120° C., in particular from 60 to 100° C.

The reaction of the polymer P.1 with the acid anhydride (IV) may be performed in bulk or in solvent. Suitable solvents are those which are inert under the used reaction conditions, examples including esters, hydrocarbons and mixtures thereof. Preferably, the reaction is performed in bulk, i.e. the concentration of the reactants is at least 90% by weight, based on the weight of the reaction mixture.

The reaction pressure in the reaction of the polymer P.1 with the acid anhydride (IV) is not critical and thus the reaction can be carried out under reduced, normal or elevated pressure. Generally, atmospheric pressure is preferred.

The polymer P is derived from polymer P.1, and thus, analogously, polymer P.1 is preferably selected from the group consisting of polyethers, polyesters, polyether esters, polycarbonates, and polymers having a C—C-backbone [of course carrying at least one group (I.1)]. With respect to suitable and preferred polyethers, polyesters, polyether esters, polycarbonates, and polymers having a C—C-backbone, reference is made to what has been said above in context with polymer P. The aforementioned polyesters, polyethers, polyether esters, polycarbonates and polymers having a C—C-backbone carry at least one functional moiety of the formula (I.1), in particular from 1 to 200 or 2 to 200 or 3 to 200, especially 1 to 100 or 2 to 100 or 3 to 100, functional moieties (I.1), where the functional moieties of (I.1) may be bound either to one or more of the termini of the polymer backbone or at any other position of the polymer backbone.

The polymers P.1 carrying at least one radical of the formula (I.1) are known from the prior art cited in the introductory part of the present application or can be prepared by analogy to the methods described therein.

Polymers P.1 which are aliphatic polyethers, in particular poly(alkylene oxides), are e.g. known from U.S. Pat. Nos. 4,180,644, 4,191,706, 4,191,835, 4,247,677, 4,260,729 and US 2003212291.

Polymers P.1 which are aliphatic polyesters are e.g. known from EP 21569.

Polymers P.1 which are aliphatic polycarbonates are e.g. known from U.S. Pat. No. 5,231,149.

Preferably, polymers P.1 are obtained by reacting a polymer P' having at least one functional moiety of the formula A-Q-H attached to at least one of the termini and/or to the backbone of the polymer P' with a compound of the formulae (II) or (III)

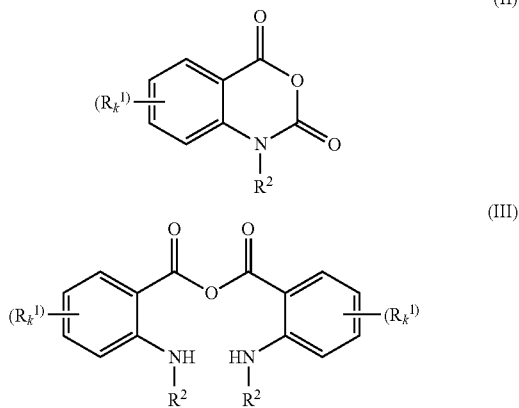

where A, Q, k, $R^1$ and $R^2$ have one of the above general, or, in particular, one of the above preferred meanings, and where the polymer P' does not have a functional group of the formula (I) or (I.1).

Examples of suitable compounds of the formula (II) are isatoic anhydride, N-methylisatoic anhydride, N-ethylisatoic anhydride, aminoisatoic anhydride, fluoroisatoic anhydride, chloroisatoic anhydride, bromoisatoic anhydride, carboxylic isatoic anhydride, nitroisatoic anhydride, hydroxyisatoic anhydride, methoxyisatoic anhydride, 1-(methylsulfonylmethyl)isatoic anhydride, (4-pyridinyl) isatoic anhydride, 1-phenyl-2H-3,1-benzoxazine-2,4(1H)-dione, chloro-1-ethyl (methyl)-2H-3,1-benzoxazine-2,4 (1H)-dione, isatoic anhydride carboxylic acid methyl ester, Examples of suitable compounds of the formula (III) are anthranilic acid anhydride.

Polymers P.1 may also be prepared by reacting a polymer P' having at least one functional moiety of the formula A-Q-H attached to at least one of the termini and/or to the backbone of the polymer P' with a anthranilic acid or an ester thereof of the formula (II')

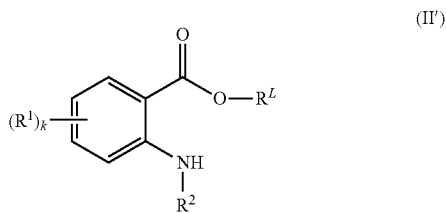

where A, Q, k, $R^1$ and $R^2$ have one of the above general, or, in particular, one of the above preferred meanings, and where the polymer P' does not have a functional group of the formula (I) and wherein $R^L$ is hydrogen or a hydrocarbon radical having 1 to 8 carbon atoms such as $C_1$-$C_6$-alkyl, phenyl, $C_3$-$C_6$-cycloalkyl or benzyl and wherein $R^L$ is preferably hydrogen or $C_1$-$C_4$-alkyl, especially hydrogen, methyl or ethyl.

The polymer P is derived from polymer P', and thus, analogously, polymer P' is preferably selected from the group consisting of polyethers, polyesters, polyether esters, polycarbonates, and polymers having a C—C-backbone [of course carrying at least one group A-Q-H], With respect to suitable and preferred polyethers, polyesters, polyether esters, polycarbonates, and polymers having a C—C-backbone, reference is made to what has been said above in context with polymer P. The aforementioned polyesters, polyethers, polyether esters, polycarbonates and polymers having a C—C-backbone carry at least one functional moiety of the formula A-Q-H, in particular from 1 to 200 or 2 to 200 or 3 to 200, especially 1 to 100 or 2 to 100 or 3 to 100, functional moieties of the formula A-Q-H, where the functional moieties of the formula A-Q-H may be bound either to one or more of the termini of the polymer backbone or at any other position of the polymer backbone.

In consequence to what has been said above in context with polymer P, the polyethers P' are preferably aliphatic polyethers, the polyesters P' are preferably aliphatic polyesters, the polyether esters P' are preferably aliphatic polyether esters, the polycarbonates P' are preferably aliphatic polycarbonates, and the polymers having a C—C-backbone P' are usually formed of repeating units derived from polymerized ethylenically unsaturated monomers M (C—C repeating units) where, of course, at least one of the C—C-repeating units carries a functional moiety of the formula A-Q-H which is attached via the moiety A to a carbon atom of the C—C repeating unit which forms part of the polymer backbone and/or one or more polymer termini carry a functional moiety of the formula A-Q-H. As regards further preferred embodiments of the polyethers, polyesters, polyether esters, polycarbonates and polymers having a C—C-backbone, reference is made to the above remarks in context with polymer P.

The polyethers P' carry at least one moiety A-Q-H, in particular an OH or $NH_2$-group, e.g. from 1 to 200 or from 1 to 100 moieties of the formula (I), and in particular carry 1, 2, 3, or 4 moieties A-Q-H. In the polyethers P', the moieties A-Q-H are preferably OH or $NH_2$. The polyether P' may be linear or branched or hyperbranched.

Polyethers P' are commercially available, e.g. the Jeffamine® grades from Huntsman, the Boltorn® grades from Perstorp, the Pluriol® grades from BASF, the Pluronic® grades from BASF and the Lutensol® grades from BASF.

The polyesters P' carry at least one moiety A-Q-H, e.g. from 1 to 200 or from 1 to 100 moieties A-Q-H, and in particular carry from 1 to 50 moieties A-Q-H. In the polyesters P', the moieties A-Q-H are preferably OH or $NH_2$.

Polyesters P' are commercially available, e.g. the Boltorn® grades form Perstorp, or they can be prepared by co-condensation of aliphatic $C_2$-$C_{10}$ dicarboxylic acids or ester forming derivatives thereof with $C_2$-$C_{10}$ aliphatic diols, and optionally $C_3$-$C_{10}$ aliphatic or $C_5$-$C_{10}$-cycloaliphatic polyols having 3, 4, 5 or 6 hydroxyl groups, or by reacting lactones with hydroxyl compounds having 1, 2, 3, 4, 5 or 6 or more hydroxyl groups.

In the polyether esters P' the weight ratio of the polyester blocks and the polyether blocks is usually in the range from 1:100 to 100:1 in particular in the range from 1:10 to 10:1.

The polyether esters P' carry at least one moiety A-Q-H, e.g. from 1 to 200 or from 1 to 100 moieties A-Q-H, and in particular carry from 1 to 50 moieties A-Q-H. In the polyether esters P', the moieties A-Q-H are preferably OH or $NH_2$.

Polyether esters P' can be prepared by co-condensation of the aforementioned ester forming monomers with OH terminated polyethers such as poly-($C_2$-$C_4$-alkylene oxides), especially polyethylene oxides), polypropylene oxides) or polyethylene oxide-co-propylene oxides), where in the latter the ethylene oxide and propylene oxide repeating units may be arranged randomly or blockwise.

The poly-($C_2$-$C_4$-alkylene carbonates) P' carry at least one moiety A-Q-H, e.g. from 1 to 200 or from 1 to 100 moieties A-Q-H, and in particular carry 1, 2, 3, or 4 moieties A-Q-H. In the polycarbonates P', the moieties A-Q-H are preferably OH or $NH_2$. The aliphatic polycarbonate P' may be linear or branched or hyperbranched.

Polycarbonates P' are commercially available, e.g. the Oxymer® grades from Perstorp.

The polymers P' having a C—C-backbone carry at least one moiety A-Q-H, e.g. from 1 to 200 or from 1 to 100 moieties A-Q-H, and in particular carry 2 to 200 or 3 to 100 or 5 to 50 moieties A-Q-H.

The polymer P' is usually formed of repeating units derived from polymerized ethylenically unsaturated monomers M (hereinafter C—C repeating units), where, of course, at least one of the C—C-repeating units carries a functional moiety A-Q-H which is attached via the moiety A to a carbon atom of the C—C repeating unit which forms part of the polymer backbone and/or one or more polymer termini carry a functional moiety of the formula A-Q-H.

Principally, the monomers M forming the polymer backbone may be selected from any polymerizable ethylenically unsaturated monomers having a polymerizable C═C-double bond. Preferably, at least 95%, in particular at least 99%, based on the total weight of the monomers M used for preparing polymer P' having a C—C-backbone, are polymerizable ethylenically unsaturated monomers having exactly one polymerizable C═C-double bond.

In a preferred embodiment, at least one of the monomers forming the polymer backbone carries a group of the formula -A-Q-H attached to the polymerizable C═C-double bond.

Hence, preferably, the polymers P' having a C—C-backbone comprise at least one repeating unit of the formula (Ib), where $R^{a1}$, $R^{a2}$ and $R^{a3}$ represent inert radicals such as hydrogen or $C_1$-$C_4$-alkyl, stemming from the monomer carrying the group A-Q-H attached to the polymerizable C═C-double bond.

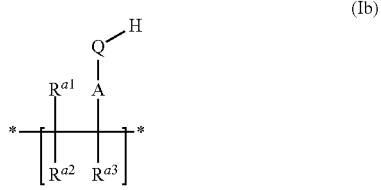

(Ib)

In formula (Ib), the variables A and Q are as defined above. The symbols * indicate the points of attachment to the carbon atoms of the adjacent C—C-repeating units and $R^{a1}$, $R^{a2}$ and $R^{a3}$ represent inert radicals such as hydrogen or $C_1$-$C_4$-alkyl, with particular preference given to $R^{a1}$ and $R^{a2}$ being hydrogen and $R^{a3}$ being hydrogen or $C_1$-$C_4$-alkyl, in particular hydrogen or methyl.

A more preferred embodiment of the invention relates to polymers P', which in addition to the repeating units of formula (Ib) comprise repeating units derived from polymerized monoethylenically monomers having no functional moiety A-Q-H.

Suitable monomers having no functional moiety A-Q-H are monoethylenically unsaturated monomers including the aforementioned monomers M1 and M3 and monomers M2, where the functional group is different from OH or $NH_2$ [as the polymerized form of monomers M2 where the functional group is OH or $NH_2$ corresponds to repeating units which fall under formula (Ib)].

Preferred monomers M1 in polymers P' are selected from $C_1$-$C_{10}$-alkyl esters of acrylic acid, $C_1$-$C_{10}$-alkyl esters of methacrylic acid, $C_1$-$C_{10}$-alkyl-(poly-$C_2$-$C_4$-alkyleneglycol) (meth)acrylates and vinylaromatic hydrocarbons, in particular styrene.

Particularly preferred embodiments of the invention relate to polymers P', which comprises repeating units derived from monomers M1, in particular repeating units derived from monomers M1, which are selected from $C_1$-$C_{10}$-alkyl (meth)acrylates, polymerized $C_1$-$C_{10}$-alkyl-(poly-$C_2$-$C_4$-alkyleneglycol) (meth)acrylates and polymerized vinylaromatic compounds such as styrene, and repeating units derived from monoethylenically unsaturated monomers M2 which have a primary amino group or a hydroxyl group. Monomers M2 having a primary amino group or a hydroxyl group are hereinafter termed monomers M2a, while monomers M2 having no primary amino group and no hydroxyl group are hereinafter termed monomers M2b.

Particularly preferred embodiments of the invention also relate to polymers P', which comprises repeating units derived from monomers M1, in particular repeating units derived from monomers M1, which are selected from $C_1$-$C_{10}$-alkyl (meth)acrylates, polymerized $C_1$-$C_{10}$-alkyl-(poly-$C_2$-$C_4$-alkyleneglycol) (meth)acrylates and polymerized vinylaromatic compounds such as styrene, and repeating units derived from monomers M2a, in particular from monomers M2a selected from the group consisting of hydroxy-$C_2$-$C_4$-alkyl esters of $C_3$-$C_6$-monocarboxylic acids, N-(hydroxy-$C_2$-$C_4$-alkyl) amides of $C_3$-$C_6$-monocarboxylic acids, amino-$C_2$-$C_4$-alkyl esters of $C_3$-$C_6$-monocarboxylic acids and N-(amino-$C_2$-$C_4$-alkyl) amides of $C_3$-$C_6$-monocarboxylic acids.

Amongst polymers P', particular preference is given to those where the repeating units derived from monomers M1 make up from 10 to 90% by weight, in particular from 30 to 80% by weight of the polymer P'.

Particularly preferred polymers P' comprise
- 10 to 90% by weight, in particular from 30 to 80% by weight of the polymer P' of repeating units derived from monomers M1;
- 10 to 80% by weight, in particular from 20 to 60% by weight of the polymer P' of repeating units derived from monomers M2a;
- 0 to 80% by weight, in particular from 0 to 50% by weight of the polymer P' of repeating units derived from monomers M2b;
- 0 to 20% by weight, in particular from 0 to 10% by weight of the polymer P' of repeating units derived from monomers M3.

Preference is given to polymers P' which have s a number average molecular weight $M_N$ in the range from 500 to 100.000 g/mol, in particular from 800 to 80.000 g/mol, especially from 1000 to 50.000 g/mol. The weight average molecular weight $M_w$ of the polymers P' is generally the range from 600 to 500.000 g/mol, in particular from 1000 to 300.000 g/mol, especially from 1200 to 150.000 g/mol. The polydispersity $M_w/M_n$ of polymers P' is generally in the range from 1.05 to 5, preferably from 1.1 to 4 and especially from 1.2 to 3.

Polymers P' having a C—C-backbone and carrying at least one group A-Q-H are known, and commercially available, e.g. the Acryflow grades of Lyondell Chem or can be prepared by radical homo- or copolymerization of suitable monomers, e.g. of monomers M1 and M2a, in the presence of suitable initiators and optionally regulators. Suitable polymers P' are e.g. known from WO 00/40630, WO 03/046029, WO 2006/074969, WO 2011/120947.

The amount of the compound (II), (II') or (III) is generally chosen such that the molar ratio of the compound (II), (II') or (III) to the amount of groups A-Q-H in polymer P' is from 10:1 to 1:10, in particular from 5:1 to 1:5, especially from 3:1 to 1:3.

The reaction of the polymer P' with the compound of formulae (II), (II') or (III) is generally performed in the presence of a suitable catalyst which promotes the reaction of the groups A-Q-H with the carbonyl groups in (II), (I') or (III). Suitable catalysts include bases, e.g. alkali metal hydroxides such as sodium or potassium hydroxide, alkali metal carbonates such as sodium or potassium carbonate, tertiary amines, e.g. tri-$C_1$-$C_6$-alkylamines such as triethylamine, tripropylamine, tributylamine, dimethylpropylamine, dimethylbutylamine, dimethyl-isopropylamine, di-$C_1$-$C_6$-alkyl-$C_5$-$C_6$-cycloalkylamines such as dimethylcyclohexylamine, or basic nitrogen-containing heterocycles, such as piperidine, morpholine, pyridine, di-$C_1$-$C_6$-alkylpyridines, such as the lutidines, or di-$C_1$-$C_6$-alkylaminopyridines, such as 4-dimethylaminopyridine, and tin compound catalysts, such as dibutyltindioctoate and dibutyltindilaurate.

The amount of catalyst is generally from 0.01 to 2% by weight, in particular from 0.1 to 1% by weight, based on the total amount of polymer P and the compound of formula (II), (II') or (III).

The reaction of the polymer P' with the compound of formula (II), (II') or (III) is generally performed at temperatures ranging from 60 to 180° C., in particular from 80 to 140° C.

The reaction of the polymer P' with the compound of formula (II), (II') or (III) may be performed in bulk or in solvent. Suitable solvents are those with are inert under reaction conditions, examples including esters, hydrocarbons and mixtures thereof. Preferably, the reaction is performed in bulk, i.e. the concentration of the reactants is at least 90% by weight, based on the weight of the reaction mixture.

Polymers P, which in addition to the functional moieties of the formula (I) have one ore more poly-($C_2$-$C_4$-alkyleneoxide) radicals grafted onto the polymer backbone, can be prepared by using suitable polymers P' having one or more poly-($C_2$-$C_4$-alkyleneoxide) radicals which are grafted onto the polymer backbone. Preferably, such polymers P' are prepared by reacting a polymer P' having $C_1$-$C_{10}$-alkylester moieties, e.g. moieties of polymerized $C_1$-$C_{10}$-alkyl(meth) acrylates, with a poly-($C_2$-$C_4$-alkyleneglycol), in particular an "end capped" poly-($C_2$-$C_4$-alkyleneglycol) (i.e. a poly-($C_2$-$C_4$-alkyleneglycol) in which only one terminus is an OH group, the other being generally etherified), in particular a mono-$C_1$-$C_{10}$-alkyl poly-($C_2$-$C_4$-alkyleneglycol). Thereby, at least some of the $C_1$-$C_{10}$-alkylester moieties are converted into poly-($C_2$-$C_4$-alkyleneglycol) ester moieties, i.e. moieties, where the poly-($C_2$-$C_4$-alkyleneglycol) is attached to the polymer backbone via a carbonyl group.

The neutralization the reaction product of step b) in step c) is carried out with an oligomeric or polymeric amine PA as defined herein. Suitable and preferred oligomeric or polymeric amines PA are those listed above in context with polymer P.

The neutralization reaction is preferably carried out by mixing the polymer P and the amine PA.

Preferably, the oligomeric or polymeric amine PA is used in such an amount that the molar ratio of amino groups in PA to the COOH groups in polymer P are in the range of from 1:3 to 3:1, more preferably in the range of from 1:2 to 2:1, in particular from 1.5:1 to 1:1.5, specifically approximately 1:1. "Approximately" in this context means to include deviations from this molar ratio due, for example, to weighing errors or impurities in the starting materials. The deviations do generally not exceed 10%, and preferably do not exceed 5%.

Preferably, the reaction is carried out at a temperature in the range of from 0 to 120° C., more preferably in the range of 50 to 100° C.

The neutralization reaction can be carried out both without an external solvent or with an external solvent. Preferably, the reaction is carried out in absence of an external solvent, especially if at least one of the components to be reacted (i.e. polymer P and/or the oligomeric or polymeric amine PA) is liquid at the desired reaction temperature, e.g. if it is liquid at room temperature (and the reaction is to be carried out at room temperature or higher) or can be liquefied by heating in the above-indicated temperature range, e.g. by heating to 30 to 120° C. or to 50 to 100° C. "External solvent" in this context means a solvent different from polymer P and amine PA. Suitable external solvents are those which ideally dissolve both components. If the components are not to be dissolved in the same solvent, the components can be dissolved in different solvents and then the two solutions can be mixed. Examples for suitable solvents are aromatic solvents, such as toluene, the xylenes or commercial mixtures such as Solvesso® 200, Aromatic® 200 or Caromax® 28, (cyclo)aliphatic solvents, e.g. alkanes or cycloalkanes, also as liquid paraffin mixtures, (cyclo) aliphatic ethers, e.g. diethyl ether, methyl tert-butyl ether, methyl isobutyl ether, tetrahydrofuran or dioxan, esters, like ethyl acetate, and the like. If a solvent is used, this is generally removed after completion of the reaction, e.g. by evaporation, distillation or, if the obtained salts precipitate, by filtration.

Liquid Compositions

The invention also relates to liquid compositions of fine particulate solids, which contain the polymer composition of the invention as a dispersant. To be more precise, the invention relates to a liquid composition in the form of a dispersion comprising a fine particulate solid material, a liquid diluent, wherein the fine particulate solid material is dispersed in the liquid diluent, and the polymer composition of the invention.

Suitable fine particulate solid materials include, but are not limited to, the group consisting of pigments, fillers and mixtures thereof. Pigments may be inorganic or organic. Pigments include colored pigments, luster pigments and pearlescents.

The size of the fine particulate material is preferably in the micrometer range, e.g. the weight average particle diameter may range from 0.1 µm to 500 µm, more preferably from 0.2 µm to 100 µm, in particular from 0.5 µm to 50 µm. The weight average particle diameter is usually determined by light scattering methods, e.g. by the method of ISO 13320: 2009. The weight average particle diameter may be also be determined by sieving analysis.

The polymer compositions according to the invention can be used as dispersant in a broad application fields, such as coatings, inks, electronic materials, especially in low temperature and low viscosity applications. The polymer compositions can be used in solvent based systems such as in solvent based organic and inorganic pigments dispersion e.g. in alkyd, CAB (cellulose acetate butyrate), UV (Ultraviolet) and TPA (thermoplastic acrylate) paint systems, in general industrial coatings especially in automotive coatings, as well as in printing inks and graphic arts.

Examples of suitable organic pigments are pigments and pearlescent flakes selected from the group consisting of azo, disazo, naphthol, benzimidazolone, azocondensation, metal complex, isoindolinone, and isoindoline pigments, the chinophthalon pigment, dioxazine pigment and the polycyclic pigment group consisting of indigo, thioindigo, quinacridones, phthalocyanines, perylenes, perionones, anthraquinones, such as aminoanthraquinones or hydroxyanthraquinones, anthrapyrimidines, indanthrones, flavanthrones, pyranthrones, anthantrones, isoviolanthrones, diketopyrrolopyrrole, and carbazoles, e.g. carbazole violet, and the like. Further examples of organic pigments can be found in the monograph W. Herbst, K. Hunger "Industrielle Organische Pigmente" $2^{nd}$ Edition, 1995, VCH Verlagsgesellschaft, ISBN: 3-527-28744-2.

Representative examples of organic pigments are:
Monoazo pigments: C.I. Pigment Yellow 1, 3, 62, 65, 73, 74, 97, 183 and 191; C.I. Pigment Orange 5, 38 and 64; C.I. Pigment Red 1, 2, 3, 4, 5, 23, 48:1, 48:2, 48:3, 48:4, 49, 49:1, 51, 51:1, 52:1, 52:2, 53, 53:1, 53:3, 57:1, 58:2, 58:4, 63, 112, 146, 148, 170, 184, 187, 191:1, 210, 245, 247 and 251;
Disazo pigments: C.I. Pigment Yellow 12, 13, 14, 16, 17, 81, 83, 106, 113, 126, 127, 155, 170, 174, 176 and 188; C.I. Pigment Orange 16, 34 and 44;
Disazocondensation pigments: C.I. Pigment Yellow 93, 95 and 128; C.I. Pigment Red 144, 166, 214, 220, 221, 242 and 262; C.I. Pigment Brown 23 and 41;
Anthanthrone pigments: C.I. Pigment Red 168;
Anthraquinone pigments: C.I. Pigment Yellow 147 and 199; C.I. Pigment Red 177;
Anthrapyrimidine pigments: C.I. Pigment Yellow 108;
Benzimidazolone pigments: C.I. Pigment Yellow 120, 151, 154, 180, 181; C.I. Pigment Orange 36 and 72, C.I. Pigment Red 175, 185, 208; C.I. Pigment Brown 25; C.I. Pigment Violet 32;
Chinacridone pigments: C.I. Pigment Orange 48 and 49; C.I. Pigment Red 122, 202, 206 and 209; C.I. Pigment Violet 19;
Chinophthalone pigments: C.I. Pigment Yellow 138;
Diketopyrrolopyrroles pigments: C.I. Pigment Orange 71, 73 and 81; C.I. Pigment Red 254, 255, 264, 270 und 272;
Dioxazine pigments: C.I. Pigment Violet 23;
Flavanthrone pigments: C.I. Pigment Yellow 24;
Indanthrone pigments: C.I. Pigment Blue 60 and 64;
Isoindoline pigments: C.I. Pigment Yellow 139 and 185; C.I. Pigment Orange 61 and 69, C.I. Pigment Red 260;
Isoindolinone pigments: C.I. Pigment Yellow 109, 110 and 173;
Isoviolanthrone pigments: C.I. Pigment Violet 31;
Metalcomplex pigments: C.I. Pigment Red 257; C.I. Pigment Yellow 117, 129, 150, 153 und 177; C.I. Pigment Green 8;
Perinone pigments: C.I. Pigment Orange 43; C.I. Pigment Red 194;
Perylene pigments: C.I. Pigment Red 123, 149, 178, 179 and 224; C.I. Pigment Violet 29; C.I. Pigment Black 31 and 32;
Phthalocyanin pigments: C.I. Pigment Blue 15, 15:1, 15:2, 15:3, 15:4, 15:6, 16; C.I. Pigment Green 7, 36;
Pyranthrone pigments: C.I. Pigment Orange 51; C.I. Pigment Red 216;
Pyrazolochinazolone pigments: C.I. Pigment Orange 67 and C.I. Pigment Red 216;
Thioindigo pigments: C.I. Pigment Red 88 and 181; C.I. Pigment Violet 38;
Triarylcarbonium pigments: C.I. Pigment Red 81, 81:1 and 169; C.I. Pigment Violet 1, 2, 3 and 27; C.I. Pigment Blue 1, 61 and 62; C.I. Pigment Green 1;
C.I. Pigment Black 1 (Aniline black);
C.I. Pigment Yellow 101 (Aldazine yellow);
C.I. Pigment Brown 22.
Suitable inorganic pigments are for example
white pigments such as titanium dioxide (C.I. Pigment White 6) including crystal forms or modifications thereof, such as rutil or anatas, zinc oxide, zinc sulphide, zinc phosphate, lithopone;
black pigments: iron oxide black (C.I. Pigment Black 11), iron-manganese black, spinel black (C.I. Pigment Black 27); carbon black (C.I. Pigment Black 7); graphite (C.I. Pigment Black 10); chromium-iron-black (P. Brown 29);
inorganic colored pigments: chrome oxide, chrome oxide hydrate green; chrome oxide green (C.I. Pigment Green 48); cobalt green (C.I. Pigment Green 50); ultramarine green; cobalt blue (C.I. Pigment Blue 28 und 36; C.I. Pigment Blue 72); ultramarine blue; blue manganese; ultramarine violet; cobalt- and manganese violet; red iron oxide (C.I. Pigment Red 101); cadmium sulfoselenides (C.I. Pigment Red 108); cerium sulfide (C.I. Pigment Red 265); molybdenum red (C.I. Pigment Red 104); ultramarine red; brown iron oxide (C.I. Pigment Brown 6 und 7), mixed brown, spinel phases and corundum phases (C.I. Pigment Brown 29, 31, 33, 34, 35, 37, 39 und 40), chromium titanium yellow (CI Pigment Brown 24), chrome orange; cerium sulfide (C.I. Pigment Orange 75); yellow iron oxide (CI Pigment Yellow 42); nickel titanium yellow (C.I. Pigment Yellow 53; C.I. Pigment Yellow 157, 158, 159, 160, 161, 162, 163, 164 und 189); Chromium titanium yellow; Spinel phases (CI Pigment Yellow 119); Cadmium sulfide and cadmium zinc sulfide (CI Pigment Yellow 37 and 35); Chrome yellow (CI Pigment Yellow 34); Bismuth vanadate (CI Pigment Yellow 184).

The luster pigments are single-phase or multi-phase construction lamellar pigments whose color play is characterized by the interplay of interference, reflection and absorption phenomena. Examples are aluminum platelets and one or more times, especially of metal oxides coated aluminum, iron oxide and mica platelets.

Suitable fillers are calcium carbonate, such as natural and precipitated chalksilicon dioxides, such as quartz powder and transparent silicon dioxide, silicates, glass fibres, glass beads, talc, kaolin, natural and synthetic mica, barium sulphate, metal oxides and hydroxides, such as aluminium oxide and aluminium hydroxide, carbon black, graphite, wood powders, powders and fibres of other natural products, synthetic fibres.

The liquid diluent present in the dispersion will depend on the field of application in a known manner. The polymer composition of the invention is suitable as dispersant for fine particulate materials both in aqueous and non-aqueous media. Thus, both aqueous and organic solvent diluents are principally suitable. The dispersants of the invention are particular useful in dispersions where the diluent is selected from commonly used solvents in coatings technology. For water based formulations the diluent comprises water and may, aside from water, further comprise polar, water-miscible solvents such as $C_1$-$C_4$ alkanols, e.g. methanol, ethanol, isopropanol, propanol or n-butanol, glycol ethers like butyl glycol, or methoxypropylene glycol, polyols, e.g. glycerol, ethyleneglycol, diethyleneglycol, triethylene, triethylene glycol or propylene glycol. For (organic) solvent based formulations, preferably less polar solvents like aliphatic hydrocarbons, esters like butyl acetate, or glycol ethers like methoxypropylene glycol or glycol ether esters like methoxypropylene glycol acetate are used and mixtures thereof are used as liquid diluents.

Preferably, the weight ratio of fine particulate solid material to the polymer composition of the invention, the amount of polymer composition being calculated as solids content of the polymer composition, in the liquid composition preferably ranges from 100:1 to 1:50, preferably from 30:1 to 1:10, more preferably from 20:1 to 1:5, in particular from 10:1 to 1:2.

The polymer compositions of the invention are particularly useful as a dispersant in an aqueous pigment composition, in particular in aqueous concentrate pigment compositions, which shall be used as a colorant for pigment containing coating compositions, e.g. in point of sale colorant or tinting systems as described in U.S. Pat. No. 5,340,394, US 2006/0207476, WO 2011/151277 or WO 2014/000842.

Therefore, the liquid composition of the invention is preferably an aqueous pigment composition, comprising the polymer composition of the invention, a pigment material and an aqueous diluent.

The term "pigment material", as used in this context, includes both pigments and fillers, i.e. pigments, fillers and mixtures of pigments and fillers. In the aqueous pigment composition of the invention, the pigment material is preferably selected from the group consisting of pigments and mixtures of at least one pigment and at least one filler. Suitable pigments and fillers are described above.

Generally, the aqueous pigment composition of the invention contains 1 to 70% by weight, preferably 10 to 70% by weight, in particular 20 to 50% by weight, based on the total weight of the composition, of the pigment material.

In the aqueous pigment composition of the invention the weight ratio of pigment material to polymer composition, calculated in each case as solids, is frequently in the range of from 100:1 to 1:50, preferably from 30:1 to 1:10, more preferably from 20:1 to 1:5, in particular from 10:1 to 1:2.

The concentration of the polymer composition, calculated as solids and based on the total weight of the composition, is generally in the range from 0.5 to 50% by weight, preferably 1 to 30% by weight, in particular from 2 to 20% by weight.

The aqueous diluent present in the aqueous pigment composition of the invention will depend on the field of application in a known manner. As already said above, besides water, the aqueous diluent may comprise polar, water-miscible solvents, such as $C_1$-$C_4$ alkanols, e.g. methanol, ethanol, isopropanol, propanol or n-butanol, glycol ethers like butyl glycol, or methoxypropylene glycol, polyols, e.g. glycerol, ethyleneglycol, diethyleneglycol, triethylene, triethylene glycol or propylene glycol. Frequently, water is the sole solvent.

The amount of water in the aqueous composition is frequently in the range of 1 to 98.5% by weight, preferably 20 to 89% by weight, more preferably 20 to 88% by weight, in particular 30 to 78% by weight, based on the total weight of the liquid composition.

The aqueous pigment composition of the invention preferably contains at least one humectant. Suitable humectants include polyethylene glycols, polypropylene glycols and poly(ethyleneoxide-co-propylenoxides), which generally have a number average molecular weight in the range from 200 to 1000 g/mol. The concentration of humectant will generally not exceed 30% by weight, in particular 20% by weight, and, if present, is frequently in the range from 0.1 to 30% by weight, in particular in the range from 1 to 20% by weight and especially in the range from 2 to 15% by weight.

Preferably, the liquid composition of the invention comprises
i) 1 to 70% by weight, based on the total weight of the liquid composition, of at least one fine particulate solid material (which is in particular at least one pigment or at least one filler or a mixture of at least one pigment and at least one filler);
ii) 0.5 to 50% by weight, based on the total weight of the liquid composition, of the polymer composition of the invention, where the amount is calculated as solids contained in the polymer composition;
iii) optionally up to 30%, based on the total weight of the liquid composition, of a humectant; and
iv) 1 to 98.5% by weight, based on the total weight of the liquid composition, of at least one liquid diluent (in particular at least one aqueous diluent).

More preferably, the liquid composition of the invention comprises
i) 10 to 70% by weight, based on the total weight of the liquid composition, of at least one fine particulate solid material (which is in particular at least one pigment or at least one filler or a mixture of at least one pigment and at least one filler);
ii) 1 to 30% by weight, based on the total weight of the liquid composition, of the polymer composition of the invention, where the amount is calculated as solids contained in the polymer composition;
iii) optionally up to 30%, based on the total weight of the liquid composition, of a humectant; and
iv) 20 to 89% by weight, based on the total weight of the liquid composition, of at least one liquid diluent (in particular at least one aqueous diluent).

In particular, the liquid composition of the invention comprises
i) 20 to 50% by weight, based on the total weight of the liquid composition, of at least one fine particulate solid material (which is in particular at least one pigment or at least one filler or a mixture of at least one pigment and at least one filler);
ii) 2 to 20% by weight, based on the total weight of the liquid composition, of the polymer composition of the invention, where the amount is calculated as solids contained in the polymer composition;
iii) optionally up to 20%, based on the total weight of the liquid composition, of a humectant; and
iv) 30 to 78% by weight, based on the total weight of the liquid composition, of at least one liquid diluent (in particular at least one aqueous diluent).

The aqueous pigment composition of the invention is frequently formulated in a manner that it has a low VOC content and/or a low SVOC content. The term "low VOC content", as used herein refers to compositions wherein the concentration of low volatile organic compounds, as determined in accordance with DIN ISO 11890-2, is less than 1000 ppm. The term "low SVOC content" as used herein refers to compositions wherein the concentration of moderate volatile organic compounds, as determined in accordance with DIN ISO 11890-2 is less than 5000 ppm.

For preparing the aqueous pigment composition of the invention, the pigment material is usually dispersed in the aqueous diluent in the presence of the polymer composition of the invention. Dispersion can be achieved by using conventional techniques, such as high speed mixing, ball milling, sand grinding, attritor grinding or two or three roll milling. The resulting aqueous pigment composition may have a pigment to dispersant weight ratio in the above range.

The aqueous pigment composition is frequently formulated as a pigment paste. Such a pigment paste contains the pigment material, the polymer composition of the invention and an aqueous diluent and optionally additives, e.g. those listed above, but generally it will not contain binders.

The liquid compositions of the invention, especially the aqueous pigment compositions, provide for good application properties such as high color strength, and good dispersibility in a multitude of liquid compositions. They are particularly useful as universal pigment preparations for tinting both solvent borne coating compositions and water-borne coating compositions. Hence, the compositions are compatible both with aqueous latex paints and silicate paints and also with solvent borne paints. The resulting paints have high color strength and do not show color change in the rub out-test, as described in DE 2202527.

Moreover, the liquid compositions of the invention, especially the aqueous pigment compositions, provide for good dosage accuracy when tinting both solvent borne coating compositions and water-borne coating compositions. The compositions of the invention are stable and do not adhere to the interiors of the dosage machine and the valves and therefore ensure a consistent coloristic.

Suitable coating compositions which can be colored with the liquid compositions of the invention, especially with the aqueous pigment compositions, include architectural coatings, industrial coatings, automotive coatings, radiation-curable coatings; paints, including paints for building exteriors and building interiors, for example wood paints, lime washes, distempers and emulsion paints. They can also be used for coloring solvent borne printing inks, for example offset printing inks, flexographic printing inks, toluene gravure printing inks, textile printing inks, radiation-curable printing inks; waterborne inks, including inkjet inks and color filters.

The liquid compositions of the invention, especially the aqueous pigment compositions, are particularly useful as mixing components in color-mixing or -matching systems. Owing to their stir-in characteristics, they can be used directly as a pigment paste for this purpose. If desired, however, they can also be first converted into base colors, mixing varnishes and tinting colors (especially into colors having a high solids content, "HS colors"). The matching of the desired hue and hence the mixing of the color components can be effected visually via a system of color cards in a very large number of hue gradations which are based on color standards, such as RAL, BS and NCS, or preferably under computer control, whereby an unlimited number of hues become accessible ("computer color matching").

As explained above, the liquid compositions of the invention, especially the aqueous pigment compositions, may be included into a coating composition. Such a coating composition contains the pigment material, the polymer composition, a liquid diluent and additionally one or more binders, e.g. film-forming polymers or prepolymers which form a film upon curing. Coating composition may optionally contain conventional additives customarily used in coating technology, e.g. plasticizers, lubricants, emulsifiers, surfactants, rheology additives, catalysts, flow auxiliaries, optical brighteners, flame retardants, preservatives, antistatic agents or blowing agents.

Suitable binders are those customarily used, for example, the ones described in Ullmann's Encyclopedia of Industrial Chemistry, $5^{th}$ Edition, Vol. A18, pp. 368-426, VCH, Weinheim 1991, Germany. In general, the film-forming binder is based on a thermoplastic or thermosetting resin, predominantly on a thermosetting resin. Examples thereof are alkyd, acrylic, polyester, phenolic, melamine, epoxy and polyurethane resins and mixtures thereof.

Resins curable by radiation or air-drying resins can also be used. Binders may be also derived from polyvinylalcohol and polyvinylbutyral.

If cold- or hot-curable binders are used, the addition of a curing catalyst may be advantageous. Suitable catalysts that accelerate the curing of binders are described, for example, in Ullmann's, Vol. A18, loc. cit., p. 469.

Examples of coating compositions containing cold- or hot-curable binders are:

Paints based on cold- or hot-cross linkable alkyd, acrylate, polyester, epoxy or melamine resins or mixtures of such resins, if desired with addition of a curing catalyst;

Two-component polyurethane paints based on hydroxyl-containing acrylate, polyester or polyether resins and aliphatic or aromatic isocyanates, isocyanurates or polyisocyanates;

One-component polyurethane paints based on blocked isocyanates, isocyanurates or polyisocyanates which are deblocked during baking, if desired with addition of a melamine resin;

One-component polyurethane paints based on a tri-salkoxycarbonyl triazine cross linker and a hydroxyl group containing resin, such as acrylate, polyester or polyether resins;

One-component polyurethane paints based on aliphatic or aromatic urethane acrylates or polyurethane acrylates having free amino groups within the urethane structure and melamine resins or polyether resins, if necessary with curing catalyst;

Two-component paints based on (poly)ketimines and aliphatic or aromatic isocyanates, isocyanurates or polyisocyanates;

Two-component paints based on (poly)ketimines and an unsaturated acrylate resin or a polyacetoacetate resin or a methacrylamidoglycolate methyl ester;

Two-component paints based on carboxyl- or amino-containing polyacrylates and polyepoxides;

Two-component paints based on acrylate resins containing anhydride groups and on a polyhydroxy or polyamino component;

Two-component paints based on acrylate-containing anhydrides and polyepoxides;

Two-component paints based on (poly) oxazolines and acrylate resins containing anhydride groups, or unsaturated acrylate resins, or aliphatic or aromatic isocyanates, isocyanurates or polyisocyanates;

Two-component paints based on unsaturated polyacrylates and polymalonates;

Thermoplastic polyacrylate paints based on thermoplastic acrylate resins or externally cross linking acrylate resins in combination with etherified melamine resins; and Paint systems based on siloxane-modified or fluorine-modified acrylate resins.

Another aspect of the invention is the use of the polymer composition of the invention as a dispersant, in particular for fine particulate solid material, selected from the group consisting of pigments, fillers and mixtures thereof. Preferred is the use of the polymer compositions of the invention as a dispersant for fine particulate solid material, selected from the group consisting of pigments, fillers and mixtures thereof, in an aqueous pigment composition, in particular in an aqueous concentrate pigment composition, which can be used as a universal pigment composition in point of sale tinting systems.

Besides being used as a dispersant, the polymer composition of the present invention may also be used as a crosslinking agent, as a rheology modifier, as an impact modifier, as a chain extender or as a building block for the preparation of block- or graft-copolymers.

Thus, another aspect of the invention relates to the use of the polymer composition of the invention as a crosslinking agent, as a rheology modifier, as an impact modifier, as a chain extender or as a building block for the preparation of block- or graft-copolymers.

Another aspect of the invention is the use of the liquid composition of the present invention, as a colorant for both waterborne coatings and solvent borne coatings in a point of sale system or in in-plant tinting.

The invention is now further illustrated by the following examples.

EXAMPLES

Abbreviations
CA for cyclic anhydride
EO for ethylene oxide
IA for isatoic anhydride
MPEG for methoxy polyethylene glycol)
MPEG-OH for polyethylene glycol) monomethyl ether
SSA for succinic anhydride Materials
Lupasol® PR8515: Branched polyethyleneimine having a $M_w$ of 2000 g/mol (BASF SE, Ludwigshafen, Germany)
Sokalan® HP20: Ethoxylated polyethyleneimine, PEI (600) 20EO (BASF SE)
Lupamin® 1595: Polyvinylamine (BASF SE)
Lutensol® ON30: Alkyl polyethylene glycol ethers with an OH number of 190 mg KOH/g (BASF SE)
Dehypound LLD 60: Blend of anionic and nonionic surfactants and emulsifiers (BASF SE)
Hexamoll® DINCH®: Diisononyl cyclohexane-1,2-dicarboxylate (BASF SE)
Lutensol® ON 110: $C_{10}$—Oxo alcohol ethoxylate with 11 EO units (BASF SE)
Lutensol® AT 11: $C_{16-18}$-fatty alcohol ethoxylate with 11 EO units (BASF SE)
Pluriol® A500 E: Polyethylenglycol with $M_n$=500 g/mol (BASF SE)
Epomin® SP-018: Polyethyleneimine with $M_n$=1800 g/mol (Nippon Shokubai)
Glissopal® SA F: Polyisobutylene succinic anhydride with $M_n$=2000 g/mol (BASF SE)
Lupasol® EO: Polyetheramine polyols with OH number of 610 mg KOH/g (BASF SE)
EFKA® 2550: a modified polydimethylsiloxane; defoamer; from BASF
PEG 200: polyethylene glycol with a molecular weight of ca. 200
PV23: Pigment Violet 23 Hostaperm Violet RL-NF; a pigment from Clariant
ASP 170: hydrous pulverized kaolin; a filler from BASF Methods
Amine Number
The amine number was determined according to DIN 53176:2002-11.
Acid Number
The acid number was determined according to DIN 53402:1990-09.
Viscosity
Viscosity was determined by analogy to DIN 53019-1: 2008-09, using a Thermo-Haake RheoStress 600 equipment under the CR mode at 22° C. and a shear rate of 1 $sec^{-1}$ (Spindle CP50).
Gloss
The gloss of the obtained coatings at 20° angle was determined according to DIN 67530/DIN EN ISO 2813: 2012-10 using a commercial reflectometer (Micro-Tri-Gloss reflectometer from BYK Gardner).

The degree of polymerization in block copolymers is expressed below as x-b-z or as (x-y)-b-z. b stands for block, x and y for the degrees of polymerization of monomers in one block and z for the degree of polymerization of the monomer in the second block. For instance, degree of polymerization of poly[(nBA-i$C_{12-15}$A)-b-4VP]=(16-60)-b-14 means that the copolymer is a block copolymer containing in polymerized form in one polymer block n-butyl acrylate with a degree of polymerization of 16 and iso-$C_{12}$-$C_{15}$-alkyl acrylate with a degree of polymerization of 60 and in the second block 4-vinylpyridine with a degree of polymerization of 14.

Number Average Molecular Weight ($M_n$)
Mn is determined according to DIN55672-1: gel permeation chromatography using a refractometer as the detector. The mobile phase used was tetrahydrofuran (THF, 1 mL/min, 35° C.), the standard employed for determining the molecular weight being polystyrene (PS).

Synthesis

Intermediates A are polymers P and intermediates B are oligomeric or polymeric amines PA.

Intermediate A1
A mixture of 50.0 g (0.1 mol OH) of Pluriol® A500 E, 16.3 g (0.1 mol) of isatoic anhydride (IA) and 0.2 g (0.3 wt.-%) of 4-dimethylaminopyridine were heated to 80 to 140° C. until no more $CO_2$ was evolved. Then, 10.0 g (0.1 mol) of succinic anhydride (SSA) was added and the reaction mixture was heated at 80° C. for an additional 3 hours. The obtained product was a yellowish liquid with an acid number of 75 mg KOH/g.

Intermediates A2
Intermediate A2 was prepared in a similar manner as Intermediate A1, except that the type of OH functionalized polymer, the type of cyclic anhydride (CA) and the ratio of OH group to isatoic anhydride (IA) and the cyclic anhydride (CA) were as follows:
Functionalized polymer (OH): Lutensol®AT11
OH number: ca. 75 mg KOH/g
Cyclic anhydride (CA): SAA
Molar ratio: OH to IA to CA: 1:1:1
Acid number: 60 mg KOH/g Intermediates A2 and A3
Intermediate A3 was prepared in a similar manner as Intermediate A1, except that the type of OH functionalized polymer, the type of cyclic anhydride (CA) and the ratio of OH group to isatoic anhydride (IA) and the cyclic anhydride (CA) were as follows:

Functionalized polymer (OH): Lutensol®ON110
OH number: 90 mg KOH/g
Cyclic anhydride (CA): Maleic anhydride
Molar ratio: OH to IA to CA: 1:1:1
Acid number of the resulting polymer: 65 mg KOH/g
Intermediate B1

As intermediate B1, commercially available Lupasol® PR 8515, a branched polyethyleneimine having a $M_w$ of 2000 g/mol, was used.
Intermediate B2

As intermediate B2, commercially available Sokalan HP20 was used.
Intermediate B3:

Epomin SP-018 (6.45 g), caprolactone (60.0 g), valerolactone (40.0 g), 12-hydroxystearic acid (15.0 g) and dibutyltin dilaurate (0.12 g) were heated at 170° C. for 15.0 h. The obtained product was an amber liquid with an acid number of 2.9 mg KOH/g.
Intermediate B4

As intermediate B4, commercially available Lupamin 1595 was used.
Intermediate B5

As intermediate B5, commercially available Lupasol EO was used.
Intermediate B6

A mixture of 50 g of Lupasol EO and 60 g of Glissopal SA F was heated at 80° C. under $N_2$ gas for 6 hours. The obtained product was a viscous yellowish liquid with an amine number of 190 mg KOH/g.
Intermediate B7

A mixture of 45 g Lupasol EO and 55 g lauric acid was heated at 170° C. under $N_2$ gas until the acid number was lower than 10 mg KOH/g. The obtained product was a yellowish wax with an amine number of 180 mg KOH/g.
Intermediate B8

A mixture of 45 g of Lupasol EO and 55 g of tall oil fatty acid was heated at 170° C. under $N_2$ gas until the acid number was lower than 10 mg KOH/g. The obtained product was a yellowish liquid with an amine number of 180 mg KOH/g.
Intermediate B9

A mixture of 15 g Lupasol EO, 45 g of ε-caprolactone, 20 g of γ-valerolactone and 0.1 g of dibutyltin dilaurate (DBTL) was heated at 170° C. until the solid content was higher than 97%. Then, 10 g of 12-hydroxyl stearic acid were added and heated at 170° C. until the acid number was lower than 10 mg KOH/g. The obtained product was a yellowish liquid with an amine number of 69 mg KOH/g.
Intermediate B10

A mixture of 70 g of Lupasol EO and 20 g of isatoic anhydride was slowly heated up to 130° C. and keep at 130° C. until no more $CO_2$ gas was formed. The obtained product was a yellowish viscous liquid with an amine number of 390 mg KOH/g.
Intermediate B11

A mixture of 50 g of Intermediate B8 and 5 g of succinic anhydride was heated at 100° C. until the acid number reached 55 mg KOH/g. The obtained product was a yellowish liquid with an amine number of 165 mg KOH/g.
Intermediate B12

Step 1: Synthesis of a Linear Polymer Poly(BA)
[Poly(n-Butylacrylate)]

In a 3-necked 1000 ml round bottom flask with magnetic stirring bar, cooler, thermometer and dropping funnel, 150.10 g of n-butylacrylate (n-BA, 128.17 g/mol), 8.55 g of 2,6-diethyl-2,6-dimethyl-1-(1-phenylethoxy)piperidin-4-one (317.48 g/mol) and 122.13 g of methoxypropylacetate were added, three times degassed with $N_2$/vacuum and polymerized at 135° C. under $N_2$ until a conversion of around 8 mol % was reached. 338.89 g of n-BA was slowly added to the reaction with the dropping funnel and polymerized at 135° C. under $N_2$ until a conversion of around 48 mol %. Residual monomers and solvents were distilled off at 80° C. and 12 mbar.

The obtained product was a liquid, the yield was 47%.
Analysis: GPC (THF, PS-Standard): $M_n$=7800 g/mol, PD=1.27; $^1$H-NMR: degree of polymerization=75.

Step 2: Synthesis of a Linear Block Copolymer
poly(n-BA-b-4VP) (n-butylacrylate 4-vinylpyridine
Block Copolymer)

In a 3-necked 500 ml round bottom flask with magnetic stirring bar, cooler and thermometer 214.18 g of poly(n-BA) of step 1, 70.90 g of 4-vinyl pyridine (4-VP, 105.14 g/mol) and 79.70 g of methoxypropylacetate were added, three times degassed with $N_2$/vacuum and polymerized at 125° C. under $N_2$ for 8 h. Residual monomers and solvents were distilled off at 80° C. and 12 mbar.

The obtained product was a liquid, the yield was 85%.
Analysis: GPC (THF, PS-Standard): $M_n$=8600 g/mol, PD=1.24.
$^1$H-NMR: degree of polymerization P(BA-b-4VP)=75-b-14.

Step 3: Transesterification of poly(n-BA-b-4VP)
with MPEG-OH to poly(n-BA-MPEGA-b-4-VP)
(Block Copolymer of Methylpolyethyleneglycol
Acrylate Containing Minor Amounts of n-butyl
Acrylate, and 4-Vinylpyridine)

In a 500 ml flask equipped with a magnetic stirring bar and distillation column with dry ice acetone cooling 92.8 g of poly(n-BA-b-4-VP) according to step 2 in 107.2 g of xylene and 114.7 g of MPEG-OH (Mn=550 g/mol) were added and dried by azeotropic distillation of the xylene. Three portions of 0.36 g of tetra(isopropyl)orthotitanate were added during 3 h at 190 to 205° C. The formed n-butanol was distilled off at low pressure.

187.7 g of poly(n-BA-MPEGA-b-4-VP) were obtained with $M_n$=17500 g/mol, PDI=1.6, OH number=0.05 meq/g. Analysis via GPC and $^1$H-NMR indicated almost quantitative conversion of the MPEG-OH.
Intermediate B13

Step 1: Synthesis of a Linear Polymer Poly(BA)

In a 6 liter reactor equipped with stirrer, cooler, thermometer and monomer feed pumps 1519 g of n-butylacrylate and 209 g of 2,6-diethyl-2,6-dimethyl-1-(1-phenylethoxy)-piperidin-4-one were added, three times degassed with $N_2$/vacuum and heated to 115° C. under $N_2$, where a continuous feed of n-butylacrylate was started over 4 hours and at the same time the reaction mass slowly heated to 135° C. After the end of the monomer feed, the reaction mass was further reacted for 5 h until a solids content of 55% was reached. Afterwards, the non-reacted monomers were removed by vacuum distillation.

2812 g of poly(n-BA) were obtained as liquid polymer with $M_n$=4554 g/mol, PDI=1.18, and degree of polymerization poly(nBA)=35 (via $^1$H-NMR).

Step 2: Synthesis of a Linear Block Copolymer Poly(n-BA-b-4VP)

In a 6-liter reactor equipped with stirrer, cooler, thermometer and monomer feed pumps, 2674 g of the polymer of step 1 together with 1133 g of 4-vinylpyridine were heated under $N_2$ to 135° C. and reacted for 3.5 h until a solids content of 91% was reached. The obtained polymer was used for subsequent transesterifications without further removal of non-reacted 4-vinylpyridine.

3732 g of polymer poly(nBA-b-4VP) were isolated from the reactor with $M_n$=4779 g/mol, PDI=1.19, and degree of polymerization=poly(nBA-b-4VP)=35-b-14 (via $^1$H-NMR).

Step 3: Transesterification of poly(n-BA-b-4VP) with branched iso-$C_{12}$-$C_{15}$-alcohol Mixture to a Non-Polar Block Copolymer poly[(n-BA-iC$_{12-15}$A)-b-4VP] (Block Copolymer of Branched iso-$C_{12}$-$C_{15}$-Alkyl Acrylate Containing Minor Amounts of n-Butyl Acrylate, and 4-Vinylpyridine)

In a 250 ml flask equipped with a magnetic stirring bar and distillation column, 83.3 g of methoxypropylacetate solution (60 wt-%) of a diblock copolymer P(nBA-b-4VP) (synthesized analog to step 2; degree of polymerization=76-b-14, $M_n$=8834, PD=1.27) and 54.1 g of branched iso-$C_{12}$-$C_{15}$-alcohol mixture (Lial 125, Condea) were heated to 125° C. Then, methoxypropylacetate was distilled under reduced pressure before adding 0.28 g catalyst solution (Ti(AcAc)$_2$(iOPr)$_2$; titan-bis-acetylacetonato-bis-isopropylate, 75 wt % in isopropanol). The transesterification was started by slowly distilling off n-butanol under reduced pressure and increasing the temperature to 145° C. Two additional portions of each 0.28 g of catalyst solution were added after 1 h and 2 h later. After 4 h of total reaction time the transesterification was terminated after no further n-butanol formation was observed.

76 g of liquid block copolymer were obtained with $M_n$=12216 g/mol, PDI=1.27, and degree of polymerization of poly[(nBA-iC$_{12-15}$A)-b-4VP]=(16-60)-b-14. (via $^1$H-NMR and GPC). Analysis via GPC and $^1$H-NMR indicated almost quantitative conversion of branched iso-$C_{12}$-$C_{15}$-alcohol.

Intermediate B14

Step 1: Synthesis of a Linear Polymer poly(BA)

Step 1 was carried out in analogy to step 1 of Intermediate B13.

Step 2: Synthesis of a Block Copolymer poly(n-BA-b-DMAPMA) (n-butylacrylate Dimethylaminopropyl Methacrylamide Block Copolymer)

In a 500 ml flask equipped with a magnetic stirring bar and distillation column, 150 g of P(nBA) (synthesized analog step 1; degree of polymerization=76, $M_n$=8547 g/mol, PDI=1.19) and 150 g of dimethylaminopropyl methacrylamide (DMAPMA) were heated under $N_2$ to 145° C. After 4.5 h the reaction was terminated and non-reacted monomer DMAPMA was distilled off at high vacuum.

179 g of block copolymer were isolated with $M_n$=6874 g/mol, PDI=1.41, and degree of polymerization of poly(nBA-b-DMAPMA)=(75-b-23) (via $^1$H-NMR).

The resultant high viscous block copolymer was diluted with methoxypropylacetate to a clear 60 wt % solution.

Step 3: Transesterification of poly(nBA-b-DMAPMA) with $C_{16}$-$C_{22}$-alcohol to a Non-Polar Block Copolymer poly[(n-BA-BhA)-b-DMAPMA] (block copolymer of $C_{16}$-$C_{22}$-alkyl acrylate Containing Minor Amounts of n-Butyl Acrylate, and Dimethylaminopropyl Methacrylamide)

In a 250 ml flask equipped with a magnetic stirring bar and distillation column, 41.7 g of methoxypropylacetate solution (60 wt %) of the diblock copolymer of step 2 (poly(nBA-b-DMAPMA)=75-b-23) and 30.0 g technical behenyl alcohol (BhOH=linear $C_{16}$-$C_{22}$-alcohol mixture; Nafol 1822 from Condea) were heated to 125° C. Then, methoxypropylacetate was distilled off under reduced pressure before adding 0.15 g of catalyst solution (Ti(AcAc)$_2$(iOPr)$_2$; titan-bis-acetylacetonato-bis-isopropylate, 75 wt % in isopropanol). The transesterification was started by slowly distilling off n-butanol under reduced pressure and increasing the temperature to 145° C. Two additional portions of each 0.15 g of catalyst solution were added after 2 h and 4 h later. After 6 h of total reaction time the reaction was terminated after no further n-butanol formation was observed.

42 g of block copolymer were obtained, which solidified at room temperature, with $M_n$=10652 g/mol, PDI=1.60 and degree of polymerization of poly[(nBA-BhA)-b-DMAPMA]=(20-55)-b-23 (via $^1$H-NMR and GPC). Analysis via GPC as well as $^1$H-NMR indicated good conversion of the behenyl alcohol.

Intermediate B15

Step 1: Synthesis of a Linear Polymer Poly(BA)

Step 1 was carried out in analogy to step 1 of Intermediate B13.

Step 2: Synthesis of a Block Copolymer poly(n-BA-b-DMAEMA) (n-butylacrylate Dimethylaminoethyl Methacrylamide Block Copolymer)

1355.3 g of poly-n-butyl acrylate of step 1 and 950 g of dimethylaminoethyl methacrylamide were added to a reactor equipped with a mechanical stirrer. The air was removed from the flask by stirring and evacuating and rinsing with nitrogen 3 times. The mixture is stirred, heated up to 145° C. and polymerized for 2 hours. The reaction mixture was cooled, and the polymer is isolated by drying with high vacuum. 1784 g of dried product were received as brown viscous oil with $M_n$=9037 g/mol, PDI=1.3, and degree of polymerization of poly(nBA-b-DMAEMA)=50-b-14. (via $^1$H-NMR and GPC).

Example 1

A mixture of 72 g Intermediate A1 and 5 g Intermediate B1 was stirred at 80° C. for 30 min. The obtained product is a viscous liquid with an acid number of 70 mg KOH/g and an amine number of 84 mg KOH/g.

Examples 2 to 47

Examples 2 to 47 were prepared in a similar manner as Example 1, except that the type of acid compound and the type of polyamines, respectively, were varied as detailed in the table below.

| Example | Material 1 | Material 2 | Acid number (mg KOH/g) | Amine number (mg KOH/g) |
|---|---|---|---|---|
| 2 | Intermediate A1, 10 g | Intermediate B2, 30 g | 19 | 30 |
| 3 | Intermediate A1, 10 g | Intermediate B3, 40 g | 15 | 16 |
| 4 | Intermediate A1, 40 g | Intermediate B4, 10 g | 60 | 102 |
| 5 | Intermediate A1, 40 g | Intermediate B5, 10 g | 60 | 80 |
| 6 | Intermediate A1, 20 g | Intermediate B6, 10 g | 50 | 65 |
| 7 | Intermediate A1, 20 g | Intermediate B7, 10 g | 50 | 61 |
| 8 | Intermediate A1, 20 g | Intermediate B8, 10 g | 50 | 60 |
| 9 | Intermediate A1, 20 g | Intermediate B9, 30 g | 33 | 42 |
| 10 | Intermediate A1, 40 g | Intermediate B10, 10 g | 60 | 80 |
| 11 | Intermediate A1, 20 g | Intermediate B11, 20 g | 65 | 86 |
| 12 | Intermediate A1, 10 g | Intermediate B12, 30 g | 19 | 30 |
| 13 | Intermediate A1, 10 g | Intermediate B13, 30 g | 19 | 37 |
| 14 | Intermediate A1, 10 g | Intermediate B14, 20 g | 25 | 40 |
| 15 | Intermediate A1, 20 g | Intermediate B15, 20 g | 38 | 49 |
| 16 | Intermediate A2, 60 g | Intermediate B1, 5 g | 55 | 100 |
| 17 | Intermediate A2, 20 g | Intermediate B2, 40 g | 19 | 26 |
| 18 | Intermediate A2, 10 g | Intermediate B3, 40 g | 12 | 16 |
| 19 | Intermediate A2, 30 g | Intermediate B4, 5 g | 51 | 74 |
| 20 | Intermediate A2, 30 g | Intermediate B5, 6 g | 50 | 67 |
| 21 | Intermediate A2, 20 g | Intermediate B6, 10 g | 40 | 64 |
| 22 | Intermediate A2, 20 g | Intermediate B7, 10 g | 41 | 61 |
| 23 | Intermediate A2, 20 g | Intermediate B8, 10 g | 40 | 61 |
| 24 | Intermediate A2, 20 g | Intermediate B9, 20 g | 31 | 36 |
| 25 | Intermediate A2, 30 g | Intermediate B10, 6 g | 49 | 65 |
| 26 | Intermediate A2, 20 g | Intermediate B11, 10 g | 39 | 57 |
| 27 | Intermediate A2, 10 g | Intermediate B12, 20 g | 21 | 27 |
| 28 | Intermediate A2, 10 g | Intermediate B13, 20 g | 20 | 32 |
| 29 | Intermediate A2, 10 g | Intermediate B14, 15 g | 23 | 35 |
| 30 | Intermediate A2, 20 g | Intermediate B15, 20 g | 31 | 49 |
| 31 | Intermediate A3, 60 g | Intermediate B1, 5 g | 59 | 99 |
| 32 | Intermediate A3, 20 g | Intermediate B2, 40 g | 21 | 27 |
| 33 | Intermediate A3, 10 g | Intermediate B3, 40 g | 13 | 17 |
| 34 | Intermediate A3, 30 g | Intermediate B4, 5 g | 55 | 73 |
| 35 | Intermediate A3, 30 g | Intermediate B5, 6 g | 54 | 66 |
| 36 | Intermediate A3, 20 g | Intermediate B6, 10 g | 43 | 63 |
| 37 | Intermediate A3, 20 g | Intermediate B7, 10 g | 44 | 60 |
| 38 | Intermediate A3, 20 g | Intermediate B8, 10 g | 42 | 60 |
| 39 | Intermediate A3, 20 g | Intermediate B9, 20 g | 32 | 35 |
| 40 | Intermediate A3, 30 g | Intermediate B10, 6 g | 52 | 63 |
| 41 | Intermediate A3, 20 g | Intermediate B11, 10 g | 40 | 58 |
| 42 | Intermediate A3, 10 g | Intermediate B12, 20 g | 23 | 29 |
| 43 | Intermediate A3, 10 g | Intermediate B13, 20 g | 22 | 33 |
| 44 | Intermediate A3, 10 g | Intermediate B14, 15 g | 25 | 34 |
| 45 | Intermediate A3, 20 g | Intermediate B15, 20 g | 33 | 51 |
| 46 | Example 17, 80 g | Dehypound LLD 60, 20 g | — | — |
| 47 | Example 21, 80 g | Hexamoll DINCH, 20 g | 33 | 51 |
| 48 | Example 38, 80 g | Bis(2-ethyl hexyl) adipate, 20 g | 33 | 49 |
| 49 | Example 41, 80 g | Lutensol ON30, 20 g | 21 | 47 |

Performance Testing

In order to test the dispersion effect of the obtained samples, resin free pigment concentrates (mill-base) were prepared according to the following table. The mill-base was dispersed in Scandex Shaker for 1 h with the help of glass beads. Afterwards the mill base was filtered and stored at room temperature overnight.

Millbase Formulation:

|    | Ingredients | (g) |
|---|---|---|
| 1) | EFKA-2550 | 0.6 |
| 2) | water | 47.4 |
| 3) | PEG 200 | 11.0 |
| 4) | Dispersant example | 11.0 |
| 5) | PV23: Hostaperm. V. RL-NF (purple) | 11.0 |
| 6) | NaOH (25%) | 2.0 |
| 7) | ASP170 | 17.0 |
| 8) | 2.0 mm glass beads [g] | 100.0 |
|    | Total (g) | 200.0 |

The performance of the examples above was tested by determining the rheological behavior of the millbase formulations. The rheological behavior of the millbases was measured at 23° C. with a Thermo-Haake RheoStress 600 rheometer under CR-mode with rotation speed of 1 sec$^{-1}$, respectively, using a cone-plate sensor. Results are summarized in table below.

The dispersion effect in clear coat paint system

| Sample[1] | Viscosity (mPa · s) | | |
|---|---|---|---|
|  | 1 s$^{-1}$ | 10 s$^{-1}$ | 100 s$^{-1}$ |
| 2 | 12800 | 4600 | 810 |
| 6 | 6900 | 3400 | 430 |
| 8 | 4200 | 1500 | 500 |
| 18 | 3800 | 1300 | 220 |
| 21 | 12500 | 1400 | 250 |
| 29 | 7500 | 1250 | 210 |

| Sample[1] | Viscosity (mPa · s) | | |
|---|---|---|---|
| | 1 s$^{-1}$ | 10 s$^{-1}$ | 100 s$^{-1}$ |
| 46 | 11500 | 1250 | 320 |
| 47 | 13500 | 1450 | 550 |

[1]The number of the sample indicates the number of the polymer example used in the formulation.

The dispersant performance was also tested in clear coating systems with respect to gloss and anti-cratering effect. The let-down formulation is based on a clear solvent-borne coating system.

Let Down Formulation I:

| | Ingredient | % b.w. in formulation |
|---|---|---|
| 1) | Resin 1 | 24.7% |
| 2) | Resin 2 | 23.1% |
| 3) | Resin 3 | 11.5% |
| 4) | Plasticizer | 2.9% |
| 5) | Butyl Acetate | 18.9% |
| 6) | Xylene | 18.9% |
| | Total | 100% |

Resin 1: Saturated polyester resin in Solvent naphtha/Methoxy propanol/Xylene (Setal 173 VS-60) from Nuplex;
Resin 2: Mixture of 64.8 g of a first cellulose acetate butyrate (CAB 381.2) and 25.2 g of a second cellulose acetate butyrate (CAB 381.20) in 255 g butyl acetate and 255 g of xylene, commercially available from Eastman Chemical;
Resin 3: Maprenal MF 650: highly reactive isobutylated melamine-formaldehyde resin, commercially available from Ineos;
Plasticizer: Resamine HF 480: Polyurea plasticizer, Carbamic resin based on butyl urethane and formaldehyde, commercially available from Cytec.

Then, colored paint compositions were prepared by mixing 1.0 g of the respective millbases with 9.0 g of the letdown formulation, respectively, under 5 minutes at 2000 rpm. The paint was applied on a polyester film with a 150 μm film thickness and then dried at 130° C. for 30 min. The gloss of the obtained coatings at 20° angle was determined according to DIN 67530 using a commercial reflectometer (Micro-Tri-Gloss reflectometer from BYK Gardner).

The performance was generally very good with satisfactory results.

Gloss (20°) and Crater Ranking I

| Sample[1] | Gloss (20°) | Crater ranking[2] |
|---|---|---|
| 2 | 83 | 1 |
| 6 | 84 | 1 |
| 8 | 85 | 0 |
| 18 | 86 | 0 |
| 21 | 84 | 0 |
| 29 | 84 | 1 |
| 46 | 86 | 0 |
| 47 | 83 | 1 |

[1]The number of the sample indicates the number of the polymer example used in the formulation.
[2]Crater ranking (0 = no, 1 = few, 3 = some, 5 = a lot)

The dispersant performance was also tested in water-borne coating system with respect to gloss and anti-cratering effect. The colored paint compositions were prepared by mixing 0.5 g of the respective millbases with 9.5 g of the letdown Sikkens Rubbol BL Satin (water borne alkyd emulsion from Akzo Nobel), respectively, under 5 minutes at 2000 rpm. The paint was applied on a polyester film with a 150 μm film thickness, and then dried with ventilation (relative humidity: 50%, temperature of 22° C.). The gloss of the obtained coatings at 20° angle was determined according to DIN 67530 using a commercial reflectometer (Micro-Tri-Gloss reflectometer from BYK Gardner). The performance was generally very good with satisfactory results.

Gloss (20°) and Crater Ranking II

| Sample[1] | Gloss (20°) | Crater ranking[2] |
|---|---|---|
| 2 | 80 | 0 |
| 6 | 78 | 1 |
| 8 | 81 | 0 |
| 18 | 77 | 2 |
| 21 | 79 | 2 |
| 29 | 77 | 2 |
| 46 | 80 | 0 |
| 47 | 78 | 1 |

[1]The number of the sample indicates the number of the polymer example used in the formulation.
[2]Crater ranking (0 = no, 1 = few, 3 = some, 5 = a lot)

The invention claimed is:

1. A polymer composition which is obtained by neutralizing a polymer P having at least one functional moiety of the formula (I):

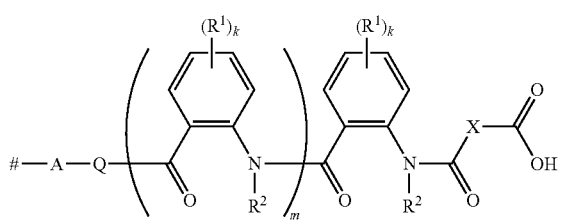

bound to the termini and/or to the backbone of a polymer, where
indicates the point of attachment to the terminus of the polymer and/or to the polymer backbone;
k is 0, 1, 2, 3 or 4;
m is 0, 1, 2, 3, 4, 5, 6, 7, 8 or 9;
A is a chemical bond or a divalent moiety selected from the group consisting of $C_1$-$C_6$ alkylene, —O—($C_2$-$C_6$ alkylene), —C(=O)—O—($C_2$-$C_6$ alkylene), —NR$^3$—($C_2$-$C_6$ alkylene) and C(=O)—NR$^3$—($C_2$-$C_6$ alkylene), where the $C_2$-$C_6$ alkylene part is attached to Q;
Q is a divalent moiety selected from the group consisting of —O—, —NH— and —S—;
R$^1$ is independently selected from the group consisting of —OH, —COOCH$_3$, —NO$_2$, —S(=O)$_2$R$^4$, $C_1$-$C_{20}$ alkyl, $C_1$-$C_4$ alkoxy, halogen, aryloxy, aryl, heteroaryl, where aryl, heteroaryl and aryloxy are unsubstituted or substituted by 1, 2, 3 or 4 radicals selected from the group consisting of —OH, COOH, —COOCH$_3$, —NO$_2$, —S(=O)$_2$R$^4$, $C_1$-$C_4$ alkyl, $C_1$-$C_4$ alkoxy and halogen;
R$^2$ is selected from the group consisting of hydrogen, —S(=O)$_2$R$^4$, $C_1$-$C_{20}$ alkyl, $C_3$-$C_{10}$ cycloalkyl, aryl, heteroaryl, aryl-$C_1$-$C_4$-alkyl and heteroaryl-$C_1$-$C_4$-alkyl, where aryl and heteroaryl in the four last mentioned radicals are unsubstituted or substituted by 1, 2, 3 or 4 radicals selected from the group consisting of —OH,COOH, —COOCH$_3$, —NO$_2$, —S(=O)$_2$R$^4$, $C_1$-$C_4$ alkyl, $C_1$-$C_4$ alkoxy and halogen;
X is a divalent moiety selected from the group consisting of linear $C_1$-$C_{10}$ alkylene, linear $C_2$-$C_6$ alkenylene, $C_4$-$C_7$ cycloalkylene, arylene and alkarylene, where the linear $C_1$-$C_{10}$ alkylene, linear $C_2$-$C_6$ alkenylene and $C_4$-$C_7$ cycloalkylene are unsubstituted or substituted by 1, 2, 3 or 4 radicals selected from the group consisting of $C_1$-$C_{18}$ alkyl or $C_1$-$C_{18}$ alkenyl, and where arylene and alkarylene are unsubstituted or substituted by 1, 2, 3 or 4 radicals selected from the group consisting of $C_1$-$C_4$ alkyl, $C_1$-$C_4$ haloalkyl, aryl, —COOH, —COOCH$_3$, —NO$_2$ and halogen;

$R^3$ is selected from the group consisting of hydrogen, —S(=O)$_2$R$^4$, $C_1$-$C_{20}$ alkyl, $C_3$-$C_{10}$ cycloalkyl, aryl and heteroaryl, where aryl and heteroaryl are unsubstituted or substituted by 1, 2, 3 or 4 radicals selected from the group consisting of —OH, COOH, —COOCH$_3$, —NO$_2$, —S(=O)$_2$R$^4$, $C_1$-$C_4$ alkyl, $C_1$-$C_4$ alkoxy and halogen;

$R^4$ is selected from the group consisting of OH, $C_1$-$C_4$ alkyl, $C_1$-$C_4$ alkoxy, aryl and heteroaryl, where aryl and heteroaryl are unsubstituted or substituted by 1, 2, 3 or 4 radicals selected from the group consisting of $C_1$-$C_4$ alkyl, $C_1$-$C_4$ alkoxy and halogen;

with an oligomeric or polymeric amine PA having at least 2 amine groups per molecule.

2. The polymer composition of claim 1, where in formula (I)
k is 0 or 1;
m is 0 or 1;
A is a chemical bond or a divalent moiety selected from the group consisting of —C(=O)—O—(C$_2$-C$_4$ alkylene) and C(=O)—NH—(C$_2$-C$_4$ alkylene), where the alkylene part is attached to Q;
Q is a divalent moiety selected from the group consisting of —O— and —NH—;
$R^1$ is independently selected from the group consisting of —OH, —NO$_2$, —S(=O)$_2$R$^4$, $C_1$-$C_4$ alkyl, $C_1$-$C_4$ alkoxy, halogen, phenyl and pyridyl;
$R^2$ is selected from the group consisting of hydrogen, $C_1$-$C_4$ alkyl and phenyl;
X is selected from the group consisting of linear $C_2$-$C_6$ alkylene, $C_2$-$C_6$ alkenylene and 1,2-phenylene, where $C_2$-$C_6$ alkylene and $C_2$-$C_6$ alkenylene are unsubstituted or carry a $C_1$-$C_{18}$ alkyl or $C_1$-$C_{18}$ alkenyl radical and 1,2-phenylene is unsubstituted or substituted by 1 or 2 radicals selected from the group consisting of $C_1$-$C_3$ alkyl, —COOH and halogen;
$R^4$ is selected from the group consisting of $C_1$-$C_4$ alkyl.

3. The polymer composition of claim 2, where in formula (I) k and m are both 0, $R^2$ is hydrogen and X is $C_2$-$C_4$ alkylene.

4. The polymer composition of claim 1, where the group of formula (I) is bound to the termini and/or to the backbone of a polymer which is selected from the group consisting of polyesters, polyethers, polyether esters, polycarbonates and polymers having a C—C-backbone.

5. The polymer composition of claim 1, where the polymer P has a number average molecular weight in the range from 500 to 100.000 Dalton, determined according to DIN 55672-1.

6. The polymer composition of claim 1, where the polymer P is characterized by an acid number in the range of from 5 to 500 mg KOH/g.

7. The polymer composition of claim 1, where the oligomeric or polymeric amine PA having at least 2 amine groups per molecule is selected from
poly-$C_2$-$C_3$-alkyleneimines,
ethoxylated poly-$C_2$-$C_3$-alkyleneimines,
amidated poly-$C_2$-$C_3$-alkyleneimines,
polyvinylamines,
polyetheramines,
polyetheraminepolyols,
polyetheramine polyols, wherein at least a portion of the hydroxyl groups are modified by ester, amide or urethane groups, and
homo and copolymers of ethylenically unsaturated monomers M comprising monomers MA having an ethylenically unsaturated double bond and an amine group.

8. The polymer composition of claim 1, where the oligomeric or polymeric amine PA having at least 2 amine groups per molecule is selected from
polyethyleneimines,
ethoxylated polyethyleneimines,
polyethyleneimines, which bear at least one polyester group,
polyvinylamines,
polycondensation products of trialkanolamines;
polycondensation products of trialkanolamines, wherein at least a portion of the hydroxyl groups are modified by ester, amide or urethane groups,
copolymers of ethylenically unsaturated monomers M comprising monomers MA having an acrylate or methacrylate group and an amine group.

9. The polymer composition of claim 1, where the oligomeric or polymeric amine has an amine number in the range from 10 to 2000 mg KOH/g.

10. The polymer composition of claim 1, where the oligomeric or polymeric amine has a number average molecular weight in the range from 100 to 50,000 g/mol, determined according to DIN 55672-1.

11. The polymer composition of claim 1, where the oligomeric or polymeric amine PA is present in such an amount that the molar ratio of amino groups in PA to the COOH groups in the moieties of formula (I) are in the range from 1:3 to 3:1.

12. The polymer composition of claim 1, further containing a plasticizer.

13. A process for the manufacturing of the polymer composition as claimed in claim 1, which comprises
a) providing a polymer P.1 carrying at least one radical of the formula I.1:

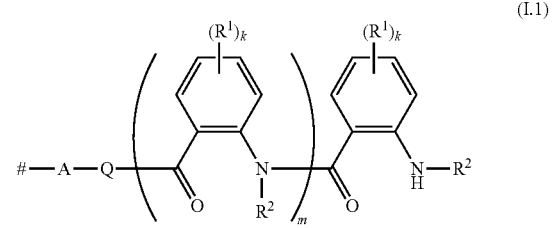

bound to the termini and/or backbone of the polymer P.1,
where # indicates the point of attachment to the terminus and/or to the polymer backbone and
where A, Q, k, m, $R^1$ and $R^2$ are as defined in claim 1,
b) further reacting the polymer P.1 obtained in step a) with an acid anhydride of formula (IV)

where X' has the meanings given for X in claim 1 and if X' carries 2, 3 or 4 COOH groups, two COOH groups may form an anhydride group;

c) neutralizing the reaction product of step b) with an oligomeric or polymeric amine PA having at least 2 amine groups per molecule.

14. The process as claimed in claim 13, where step a) comprises reacting a polymer P having at least one functional moiety of the formula A-Q-H attached to the termini and/or to the backbone of the polymer P with a compound of the formulae II, II' or III

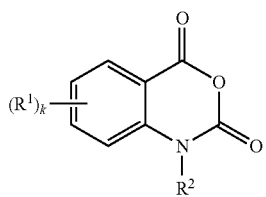

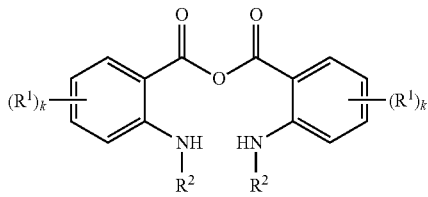

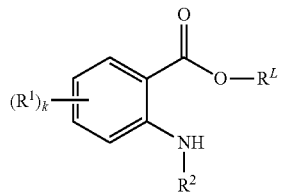

(II')

where A, Q, k, $R^1$ and $R^2$ are as defined in claim 1,

Where $R^L$ is hydrogen or a hydrocarbon radical having 1 to 8 carbon atoms and where the polymer P' does not have a functional group of the formula I.1.

15. A liquid composition in the form of a dispersion comprising a fine particulate solid material, selected from the group consisting of pigments and fillers, a liquid diluent, wherein the fine particulate solid material is dispersed in the liquid diluent, further comprising the polymer composition as defined in claim 1.

16. The liquid composition of claim 15, where the weight ratio of fine particulate solid material to polymer P is in the range from 100:1 to 1:50.

17. The liquid composition of claim 15, comprising i) 1 to 70% by weight, based on the total weight of the liquid composition, of at least one fine particulate solid material, selected from the group consisting of pigments and fillers;

ii) 0.5 to 50% by weight, based on the total weight of the liquid composition, of the polymer composition;

iii) 10 to 98.5% by weight, based on the total weight of the liquid composition, of at least one liquid diluent.

18. The liquid composition of claim 16, where the weight ratio of fine particulate solid material to polymer P is in the range from 30:1 to 1:10.

* * * * *